(12) United States Patent
Silveira et al.

(10) Patent No.: US 7,944,467 B2
(45) Date of Patent: May 17, 2011

(54) TASK-BASED IMAGING SYSTEMS

(75) Inventors: Paulo E. X. Silveira, Boulder, CO (US); Ramkumar Narayanswamy, Boulder, CO (US); Robert H. Cormack, Boulder, CO (US); Gregory E. Johnson, Boulder, CO (US); Edward R. Dowski, Jr., Lafayette, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1256 days.

(21) Appl. No.: 11/524,142

(22) Filed: Sep. 19, 2006

(65) Prior Publication Data
US 2010/0278390 A1 Nov. 4, 2010

Related U.S. Application Data

(63) Continuation-in-part of application No. 11/225,753, filed on Sep. 13, 2005, now Pat. No. 7,652,685, and a continuation-in-part of application No. 11/000,819, filed on Dec. 1, 2004, now Pat. No. 7,469,202.

(60) Provisional application No. 60/718,522, filed on Sep. 19, 2005, provisional application No. 60/779,712, filed on Mar. 6, 2006, provisional application No. 60/609,445, filed on Sep. 13, 2004, provisional application No. 60/526,216, filed on Dec. 1, 2003.

(51) Int. Cl.
*H04N 9/47* (2006.01)
*H04N 7/18* (2006.01)
*G06K 9/00* (2006.01)

(52) U.S. Cl. .......................................... 348/78; 382/117
(58) Field of Classification Search .................... 348/78; 382/117; 398/118, 119
See application file for complete search history.

(56) References Cited

U.S. PATENT DOCUMENTS

| | | | |
|---|---|---|---|
| 4,837,451 | A | 6/1989 | Pinson |
| 4,928,300 | A | 5/1990 | Ogawa et al. |
| 4,938,596 | A | 7/1990 | Gauthier et al. |

(Continued)

FOREIGN PATENT DOCUMENTS

GB 2362249 A 11/2001

(Continued)

OTHER PUBLICATIONS

U.S. Appl. No. 11/225,753, Notice of Allowance, Sep. 10, 2009, 12 pages.

(Continued)

*Primary Examiner* — Sinh Tran
*Assistant Examiner* — Albert H Cutler
(74) *Attorney, Agent, or Firm* — Lathrop & Gage LLP

(57) ABSTRACT

A task-based imaging system for obtaining data regarding a scene for use in a task includes an image data capturing arrangement for (a) imaging a wavefront of electromagnetic energy from the scene to an intermediate image over a range of spatial frequencies, (b) modifying phase of the wavefront, (c) detecting the intermediate image, and (d) generating image data over the range of spatial frequencies. The task-based imaging system also includes an image data processing arrangement for processing the image data and performing the task. The image data capturing and image data processing arrangements cooperate so that signal-to-noise ratio (SNR) of the task-based imaging system is greater than SNR of the task-based imaging system without phase modification of the wavefront over the range of spatial frequencies.

17 Claims, 39 Drawing Sheets

U.S. PATENT DOCUMENTS

| | | | |
|---|---|---|---|
| 5,002,380 | A | 3/1991 | Aprahamian |
| 5,168,375 | A | 12/1992 | Reisch et al. |
| 5,179,273 | A | 1/1993 | Lisson et al. |
| 5,221,834 | A | 6/1993 | Lisson et al. |
| 5,291,560 | A | 3/1994 | Daugman |
| 5,515,206 | A | 5/1996 | Peng |
| 5,521,695 | A | 5/1996 | Cathey, Jr. et al. |
| 5,555,128 | A | 9/1996 | Khoury et al. |
| 5,610,707 | A | 3/1997 | Duncan et al. |
| 5,710,839 | A | 1/1998 | Cok |
| 5,748,371 | A | 5/1998 | Cathey, Jr. et al. |
| 5,751,340 | A | 5/1998 | Strobl et al. |
| 5,828,867 | A | 10/1998 | Pennell |
| 5,870,179 | A | 2/1999 | Cathey, Jr. et al. |
| 5,872,834 | A | 2/1999 | Teitelbaum |
| 5,966,216 | A | 10/1999 | Galburt et al. |
| 6,052,524 | A | 4/2000 | Pauna |
| 6,069,738 | A | 5/2000 | Cathey, Jr. et al. |
| 6,097,856 | A * | 8/2000 | Hammond, Jr. ............ 382/312 |
| 6,107,617 | A * | 8/2000 | Love et al. ................ 250/201.9 |
| 6,111,840 | A | 8/2000 | Hajjar |
| 6,154,879 | A | 11/2000 | Pare et al. |
| 6,343,307 | B1 | 1/2002 | Mendlovic et al. |
| 6,433,818 | B1 | 8/2002 | Steinberg |
| 6,519,501 | B2 | 2/2003 | Pierrat et al. |
| 6,525,302 | B2 | 2/2003 | Dowski et al. |
| 6,532,298 | B1 | 3/2003 | Cambier et al. |
| 6,674,519 | B2 | 1/2004 | Mui |
| 6,783,733 | B2 | 8/2004 | Bogen et al. |
| 6,813,593 | B1 | 11/2004 | Berger |
| 6,842,297 | B2 | 1/2005 | Dowski, Jr. |
| 6,850,372 | B1 | 2/2005 | Stenton |
| 6,895,136 | B2 | 5/2005 | Deliwala |
| 6,895,334 | B2 | 5/2005 | Yabe |
| 6,911,638 | B2 | 6/2005 | Dowski, Jr. et al. |
| 6,940,649 | B2 | 9/2005 | Dowski, Jr. |
| 7,061,693 | B2 | 6/2006 | Zalevsky |
| 7,113,203 | B1 | 9/2006 | Wu et al. |
| 7,117,140 | B2 | 10/2006 | Toyama |
| 7,180,673 | B2 | 2/2007 | Dowski, Jr. |
| 7,269,809 | B2 | 9/2007 | Shastri et al. |
| 7,576,791 | B2 | 8/2009 | Sonstroem |
| 2002/0118457 | A1 | 8/2002 | Dowski, Jr. |
| 2002/0134921 | A1 | 9/2002 | Cathey, Jr. |
| 2003/0115028 | A1 | 6/2003 | Summerfield et al. |
| 2003/0127584 | A1 | 7/2003 | Dowski, Jr. et al. |
| 2003/0142877 | A1 | 7/2003 | George et al. |
| 2003/0169944 | A1 | 9/2003 | Dowski, Jr. et al. |
| 2003/0174211 | A1 | 9/2003 | Imaoka et al. |
| 2004/0145808 | A1 | 7/2004 | Cathey, Jr. et al. |
| 2004/0165253 | A1 | 8/2004 | Cathey, Jr. et al. |
| 2004/0190762 | A1 | 9/2004 | Dowski, Jr. et al. |
| 2004/0228005 | A1 | 11/2004 | Dowski, Jr. |
| 2004/0247196 | A1 | 12/2004 | Chanas et al. |
| 2004/0257543 | A1 | 12/2004 | Dowski, Jr. et al. |
| 2005/0049843 | A1 | 3/2005 | Hewitt et al. |
| 2005/0088745 | A1 | 4/2005 | Cathey, Jr. et al. |
| 2005/0275953 | A1 | 12/2005 | George et al. |
| 2006/0050409 | A1 | 3/2006 | George et al. |
| 2007/0040828 | A1 | 2/2007 | Zalevsky et al. |
| 2008/0231966 | A1 | 9/2008 | Hendriks et al. |
| 2008/0284980 | A1 | 11/2008 | Skogo et al. |

FOREIGN PATENT DOCUMENTS

| | | |
|---|---|---|
| JP | 2000307715 | 11/2000 |
| JP | 2001333171 | 11/2001 |
| JP | 2003110695 | 4/2003 |
| JP | 2003284141 | 10/2003 |
| JP | 2005063077 | 3/2005 |
| WO | WO 99/35529 | 7/1999 |
| WO | WO 99/57599 | 11/1999 |
| WO | WO 00/72267 A1 | 11/2000 |
| WO | WO 01/20561 | 3/2001 |
| WO | WO 01/99431 A3 | 12/2001 |
| WO | WO 02/19723 | 3/2002 |
| WO | WO 02/052331 | 7/2002 |
| WO | WO 02/057832 A3 | 7/2002 |
| WO | WO 02/099511 | 12/2002 |
| WO | WO 03/005733 A1 | 1/2003 |
| WO | WO 03/007538 | 1/2003 |
| WO | WO 03/009041 A3 | 1/2003 |
| WO | WO 03/021333 A1 | 3/2003 |
| WO | WO 03/021373 A2 | 3/2003 |
| WO | WO 03/052492 | 6/2003 |
| WO | WO 03/073153 A1 | 9/2003 |
| WO | WO 2004063989 A2 | 7/2004 |
| WO | WO 2004/090581 | 10/2004 |
| WO | WO2005/073762 | 8/2005 |
| WO | WO 2006028527 A2 | 3/2006 |
| WO | WO/2006/102201 | 9/2006 |
| WO | WO 2006097916 A2 | 9/2006 |

OTHER PUBLICATIONS

U.S. Appl. No. 11/225,753, Response to Office Action, May 18, 2009, 12 pages.

U.S. Appl. No. 11/225,753, Office Action, Feb. 17, 2009, 18 pages.

U.S. Appl. No. 11/682,816, Notice of Allowance and Examiner Interview Summary, Dec. 18, 2009, 10 pages.

U.S. Appl. No. 11/682,816, Response to Office Action, Oct. 14, 2009, 10 pages.

U.S. Appl. No. 11/682,816, Office Action, Jul. 14, 2009, 11 pages.

U.S. Appl. No. 11/682,816, Response to Office Action, Apr. 15, 2009, 7 pages.

U.S. Appl. No. 11/682,816, Office Action, Nov. 24, 2008, 12 pages.

European Application No. 04812670.0 Reply to Examination Report, Jan. 16, 2009, 7 pages.

European Application No. 06851443.9 Reply to Examination Report, Dec. 15, 2008, 10 pages.

Chinese Application No. 200810131277.2 Office Action, Sep. 18, 2009, 12 pages.

Chinese Application No. 200680037455.4 Office Action, Jun. 19, 2009, 14 pages.

Daugman, J., "How iris recognition works," IEEE Transaction on Circuits and Systems for Video Technology, vol. 14, No. 1, Jan. 2004, pp. 21-30.

Daugman, J., "High confidence visual recognition of persons by a test of statistical independence," IEEE Transaction on Pattern Analysis and Machine Intelligence, vol. 15, No. 11, Nov. 1993, pp. 1148-1161.

Daugman, J., "Face and gesture recognition: overview," IEEE Transaction on Pattern Analysis and Machine Intelligence, vol. 19, No. 7, Jul. 1997, pp. 675-676.

Daugman, J., "Statistical richness of virtual phase information: update on recognizing persons by iris patterns," International Journal of Computer Vision, vol. 45, No. 1, 2001, pp. 25-38.

Daugman, J., "The importance of being random: statistical principles of iris recognition," Pattern Recognition, vol. 36, 2003, pp. 279-291.

Chinese Application No. 200810131277.2, Letter dated May 27, 2010 enclosing Notice of Grant dated May 17, 2010, 4 pages.

Adams, et al., "Enhancements in the Optimisation Process in Lens Design (II)" Proceedings Of the SPIE, Current Developments in Lens Design and Optical Engineering II, vol. 4441, Dec. 2001, pp. 37-42.

Alter-Gartenberg, "Information Metric As a Design Tool For Optoelectronic Imaging Systems" Applied Optics. vol. 39, No. 11, Apr. 10, 2000, pp. 1743-1760.

Bradburn, Sara, et al. "Realizations of Focus Invariance In Optical-Digital Systems with Wave-Front Coding" Applied Optics, Optical Society of America, Washington, US. vol. 36, No. 5, pp. 9157-9166, Dec. 10, 1997.

Daugman, John, "Demodulation by Complex-Valued Wavelets for Stochastic Pattern Recognition", International Journal of Wavelets, Multiresolution and Information Processing, pp. 1-17, vol. 1, Jan. 14, 2003.

Dowski et al. "Aberration Invariant Optical/Digital Incoherent Systems", Optical Review, vol. 3, No. 6A, Sep. 30, 1996, pp. 429-432.

Dowski et al., "Wavefront Coding for Detection and Estimation with a Single-Lens Incoherent Optical System", Proceedings of the International Conference on Acoustics, Speech and Signal Processing (ICASSP), May 1995, vol. 4, conf. 20, pp. 2451-2454.

Dowski, Jr. et al., "Wavefront Coding: jointly optimized optical and digital imaging systems," Visual Information Processing IX, S.K. Park and Z. Rahman, ed., Proc. SPIE vol. 4041 (2000), pp. 114-120.

Dowski, Jr., Edward, et al. "Marrying Optics & Electronics," Spie's OE Magazine, pp. 42-43, Jan. 2002.

Eun et al., "An efficient 2-D convolver chip for real-time image processing", Proceedings of the Design Automation Conference 1998 (IEEE), pp. 329-330.

Johnson et al., "Computational Imaging Design Tools and Methods," SPIE, Jul. 1, 2004, pp. 5524-5531.

Kubala et al., "Reducing Complexity in Computational Imaging Systems," Optics Express, vol. 11, No. 18, Sep. 8, 2003, pp. 2102-2108.

Van Der Gracht et al., "Broadband behavior of an optical-digital focus-invariant system," Opt. Lett., vol. 21 (13), Jul. 1, 1996, pp. 919-921.

Poon, et al., "Optical/digital incoherent image processing for extended depth of field", Appl. Opt. vol. 26 (21), Nov. 1, 1987, pp. 4612-4615.

Related European Application Serial No. 03711338, 109 and 110 Notice dated Oct. 5, 2004.

Related European Application Serial No. 03711338, Article 92(2) issued Oct. 14, 2005.

Related European Application Serial No. 03711338, Notice of Grant issued May 15, 2007.

Related European Application Serial No. 03711338, Preliminary Amendment filed upon entry dated Sep. 8, 2004.

Related European Application Serial No. 03711338, Response to 109 and 110 Notice filed Nov. 5, 2004.

Related European Application Serial No. 03711338, Response to 92(2) filed Apr. 21, 2006.

Related PCT Application Serial No. PCT/US03/06289, International Search Report dated Jul. 15, 2003.

Response to Notification Concerning Informal Communication in related application PCT/US2004/040218 dated Apr. 13, 2006.

Response to Written Opinion in related application PCT/US2004/040218 dated Nov. 3, 2005.

Schuhmann, et al., "Enhancements In The Optimisation Process In Lens Design (I)" Proceedings of the SPIE, Current Developments In Lens Design and Optical Engineering II, vol. 4441, Dec. 2001, pp. 30-38.

Van Den Berg, "Wavefront Coding Keeps a Focus on Applications", Opto & Laser Europe, Oct. 2003, http://optics.org/articles/ole/8/10/5.

Dowski et al., "Wavefront Coding: A Modern Method of Achieving High Performance and/or Low Cost Imaging Systems", Proceedings of the SPIE, vol. 3779, Jul. 1999, pp. 137-145.

Van Der Gracht, J., et al.: "Iris Recognition With Enhanced Depth-Of-Field Image Acquisition," Visual Information Processing XIII Apr. 15-16, 2004, Orlando, Florida, Proceedings Of the SPIE, The International Society for Optical Engineering vol. 5438, No. 1, pp. 120-129, Jul. 2000.

Wach, Hans B., et al. "Channel Reduction and Applications to Image Processing," Applied Optics, Optical Society of America, Washington, US. vol. 37, No. 23, pp. 5359-5367, Apr. 10, 2000.

Wach, Hans B., et al. "Control of Chromatic Focal Shift Through Wave-Front Coding." Applied Optics, Optical Society of America, Washington, US. vol. 37, No. 23, pp. 5359-5367, Aug. 10, 1998.

Wach, Patrick, Informal Communication in related application PCT/US2004/040218 dated Mar. 16, 2006.

Wach, Patrick, International Preliminary Report on Patentability in related application PCT/US2004/040218 dated May 24, 2006.

Wach, Patrick, International Search Report and Written Opinion issued in related application PCT/US2004/040218, dated Aug. 11, 2005.

Ward, Seamus; European Office Action issued in related application EP 04812670.0, dated Mar. 16, 2007.

European Application No. EP 04812670, Reply to Examination Report, Sep. 18, 2007, 68 pages.

European Application No. EP 04812670, Examination Report, Sep. 11, 2008, 4 pages.

European Application No. EP 06851443, Examination Report, Jun. 3, 2008, 3 pages.

Application No. PCT/US05/32799, International Search Report & Written Opinion, Dec. 12, 2006, 8 pages.

Application No. PCT/US05/32799, International Preliminary Report on Patentability, Mar. 13, 2007, 6 pages.

Application No. PCT/US07/63423, International Search Report & Written Opinion, Oct. 10, 2007, 12 pages.

Application No. PCT/US07/63423, International Preliminary Report on Patentability, Sep. 9, 2008, 8 pages.

Application No. PCT/US07/63423, Invitation to Pay Additional Fees & Partial Search Report, Jul. 27, 2007 5 pages.

Application No. PCT/US06/36556, International Search Report & Written Opinion, Feb. 29, 2008, 12 pages.

Application No. PCT/US06/36556, International Preliminary Report on Patentability, Mar. 25, 2008, 9 pages.

U.S. Appl. No. 11/000,819, Selected pages from Image File Wrapper, Feb. 6, 2007 through Aug. 20, 2008, 152 pages.

Chinese Application No. 200480038037X, English translation of Office action, Sep. 14, 2007, 3 pages.

Chinese Application No. 200480038037X, English translation of amended claims, Jan. 23, 2008, 3 pages.

Chinese Application No. 200480038037X, English translation of Office action, Mar. 21, 2008, 2 pages.

Plemmons, R. et al., "Computational imaging systems for iris recognition," in Proc. SPIE vol. 5559, Aug. 2004; pp. 346-357.

Zhao, W. et al., "Face Recognition: A Literature Survey," ACM Computing Surveys, vol. 35, No. 4, Dec. 2003, pp. 399-458.

Zana, Y. et al. "Face Recognition Based on Polar Frequency Features," ACM Transactions on Applied Perception, vol. 3, No. 1, Jan. 2006.

Narayanswamy R. et al., "Extending the imaging volume for biometric iris recognition," Appl. Op., vol. 44, No. 5,, Feb. 2005; pp. 701-712.

Daugman, J.G. "The importance of being random: statistical principles of iris recognition," Patt. Rec., 36, 279-291 (2003).

\* cited by examiner

TASK-BASED IMAGING SYSTEMS

CROSS REFERENCE TO RELATED APPLICATIONS

This application claims the benefit of priority to U.S. Provisional Patent Application No. 60/718,522, filed 19 Sep. 2005 and entitled "Iris Recognition at a Large Standoff Distance," and U.S. Provisional Patent Application No. 60/779,712, filed 6 Mar. 2006 and entitled "Zoom Lens Systems with Wavefront Coding." This application is also a continuation-in-part of commonly-owned and copending U.S. patent application Ser. No. 11/225,753 entitled "Iris Image Capture Devices and Associated Systems" and filed 13 Sep. 2005 now U.S. Pat. No. 7,652,685, which claims priority to U.S. Provisional Patent Application No. 60/609,445, filed 13 Sep. 2004 and entitled "Iris Recognition Security for Camera Phones, Digital Cameras and Personal Digital Assistants." This application is also a continuation-in-part of U.S. patent application Ser. No. 11/000,819, filed 1 Dec. 2004 now U.S. Pat. No. 7,469,202 and entitled "System and Method for Optimizing Optical and Digital System Designs," which claims priority to U.S. Provisional Patent Application No. 60/526,216, filed on 1 Dec. 2003 and entitled "Designing Optical Imaging Systems with Wavefront Coding Elements." Each of the aforementioned patent applications is expressly incorporated herein by reference in its entirety.

U.S. patent application Ser. No. 10/810,446, filed 25 Mar. 2004 and entitled "Mechanically-Adjustable Optical Phase Filters for Modifying Depth of Field, Aberration-Tolerance, Anti-Aliasing in Optical Systems" and PCT Patent Application Serial No. PCT/US06/09958 filed 20 Mar. 2006 and entitled "Imaging Systems with Pixelated Spatial Light Modulators" are expressly incorporated herein by reference in their entireties.

The following U.S. Patents are expressly incorporated by reference in their entireties: U.S. Pat. No. 5,748,371, entitled "Extended Depth of Field Optical Systems" to Cathey et al.; U.S. Pat. No. 6,525,302, entitled "Wavefront Coding Phase Contrast Imaging Systems" to Dowski, Jr., et al.; U.S. Pat. No. 6,873,733, entitled "Combined Wavefront Coding and Amplitude Contrast Imaging Systems" to Dowski, Jr.; U.S. Pat. No. 6,842,297, entitled "Wavefront Coding Optics" to Dowski, Jr.; U.S. Pat. No. 6,911,638, entitled "Wavefront Coding Zoom Lens Imaging Systems" to Dowski, Jr., et al.; and U.S. Pat. No. 6,940,649, entitled "Wavefront Coded Imaging Systems" to Dowski, Jr.

U.S. GOVERNMENT RIGHTS

A portion of the embodiments disclosed herein was made with Government support under a subcontract of grant number DAAD 19-00-1-0540, granted by the Army Research Office to Wake Forest University. The Government has certain rights herein.

BACKGROUND

One goal of a task-based imaging system may be to provide task-specific information or image data for one or more signal-processing tasks. Such tasks may include biometric iris recognition, biometric face recognition, biometric recognition for access control, biometric recognition for threat identification, barcode reading, imaging for quality control in an assembly line, optical character recognition, biological imaging, automotive imaging for object detection and fiducial mark recognition for registration of objects during automated assembly. The above-mentioned biometric recognition tasks, for instance, may be executed by task-based imaging systems for security or access purposes. As an example, biometric iris recognition can provide human identification with very high accuracy when optical and digital portions of such a task-based imaging system provide image data that is detailed enough and has a high enough signal-to-noise ratio ("SNR").

The performance of a task-based imaging system is known to be directly related to an SNR of image data that is required for successful completion of the task. The SNR is in turn related to the characteristics of the imaging system. Characteristics that affect system performance include spherical and other aberrations, defocus, variations in magnification, depth of field, chromatic aberration, alignment tolerances, dynamic vibrations and temperature variations. These characteristics can cause the system to have a task-specific SNR that is smaller than that of a diffraction-limited system.

Certain systems described in the prior art perform iris recognition at short distances, using small apertures; see, for example, R. Plemmons et al., "Computational imaging systems for iris recognition," in Proc. SPIE, August 2004. However, while such systems are effective for short standoff distances, they may use small lens apertures, which lead to low signal levels (i.e., low SNR) and relatively low resolution; such systems may not be suitable for longer standoff distances.

SUMMARY

In one embodiment, a task-based imaging system for obtaining data regarding a scene for use in a task includes an image data capturing arrangement for (a) imaging a wavefront of electromagnetic energy from the scene to an intermediate image over a range of spatial frequencies, (b) modifying phase of the wavefront, (c) detecting the intermediate image, and (d) generating image data over the range of spatial frequencies. The task-based imaging system also includes an image data processing arrangement for processing the image data and performing the task. The image data capturing and image data processing arrangements cooperate so that signal-to-noise ratio (SNR) of the task-based imaging system is greater than SNR of the task-based imaging system without phase modification of the wavefront over the range of spatial frequencies.

In another embodiment, a task-based imaging system for obtaining data regarding a scene for use in a task includes at least one optical element for (a) imaging a wavefront of electromagnetic energy from the scene to an intermediate image and (b) modifying phase of the wavefront, and a detector for detecting the intermediate image and for generating image data over a range of spatial frequencies. The optical element is configured for cooperating with the first detector so that the SNR of the task-based imaging system is greater than SNR of the task-based imaging system without phase modification of the wavefront over the range of spatial frequencies. In an embodiment, the task is selected as at least one of biometric iris recognition, biometric face recognition, biometric recognition for access control, biometric recognition for threat identification, barcode reading, imaging for quality control in an assembly line, optical character recognition, biological imaging and automotive imaging for object detection.

In a further embodiment, a method for generating an output image of a scene captured by a detector of a task-based imaging system is disclosed. The detector includes a plurality of pixels and the scene including at least one object located at a given object distance within a range of object distances, which object distance is defined as a distance between the object and the task-based imaging system. The method includes capturing a high resolution image of the scene over a range of spatial frequencies, converting the high resolution image into an image spectrum of the scene, determining a defocused optical transfer function (OTF) of the task-based imaging system over the range of object distances, and determining a pixel modulation transfer function (MTF) over the plurality of pixels of the detector. The method further includes multiplying the image spectrum with the OTF and the MTF to generate a modified image spectrum of the scene, converting the modified image spectrum into a modified image of the scene, and generating the output image from the modified image.

In still another embodiment, a method for use with a task-based imaging system includes imaging electromagnetic energy from a scene to an intermediate image of the task-based imaging system, modifying phase of a wavefront of the electromagnetic energy, detecting the intermediate image, and generating image data over a range of spatial frequencies, based on the intermediate image so detected such that SNR of the task-based imaging system is greater than SNR of the task-based imaging system without modifying phase over the range of spatial frequencies.

In yet another embodiment, a method for optimizing the task-based imaging system for obtaining data regarding a scene for use in a task over a range of object distances is disclosed. The scene includes at least one object located within the range of object distances, which object distance is defined as a distance between the object and the task-based imaging system. The method includes: 1) determining a target SNR of the task-based imaging system; 2) specifying a set of pupil function parameters and a merit function; 3) generating a new set of pupil function parameters based on the merit function so specified; 4) determining SNR over a range of object distances; 5) comparing the SNR to a target SNR; and 6) repeating steps 2) through 5) until the SNR is at least equal in value to the target SNR.

In a further embodiment, an improvement in a task-based imaging system for obtaining data regarding a scene for use in a task is disclosed. The task-based imaging system includes at least one optical element, for imaging a wavefront of electromagnetic energy from the scene to an intermediate image, and a detector for detecting the intermediate image and for generating image data over a range of spatial frequencies. The improvement includes a phase modification element for modifying phase of the wavefront such that the SNR of the task-based imaging system is greater than a SNR of the task-based imaging system without the phase modification element.

BRIEF DESCRIPTION OF THE DRAWINGS

The present invention may be understood by reference to the following detailed description taken in conjunction with the drawings briefly described below.

DETAILED DESCRIPTION OF DRAWINGS

Figure 1:
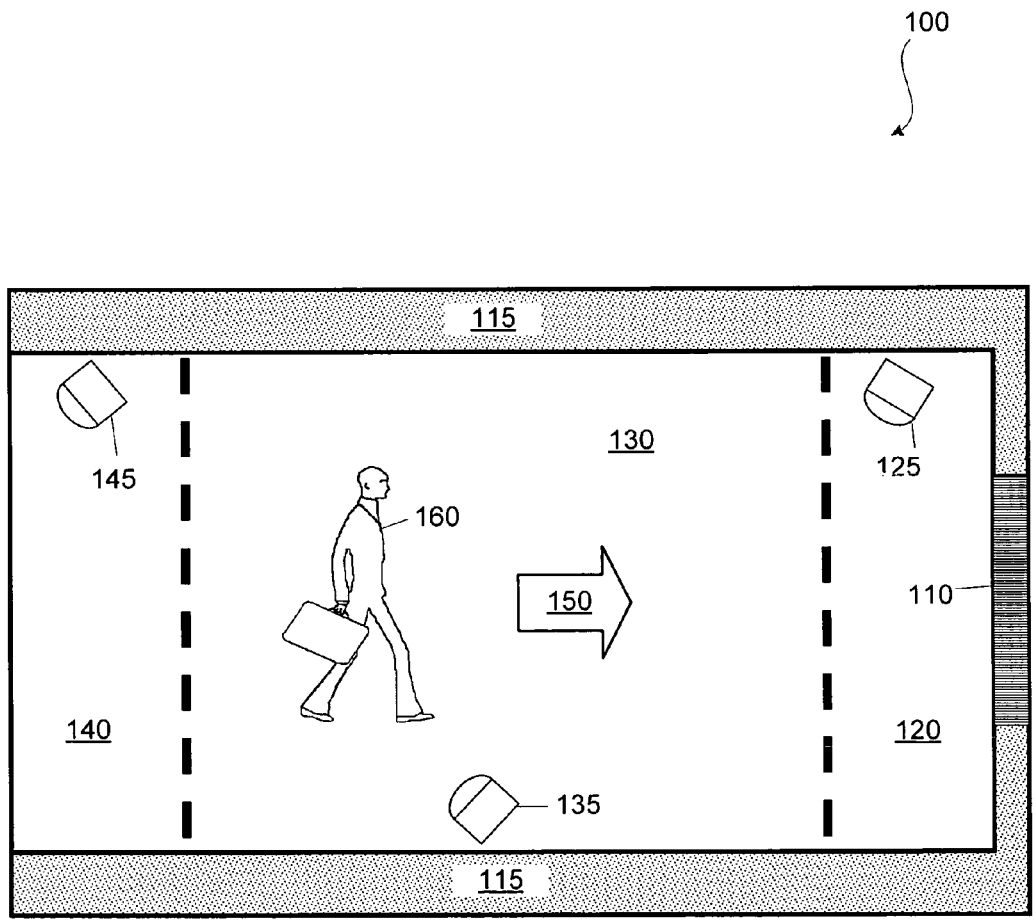
FIG. 1 illustrates a security scene wherein task-based imaging systems may be used in accordance with the present disclosure.

Wavefront coding ("WFC") enables high quality imaging over a range of optical aberrations including defocus; for example, WFC may enable an imaging system to provide an image that is in focus over a wide range of standoff distances. One combination of WFC and biometric iris recognition at short distances between a handheld device and an iris is disclosed in U.S. Provisional Patent Application No. 60/609,445 and U.S. patent application Ser. No. 11/225,753.

Wavefront coding and related methods, such as certain computational imaging methods, may reduce certain effects of system characteristics such as spherical and higher order aberrations, defocus, magnification, depth of field, chromatic aberration, alignment tolerances, dynamic vibrations and temperature variations. In WFC, the pupil function of the imaging system is modified in a way that maintains a system's ability to capture image data over a large range of variation of these characteristics. Additionally, WFC may be able to supply a visually acceptable (e.g., to a human viewer) image while providing the image data to be used in a specific signal-processing task It is noted that, for purposes of illustrative clarity, certain elements in the drawings may not be drawn to scale.

FIG. 1 shows a security scene 100 wherein task-based imaging systems may be used. Within the scope of this disclosure, imaging system may be understood as any combination of cameras, system(s) of cameras, one or more cameras and controller(s), camera(s) with associated optical elements (lenses, etc.) and/or processors (e.g., processors or computers, optionally configured with software) that are required for the task-based imaging application. Within security scene 100, a subject 160 is approaching a controlled access-point (e.g., a door) 110 from a direction 150 (indicated by an arrow). Subject 160 must pass through three different zones 140, 130 and 120 defined within walls 115 to reach access point 110. In each zone 120, 130 and 140, there may be placed one or more imaging systems such as an image data capturing arrangement 125 in zone 120, an image data capturing arrangement 135 in zone 130 and an image data capturing arrangement 145 in zone 140. Each image data capturing arrangement may perform single or multiple functions; alternatively, all imaging systems may perform the same function. Each one of image data capturing arrangements images a wavefront of electromagnetic energy from the scene to an intermediate image, modifies phase of the wavefront, detects the intermediate image, and generates image data over a range of spatial frequencies of interest. An exemplary function that all imaging systems may perform is to biometrically identify subject 160. Such biometric identification may include iris recognition and/or face recognition. Also, optionally, subject 160 may carry a badge or another item (not shown) that may be identified by text or barcode recognition. Although security scene 100 and image data capturing arrangements 125, 135 and 145 are discussed hereinafter with regard to specific types of electromagnetic energy sensitive sensors (such as, but not limited to, infrared (IR), long-wave infrared (LWIR), red-green-blue visible (RGB), etc.), it may be understood by those skilled in the art that actual wavelengths of the electromagnetic spectrum used by the image data capturing arrangement may vary. For example an image data capturing arrangement that is generally designated an IR system may respond to visible light, near infrared (NIR), mid-wave infrared (MWIR), or LWIR. Imaging systems may also be designed to use narrow or wide wavelength bands as required by the task to be performed. When imaging electromagnetic energy including a wavelength range, each one of image data capturing arrangements 125, 135 and 145 may include imaging and wavefront coding optics suitable for imaging and modifying phase in different portions of the wavelength range.

When subject 160 is far from an imaging system, subject 160 is said to be in the far field of that imaging system, such as when subject 160 is in zone 140 and is being observed by image data capturing arrangement 125. In the far field, subject 160 is far enough away from the pupil of the image data capturing arrangement that an image of subject 160 taken by image data capturing arrangement 125 is nearly free of wavefront aberration errors; in such a case, wavefront coding may not be necessary to extend the depth of field. However, wavefront coding may still be incorporated into the image data capturing arrangement in order to correct for aberrations potentially caused by operating the image data capturing arrangement at high magnification. For example, a modulation element for modifying the phase of the wavefront (i.e., wavefront coding) may be incorporated into the image data capturing arrangement such that one or more of image aberrations in the task-based imaging system are reduced in comparison to the task-based imaging system without the modulation element. If not corrected, such aberrations may degrade SNR of spatial frequencies of interest that are required to successfully complete a task. In some situations, high magnification (i.e., zoom) may be required to select the area (e.g., eyes or face) for recognition of subject 160 from a larger imaged area of security scene 100.

At close ranges, depth of field within an image of subject 160 becomes very sensitive to wavefront aberration errors and may benefit from use of WFC to achieve good depth of field and a SNR, at the spatial frequencies of interest, required for recognition. An example of such a situation is when subject 160 passes within 2 to 4 meters of an image data capturing arrangement such as image data capturing arrangement 135 in security scene 100. In this case, to biometrically identify subject 160, image data capturing arrangement 135 may be required to track a moving target and to automatically adjust the magnification and depth of field, and to maintain a SNR of the spatial frequencies of interest required for recognition.

At intermediate distances between subject 160 and an image data capturing arrangement (e.g., one of imaging systems 125, 135 and 145) there may be greater depth of field and lower required magnifications than for close distances. These intermediate distances may require intermediate degrees of wavefront coding to maintain the required SNR of the spatial frequencies of interest for recognition. Imaging systems 145, 135 and 125 may cooperate successively or in parallel to track, isolate the face or eyes of and then biometrically identify subject 160. Access point 110 may then respond automatically to a positive biometric recognition by one or more imaging systems 145, 135 and 125, and permit access by subject 160. Alternatively, access point 110 may deny access based on a positive biometric recognition of subject 160 as a threat.

Figure 2:
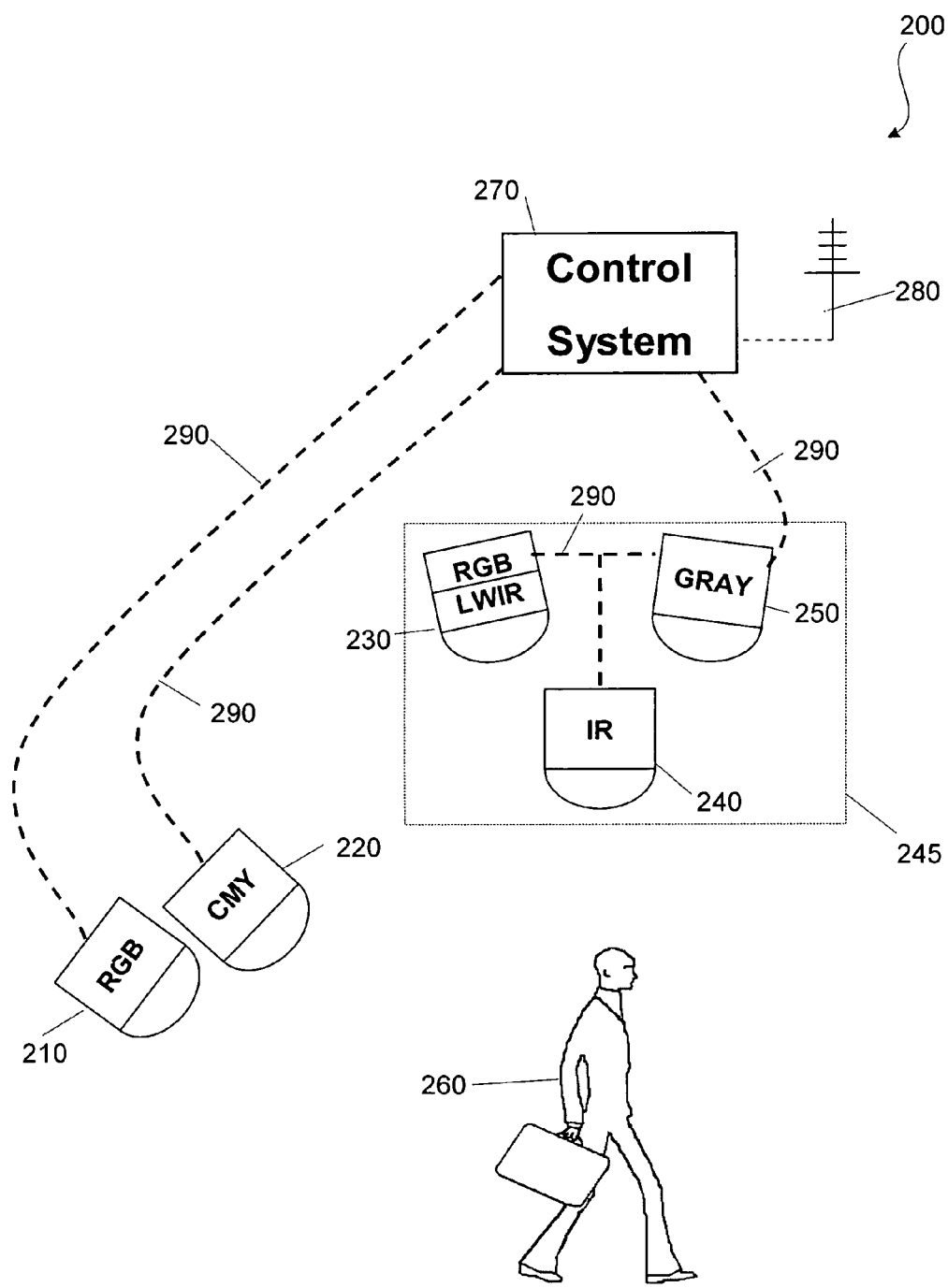
FIG. 2 illustrates a security scene showing co-operational, multifunction task-based imaging systems in accordance with the present disclosure.

FIG. 2 shows a security scene 200 showing co-operational, multifunction task-based imaging systems. Multi-channel, multi-optic imaging systems 210 and 220 may provide preview and oblique views of a subject 260 with security scene 200. Imaging systems 210 and 220 may be, for example, color visible electromagnetic energy imaging devices such as RGB and CMY imagers. Preview information provided by imaging systems 210 and 220 may be communicated by wired (or wireless) pathways 290 to a centralized database, communications and control system 270. Control system 270 may include wireless communication facility 280 for connection to other systems (not shown). In place of or in addition to imaging systems such as 220, control system 270 may directly control access and may keep records of access, such as time-stamped records of subjects. These control systems and/or imaging systems may also include a data storage unit for storing information such as records of access and human viewable images while simultaneously providing recognition data or other output.

Preview information may be used to prepare an interrogation system for access control event. Preview information may include, but is not limited to, such data as a low resolution image wherein a subject 260 has been physically located but has not been biometrically recognized. Preview information may be transferred from, for instance, imaging systems 210 or 220 to a multi-optic imaging system assembly 245 that includes imaging systems 230, 240 and 250 for further interrogation such as biometric recognition. Imaging system 230 may be, for instance, a multi-channel imaging system forming a part of imaging system assembly 245 that may be self-regulated (e.g., communicates internally via pathways 290) to perform a dedicated task. As part of the task, imaging systems 230, 240 and 250 may transfer image data via pathways 290 to and/or from each other. Imaging system 230 may, for instance, include optics for two separate electromagnetic energy wavelength bands such as visible RGB and LWIR. Imaging system assembly 245 may also include sensors operating in the IR (corresponding to imaging system 240) and gray scale (corresponding to imaging system 250).

Figure 3:
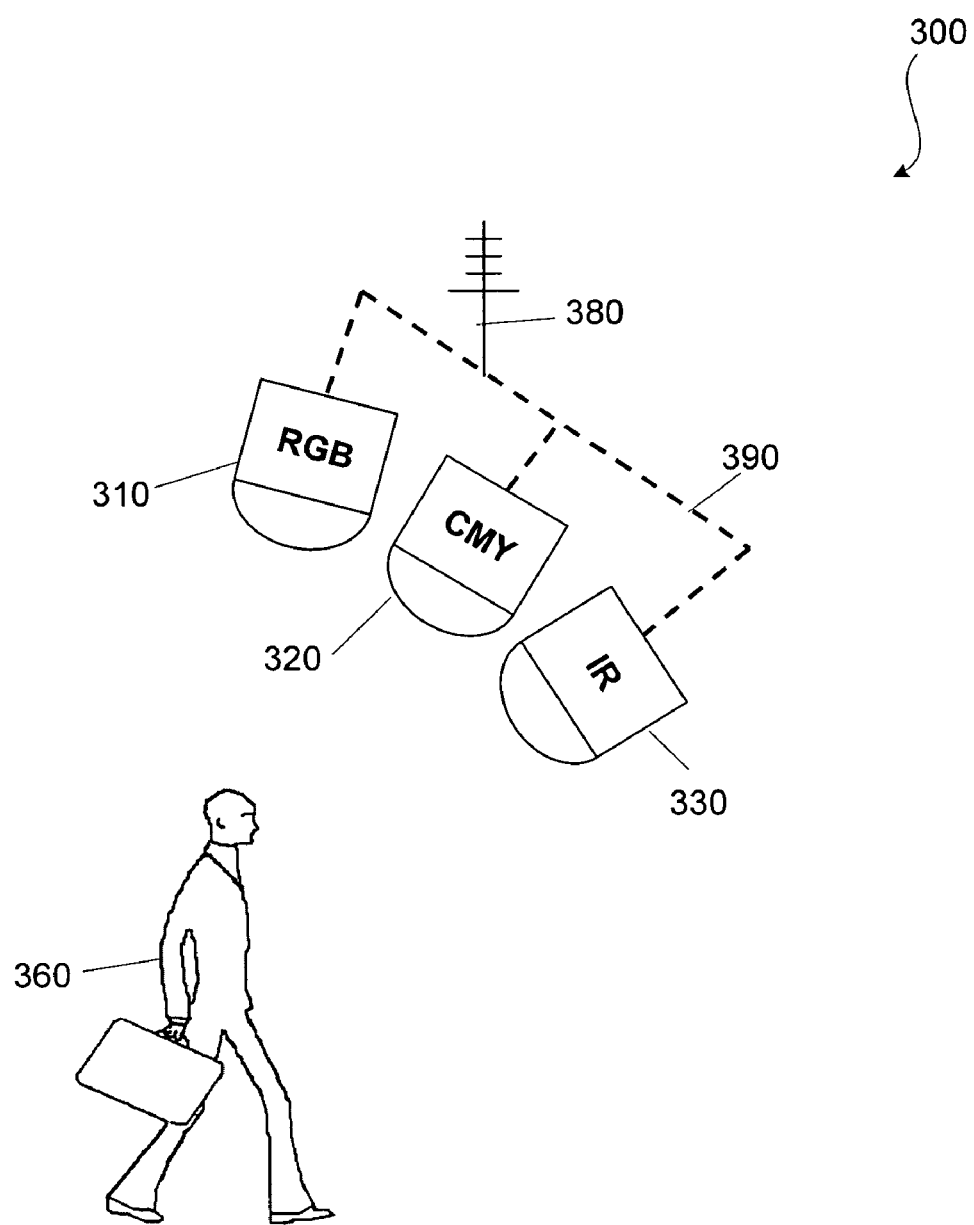
FIG. 3 illustrates a security scene showing non-permanent installation of co-operational, multifunction task-based imaging systems in accordance with the present disclosure.

FIG. 3 shows a security scene 300 showing a non-permanent installation of co-operational, multifunction task-based imaging systems 310, 320 and 330. An RGB imaging system 310, a CMY imaging system 320 and an IR imaging system 330 may cooperate to biometrically identify a subject 360. In an exemplary embodiment, imaging systems 310 and 320 provide preview information while imaging system 330 performs iris recognition. A wired (or wireless) pathway 390 provides interconnectivity for imaging systems 310, 320 and 330. A wireless communication facility 380 connects the imaging systems to other systems. Wireless, portable, multi-channel, multi-optic systems such as formed by imaging systems 310, 320 and 330, pathway 390 and communication facility 380 may be used, for example, in applications such as temporary security.

Figure 4:
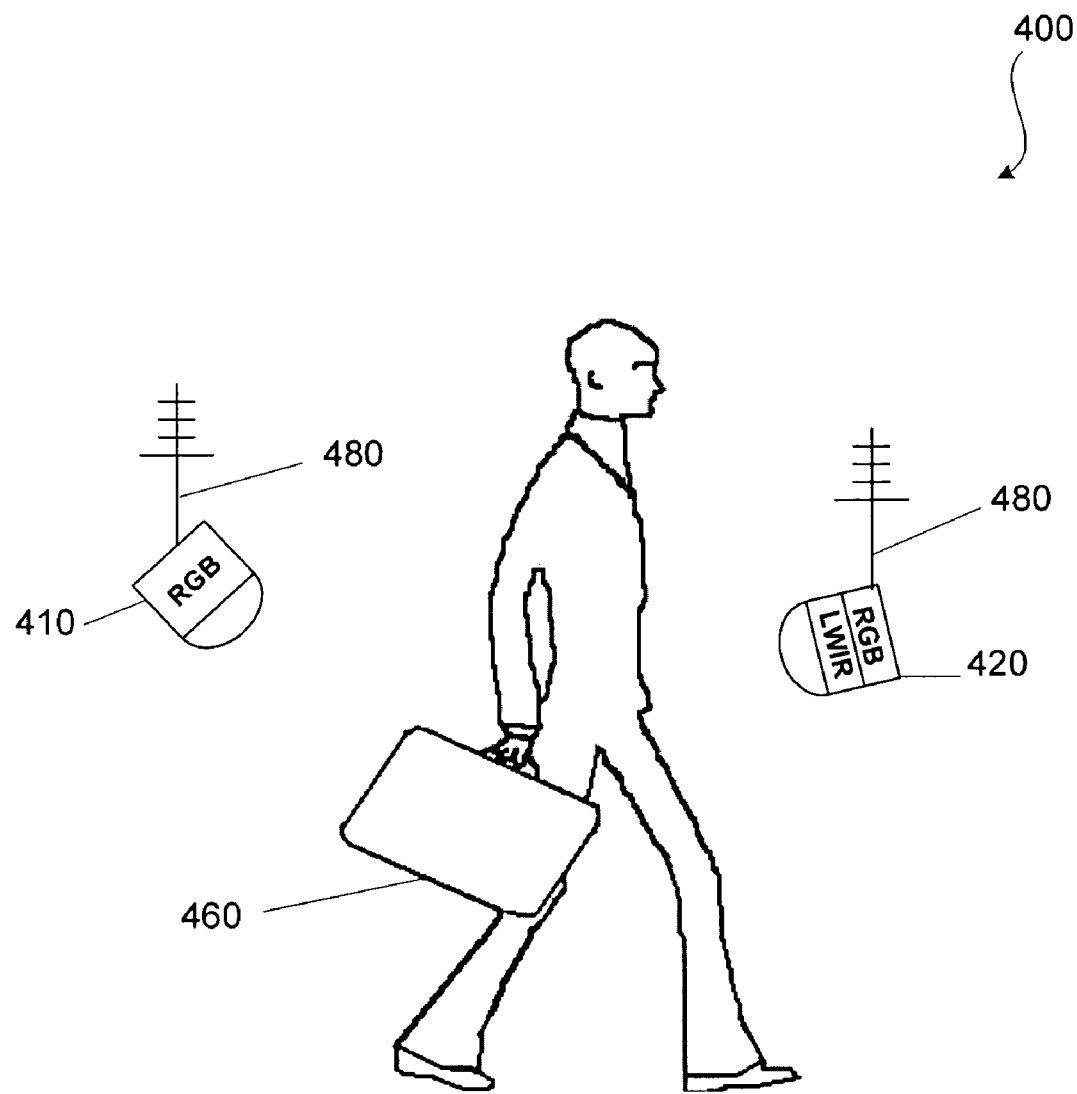
FIG. 4 illustrates a security scene showing handheld multifunction task-based imaging systems in accordance with the present disclosure.

FIG. 4 shows a schematic diagram of a security scene 400 including handheld multifunction task-based imaging systems 410 and 420. Imaging systems 410 and 420 are positioned to view a subject 460. Imaging system 410 may be, for instance, a handheld portable single channel unit for low cost (e.g., a cost low enough to be considered disposable) and may be applied in unstable security installations. Imaging system 410 may also permit wireless communications via wireless communication configuration 480. Imaging system 420 may be a handheld portable multi-channel device for identification and recording use with a wireless communication configuration 480. Imaging systems 410 and 420 may be designed to be lightweight, ruggedized and tolerant of extreme temperatures during use and storage conditions.

Discussed immediately hereinafter in association with FIGS. 5-15 are multiple applications of task-based imaging in accordance with the present disclosure. An exemplary task-based imaging application regarding iris recognition is discussed in detail in association with FIGS. 5 and 16-39. The methods, procedures, and apparatus discussed herein below with respect to iris recognition may be adapted to the design, optimization and use of other task-based imaging systems such as those discussed in association with FIGS. 5-15, namely, biometric face recognition, biometric recognition for access control, biometric recognition for threat identification, barcode reading, imaging for quality control in an assembly line, optical character recognition, biological imaging and automotive imaging for object detection.

Figure 5:
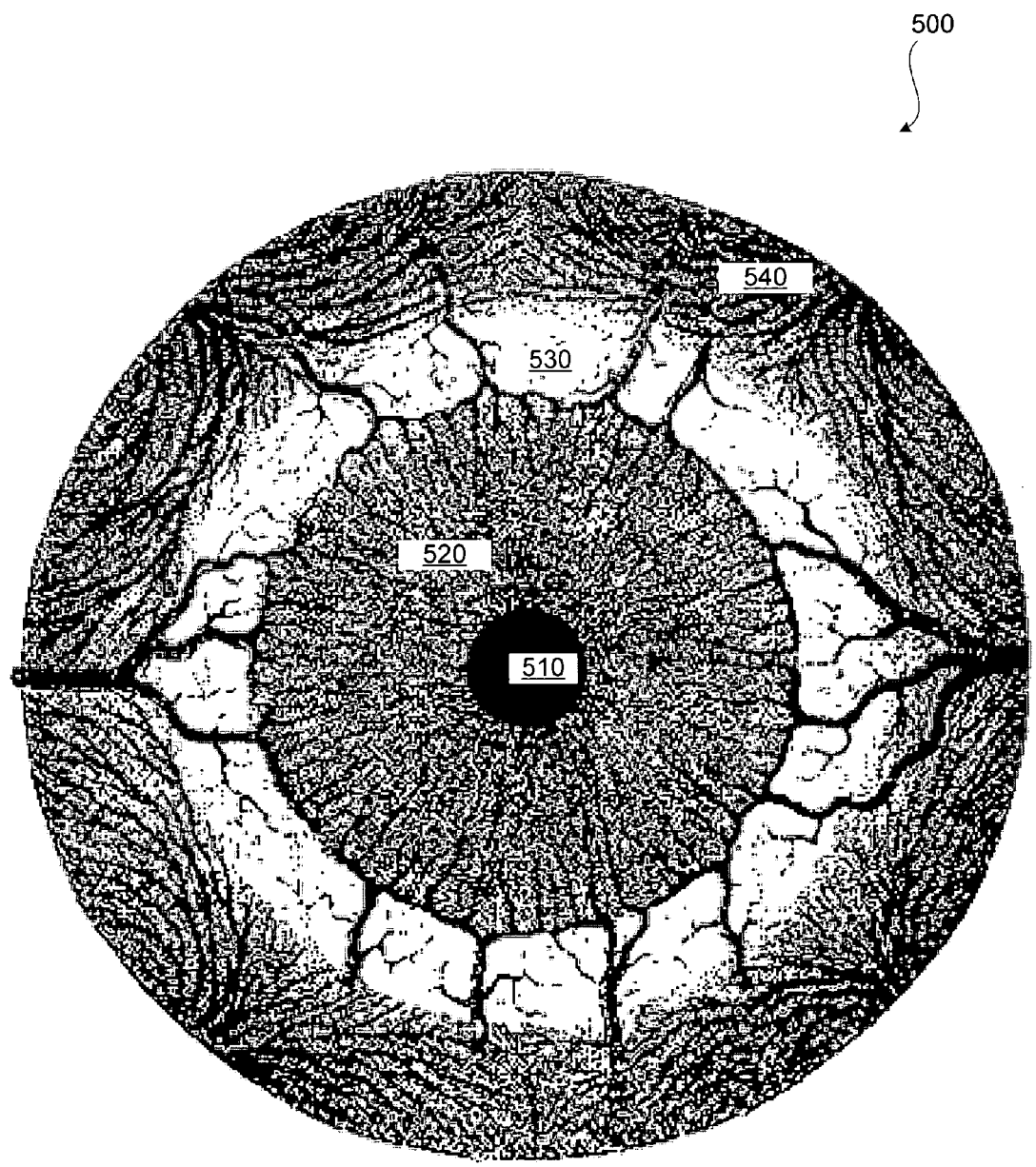
FIG. 5 is an illustration of part of a human eye including features of interest for biometric recognition.

As an example of tasked-based biometric imaging, attention is directed to FIG. 5, which is an illustration of a part of a human eye 500. Human eye 500 includes a pupil region 510, an iris region 520, a ciliary muscle region 530 and a choroid region 540. It is known that iris region 520 is unique between humans and may be used to identify individuals with a high degree of accuracy. Iris region 520 contains structures that have spatial frequencies of interest for biometric recognition that may be selectively enhanced using wavefront coding.

Figure 6:
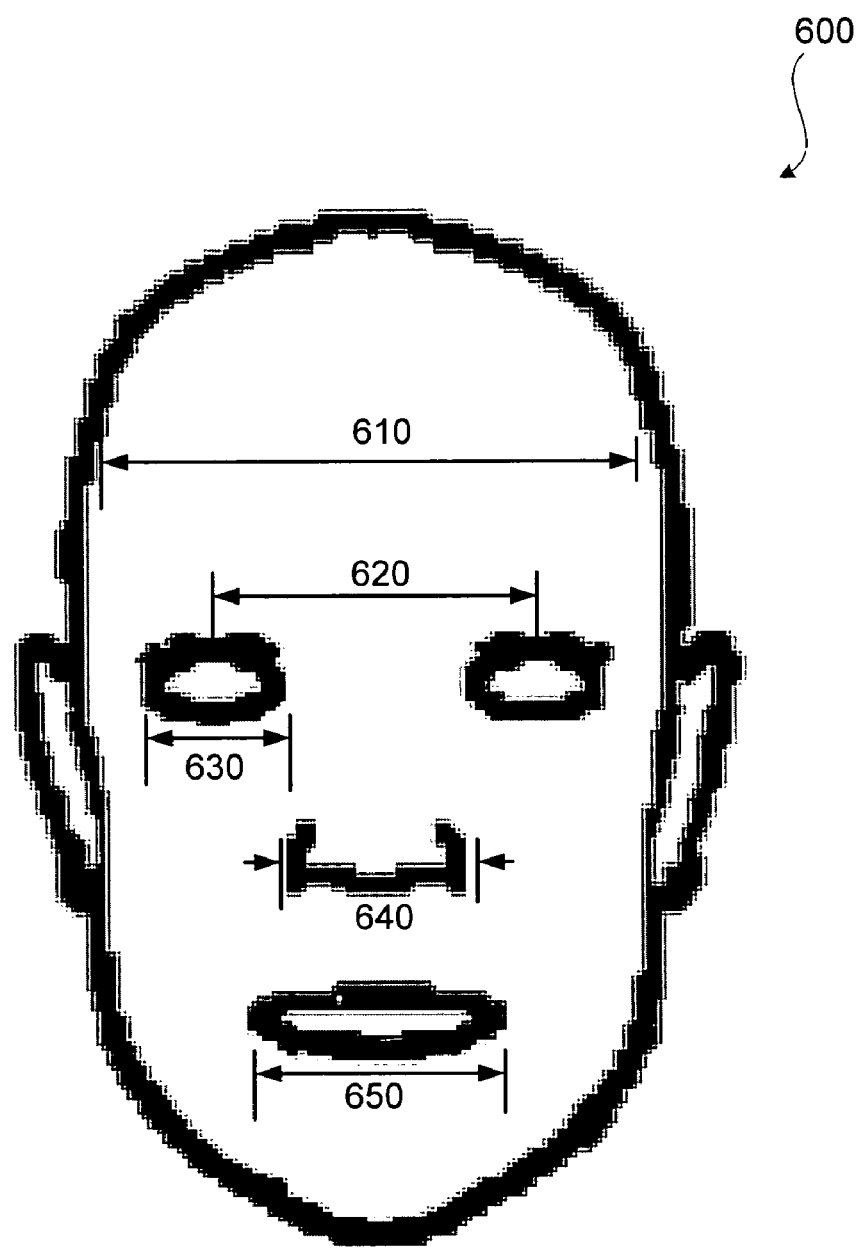
FIG. 6 is an illustration of part of a human face including features of interest for biometric recognition.

As another example of task-based biometric imaging, FIG. 6 shows an illustration of a part of a human face 600. Human faces, even among identical twins, may have distinguishing features that may be used for biometric recognition. Features such as a width 610 of a head, a spacing 620 of the eyes, a width 630 of an eye, a width 640 of a nose and a width 650 of a mouth may provide specific spatial frequencies that may be selectively enhanced using details of the present disclosure. A recent survey of the topic of face recognition is provided by W. Zhao, et al., "Face Recognition: A Literature Survey," ACM Computing Surveys, Vol. 35, No. 4, December 2003, pp. 399-458 and "Face Recognition Based on Polar Frequency Features," Y. Zana et al., ACM Transactions on Applied Perception, Vol. 3, No. 1, January 2006.

Figure 7:
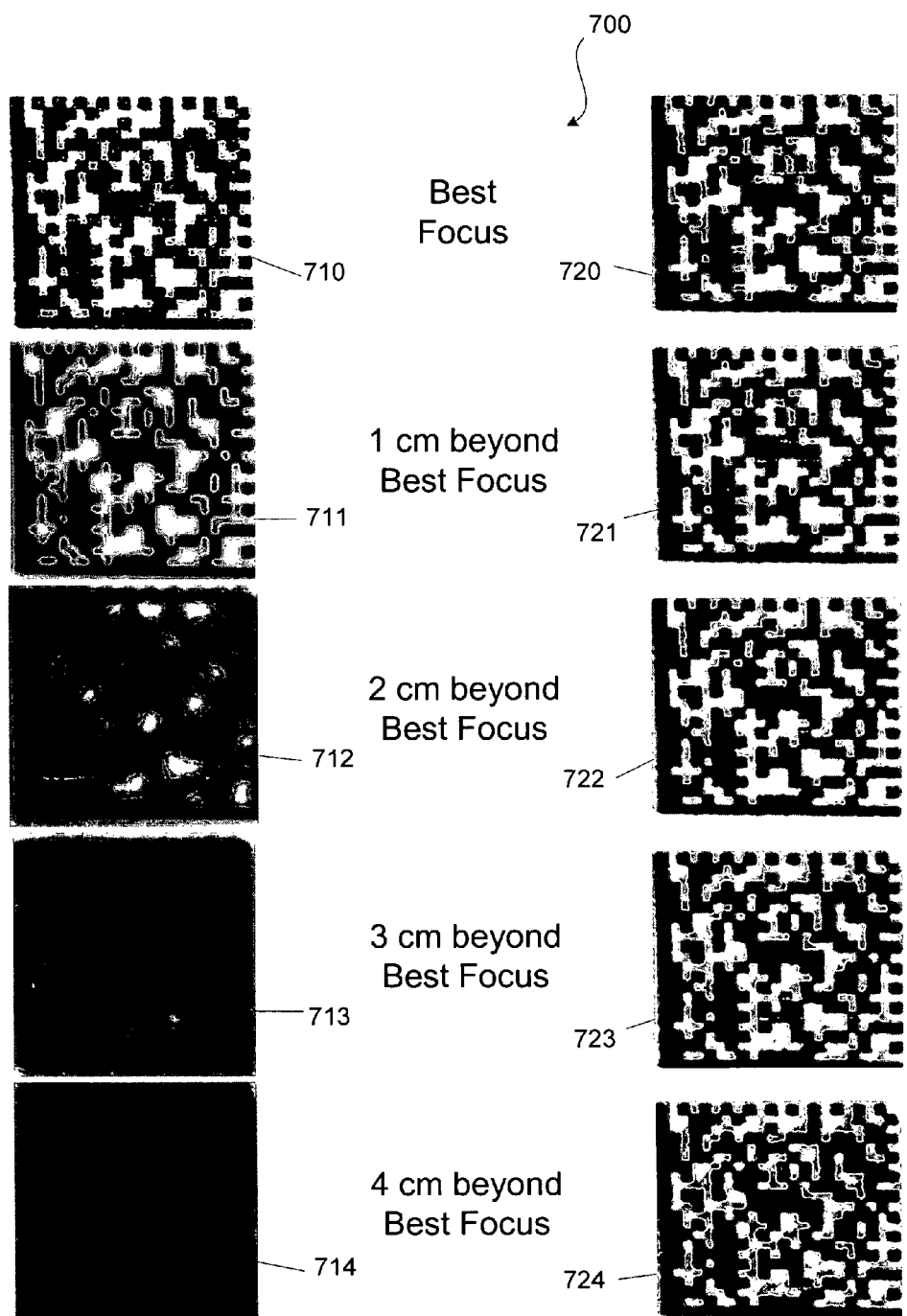
FIG. 7 is a series of images of 2-D barcodes comparing images captured with imaging systems with and without wavefront coding.

In addition to biometric imaging, other task-based imaging problems may benefit from imaging systems including wavefront coding for enhancing specific spatial frequencies. An example of such a task-based imaging problem is barcode reading. Both 1D and 2D barcodes have patterned structures that have defined periodicities and therefore specific spatial frequencies. FIG. 7 shows a series of images of 2-D barcodes comparing images captured with imaging systems with and without wavefront coding. Images 710-714 were collected from an imaging system without wavefront coding. Images 720-724 were collected from a system employing wavefront coding. The images captured by imaging systems including wavefront coding show significantly less blurring and therefore retention of spatial frequencies of interest for recognition over a larger range of distances from best focus.

Still referring to FIG. 7, when discussing non-human subjects it is common to employ terminology such as "distance from best focus" in place of a term such as "standoff distance". A difference in the terminologies may be understood such that "standoff distance" is an absolute distance and "distance from best focus" is a relative distance. That is, an equivalent standoff distance for a non-human subject may be determined by adding/subtracting the distance (beyond/inside of) best focus to the best focus distance. Images 710 and 720 were collected at best focus distances. Images 711 and 721 were collected at distances 1 cm beyond the best focus distance. Images 712 and 722 were collected at distances 2 cm beyond the best focus distance. Images 713 and 723 were collected at distances 3 cm beyond the best focus distance. Images 714 and 724 were collected at distances 4 cm beyond the best focus distance. Images 720-724 show significantly less blurring and therefore retention of spatial frequencies of interest for recognition over a larger range of distances from best focus in comparison to images 710-714 taken with the imaging system without wavefront coding.

Figure 8:
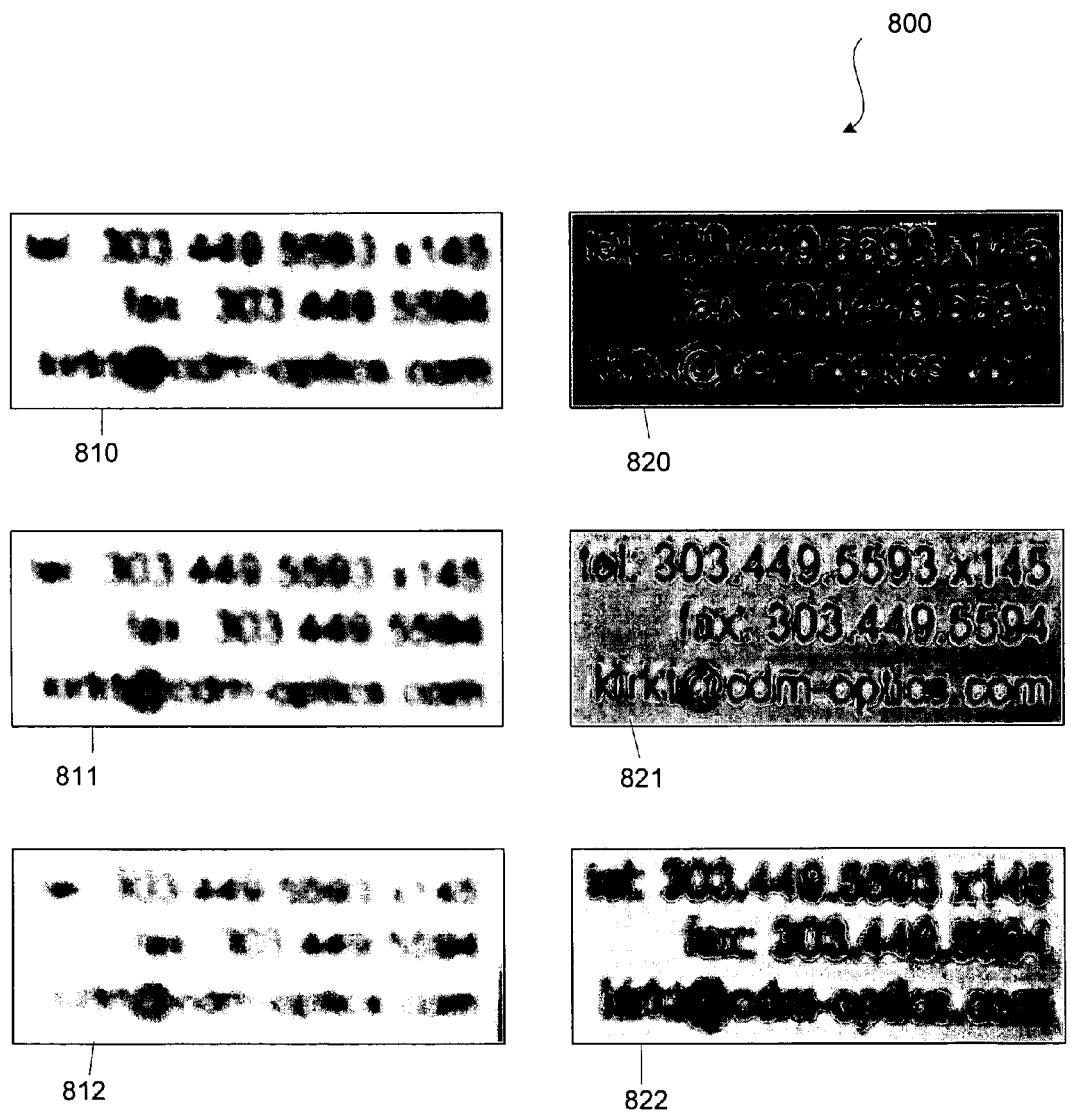
FIG. 8 is a series of gray-scale images of text comparing images captured with imaging systems with and without wavefront coding.
Figure 9:
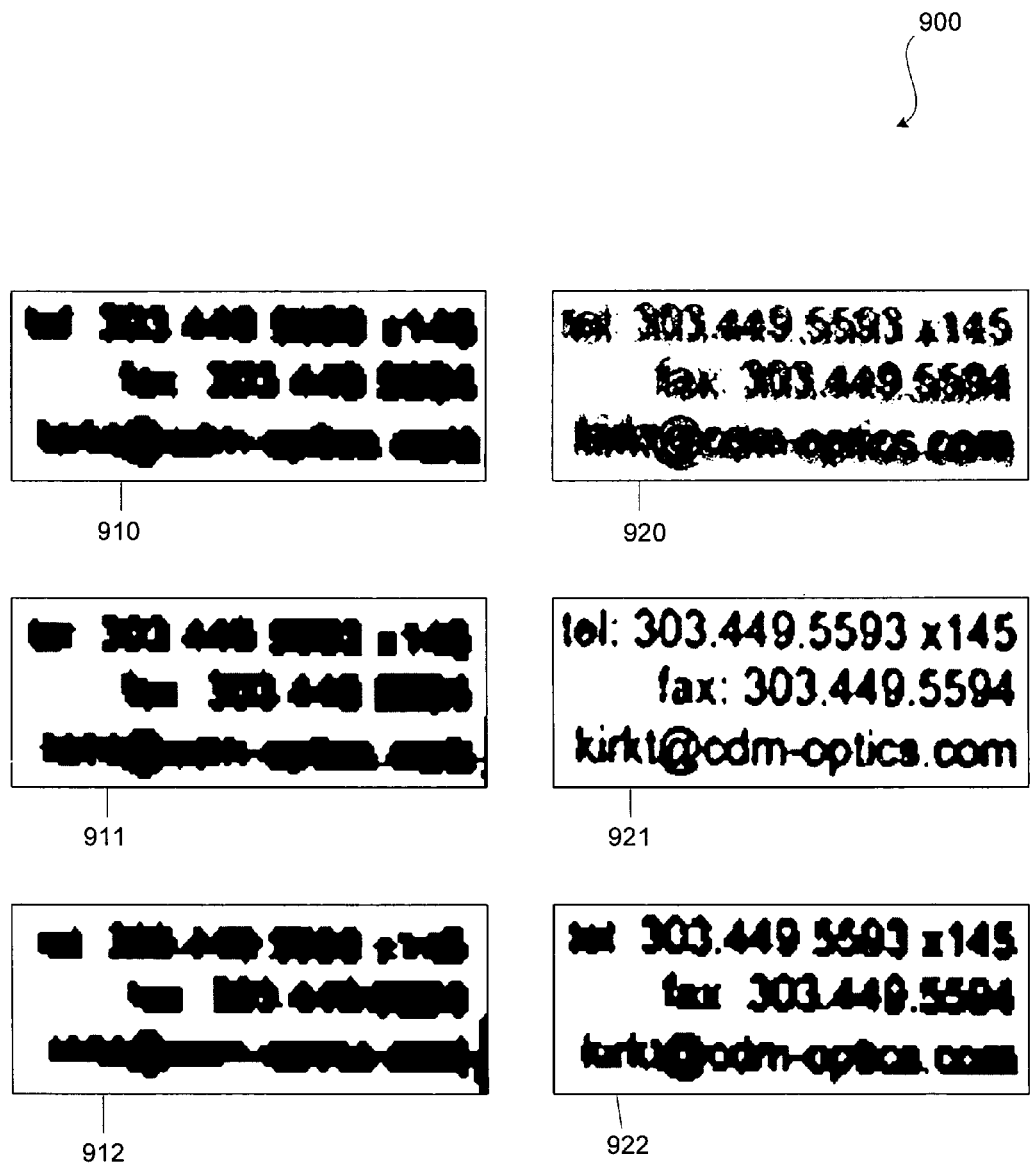
FIG. 9 is a series of binary images of text comparing images captured with imaging systems with and without wavefront coding.

FIGS. 8 and 9 show two versions of the same series of images. The set of images 800 in FIG. 8 are gray-scale images and set of images 900 of FIG. 9 are binary images. Comparing these images shows the contrast between human vision and imaging for optical character recognition. Human vision differentiates color and gray-scale. For optical characterization ("OCR"), images are processed into binary black and white images. Like barcodes, printed text has specific spatial frequencies that are related to the font, font size and typeface. Images 810-812 and 910-912 were collected using an imaging system without wavefront coding. Images 820-822 and 920-922 were collected using an imaging system employing wavefront coding. Each column of images displays related similar images captured at different distances from best focus. The top row images 810, 820, 910 and 920 were collected at distances that were 10 cm less than the best focus distance. The center row images 811, 821, 911 and 921 were collected at the best focus distance. The bottom row images 812, 822, 912 and 922 were collected at distances 20 cm greater than the best focus distance. It may be readily seen, especially in the set of binary images 900, that the images captured by the imaging system including wavefront coding exhibit enhanced spatial frequencies related to the text, in comparison to the images captured without wavefront coding. Maintaining the spatial frequencies of the text characters provides for a higher probability of optical character recognition.

Figure 10:
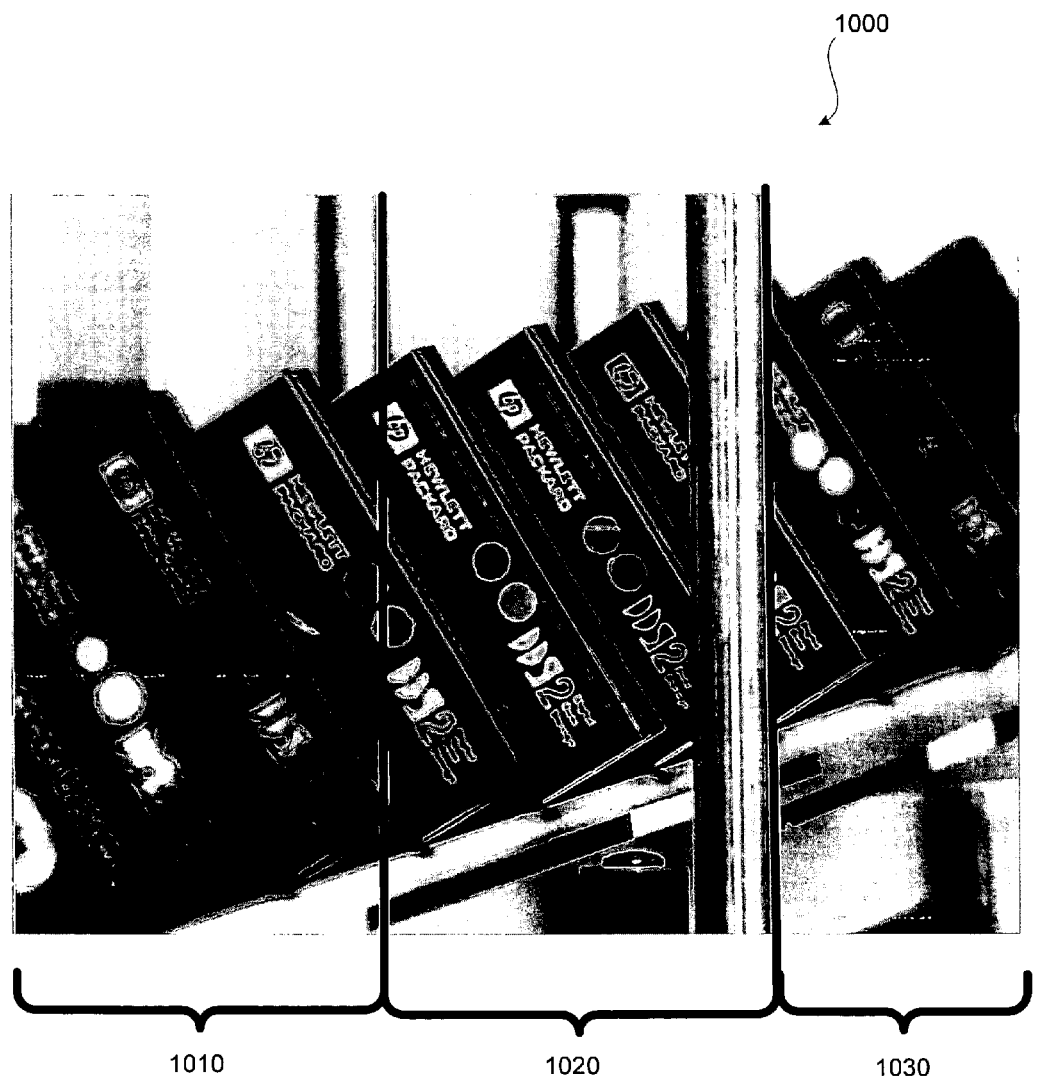
FIG. 10 is a gray-scale image of objects on an assembly line captured with an imaging system without wavefront coding.
Figure 11:
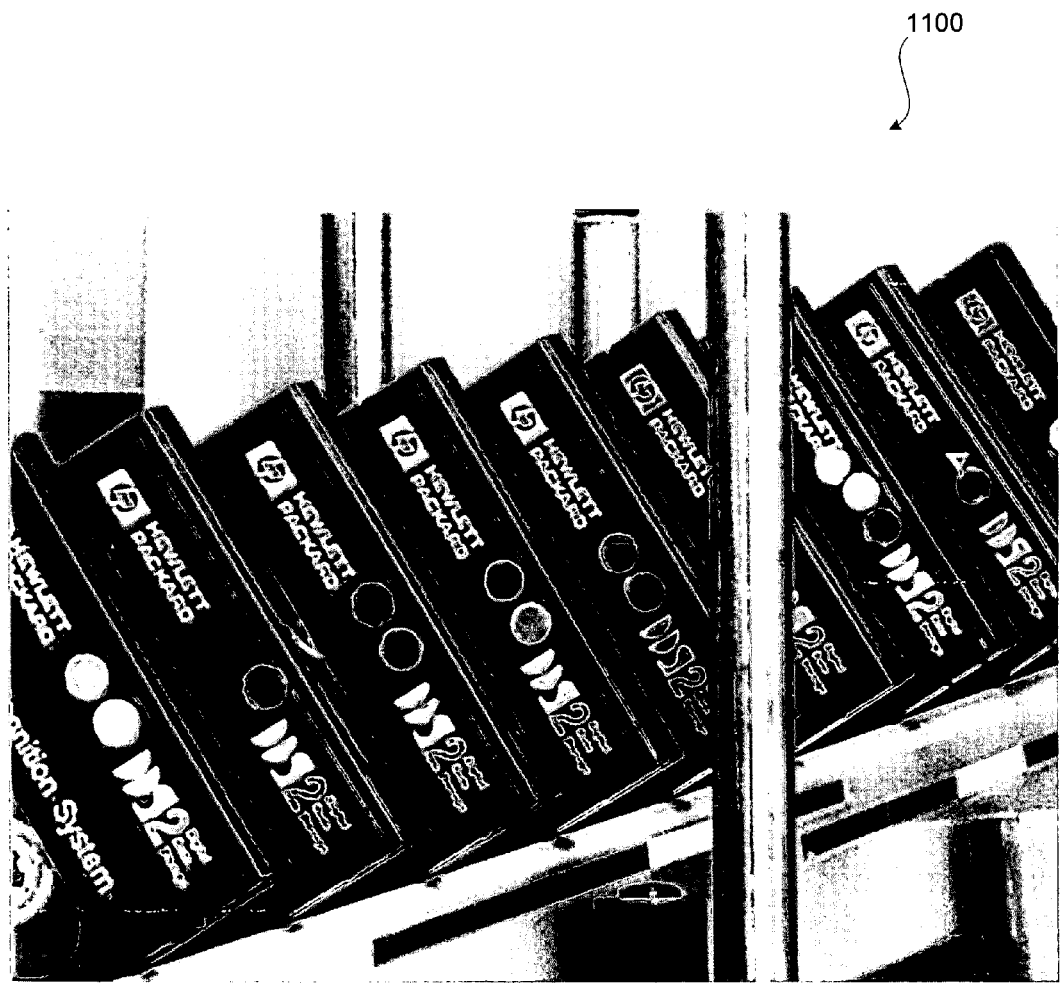
FIG. 11 is a gray-scale image of objects on an assembly line captured with an imaging system with wavefront coding.

FIGS. 10 and 11 also compare images obtained using imaging systems without wavefront coding (FIG. 10) and imaging systems employing wavefront coding (FIG. 11). FIGS. 10 and 11 include gray-scale images 1000 and 1100 of objects on an assembly line. For machine vision systems to recognize objects of similar size and shape, high spatial frequency information is advantageously maintained or enhanced by the imaging system. In image 1000 of FIG. 10, captured using an imaging system without wavefront coding, a central region 1020 is well focused whereas regions 1010 and 1030 are considerably out of focus, indicating that spatial frequency information has been lost in these outer regions. In contrast, in image 1100 of FIG. 11, captured using an imaging system including wavefront coding, all regions of image 1100 are in focus and the spatial frequency information has been enhanced relative to that of the imaging system without wavefront coding.

Figure 12:
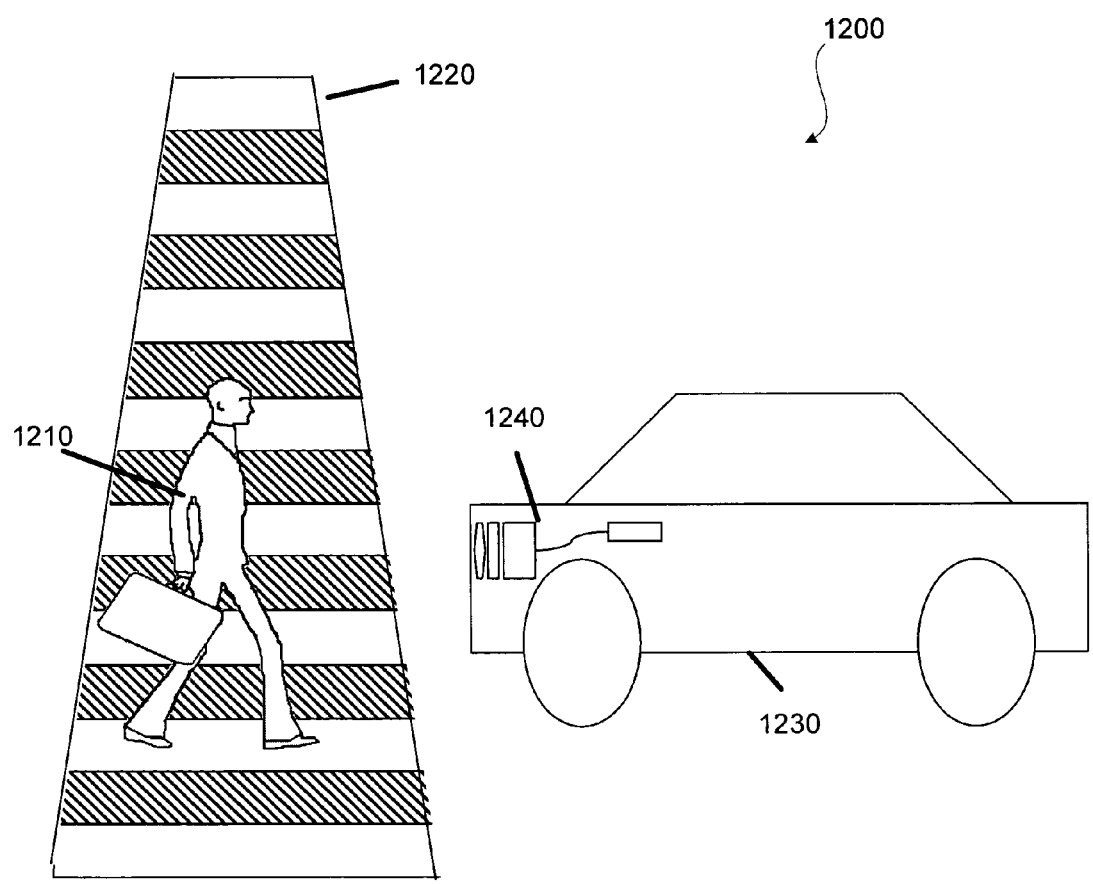
FIG. 12 shows a scene wherein task-based imaging systems used to detect an object via automotive imaging may be used in accordance with the present disclosure.

FIG. 12 shows another type of task-based imaging system that may benefit from enhancing or maintaining spatial frequencies of interest for recognition by including wavelength coding in the imaging system. FIG. 12 shows a scene 1200 of an application of task-based imaging systems specifically for object detection via imaging at an automobile. In this example, an imaging system 1240 is incorporated into an automobile 1230. This type of imaging system may use, for instance, NIR, IR or LWIR electromagnetic energy wavelengths to provide nighttime imaging capabilities. Scene 1200 includes a pedestrian 1210 walking within the boundaries of a crosswalk 1220. Imaging system 1240 may be designed to recognize crosswalk 1220 such that, upon recognition of crosswalk 1220, the imaging system may then determine if pedestrian 1210 is present in the crosswalk. Increasing the ability of imaging system 1240 to recognize crosswalk 1220 decreases the chance that automobile 1230 may have contact with pedestrian 1210. A crosswalk is generally indicated by painted stripes or an inset array of bricks or stones. Therefore, since crosswalk 1220 has specific spatial frequencies resulting from its construction, wavefront coding may be included into imaging system 1240 in order to maintain or enhance those frequencies to aid recognition by imaging system 1240.

Figure 13:
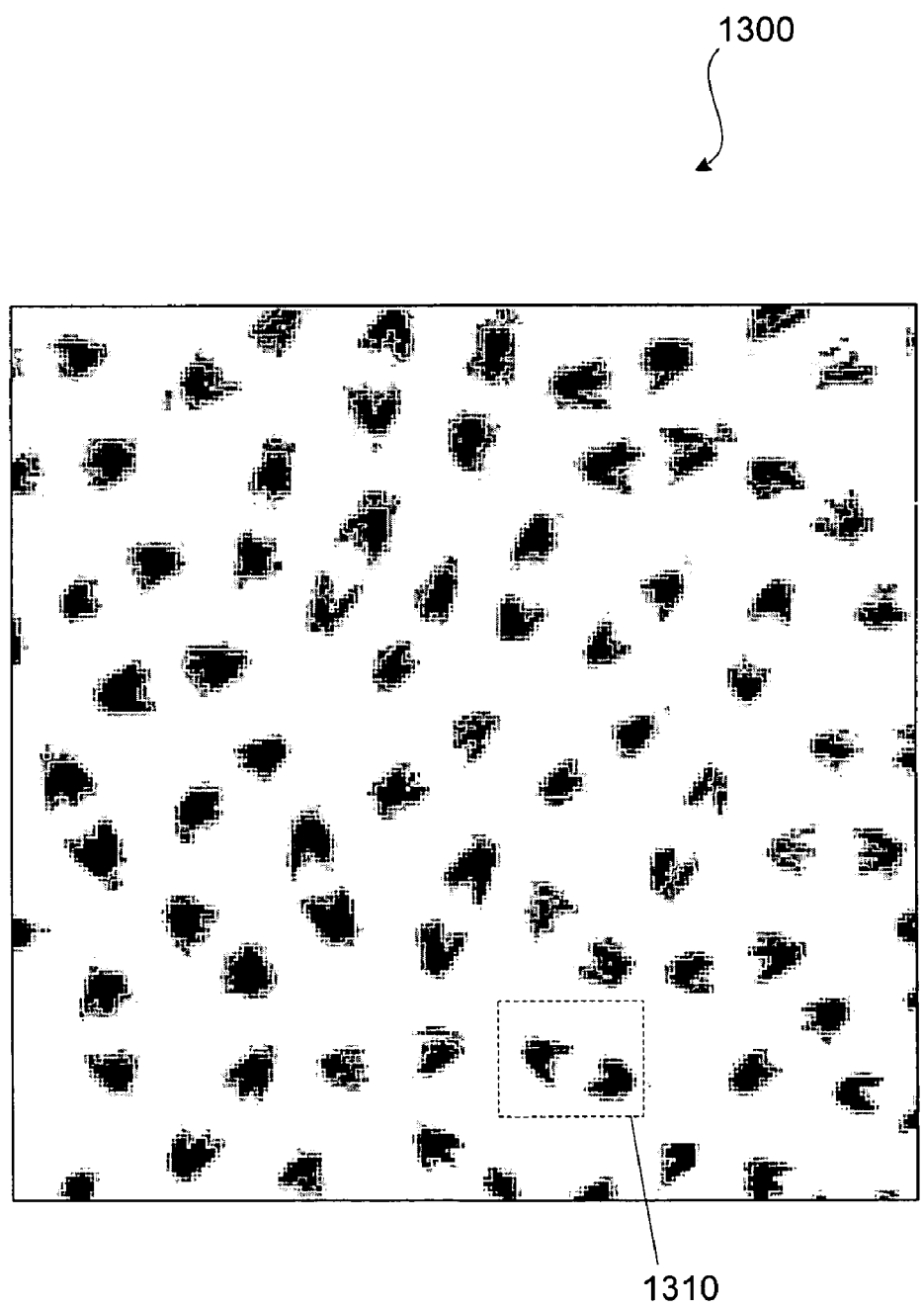
FIG. 13 is an image of a Drosophila embryo that was stained for microtubules during mitosis, illustrating how spatial frequencies of interest within biological systems may be enhanced or maintained for imaging and recognition purposes.

Another category of task-based imaging applications that may benefit from enhancing spatial frequencies of interest is biological imaging. As an example of biological imaging, FIG. 13 is a fluorescence image 1300 of a Drosophila embryo whose synchronously dividing nuclei have been stained to show microtubules during mitosis. The image has been inverted for viewability. The microtubules are the multiple small dark features in the image. Microtubules are tiny subcomponents of cells and are long tubes 24 to 25 nanometers in diameter. They form part of the cellular structure known as the cytoskeleton. During mitosis, microtubules dynamically form into bundles to create the mitotic spindle on which the chromosomes move. An exemplary mitotic spindle structure is enclosed in a box 1310. The thread-like spindle microtubules can be resolved using an optical microscope and identified by their characteristic structure. Microtubules provide physical structure and mediate the dynamical process of cell division. Improper functioning of microtubules can lead to chromosomal separation or segregation defects. Properly recognizing microtubules and any irregularities therein may provide a researcher with information about the details of mitosis. The addition of wavefront coding to an imaging system such as that used to monitor microtubules during mitosis may enhance or maintain spatial frequencies of interest and aid recognition of irregular microtubules.

As discussed in reference to FIGS. 1-4, an imaging system may be required to adapt to multiple different tasks or situations. For example, an imaging system may initially be required to provide data for facial recognition; such recognition may require only limited depth of field. Then, at a later time, the same system may be used for iris recognition, requiring more depth of field. Alternatively, the imaging system may be required to capture conventional (human viewable) images without utilizing wavefront coding. Two exemplary methods for achieving such adaptable imaging systems are by changing focus (zoom capability) and by altering the wavefront coding applied, as now described.

Figure 14:
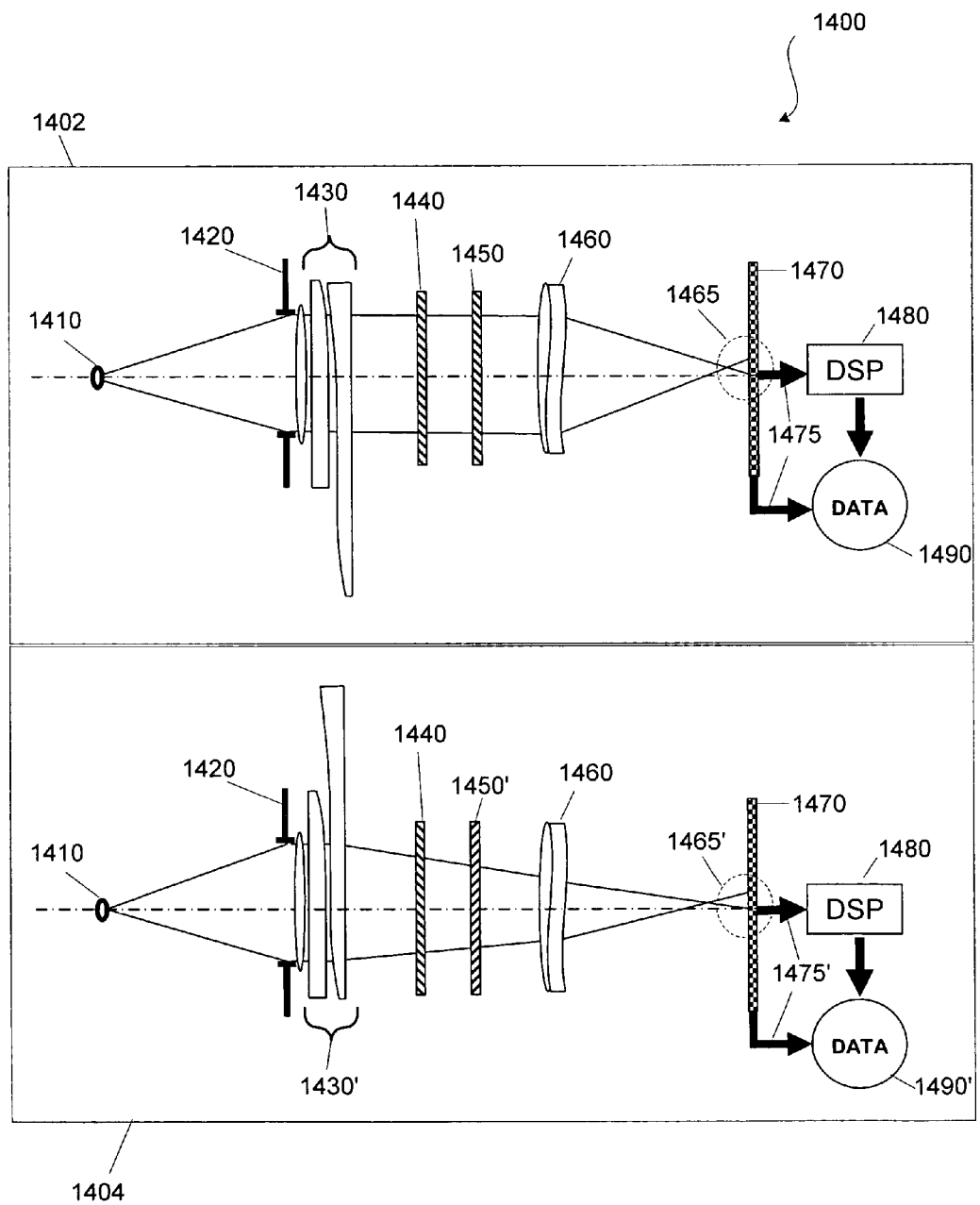
FIG. 14 is a pair of diagrammatic illustrations of an imaging system in first and second states for providing variable optical power by the use of a slidable optical element configuration and variable wavefront coding by the use of dual rotating phase filters.

In particular, FIG. 14 shows a pair 1400 of diagrammatic illustrations of an imaging system that provides variable optical power by utilizing a slidable optical element configuration and variable wavefront coding by the use of dual rotating phase filters. In illustration 1402, the imaging system is in a first state and electromagnetic energy reflected or emanating from an object 1410 is imaged through an aperture 1420 onto a detector 1470 as an intermediate image 1465. In accordance with the intermediate image, detector 1470 generates image data 1475 (represented by an arrow) over a range of spatial frequencies present in the object. Slidable elements 1430 may cooperate with an element 1460 to modify the magnification of object 1410. Additional elements 1440 and 1450 may be, for instance, rotating phase filters for varying the wavefront coding of the image. Slidable elements 1430, additional elements 1440 and 1450 and/or element 1460 modulate phase of a wavefront of electromagnetic energy from the object (i.e., wavefront coding). Image data from detector 1470 may be further processed by a digital signal processing unit (DSP) 1480, which then outputs desired data. Alternatively, image data 1475 from detector 1470 are directly output as data 1490. Data 1490 may be output by either pathway or by both pathways. Data 1490 processed by DSP 1480 may produce a final human viewable image whereas data 1490 that is not processed by DSP 1480 may be used for recognition or other tasks. The phase modification of the electromagnetic energy wavefront may be provided by one or more of slidable elements 1430, additional elements 1440 and 1450 and element 1460 alters characteristics of the intermediate image such that the SNR of imaging system 1400 is greater than the SNR of the imaging system without the phase modification. Alternatively, or additionally, the phase modification may be configured to cooperate with DSP 1480 so as to reduce at least one imaging aberration (e.g., temperature-dependent aberration and impact-induced aberration) in the imaging system, in comparison to the same imaging system but without the phase modulation and the digital signal processor. In illustration 1404, the imaging system is in a second state of magnification and wavefront coding. Slidable elements 1430 as well as rotating phase filter 1450 (shown by different hatching) are in different positions with respect to similar elements 1430' and 1450' of illustration 1402, thereby generating a different intermediate image 1465', image data 1475' and data 1490'.

Although discussed in association with rotating phase elements, the variable wavefront coding elements may be designed from reflective or transmissive optical elements such as liquid crystal spatial light modulators, deformable mirrors, liquid lenses, liquid crystal variators, slidable optical element configurations, sliding variator arrangements, sliding aperture variators or other electro-mechanical (i.e., digital light processing (DLP)) or electro-optical means to alter the phase. Phase variation of the electromagnetic energy wavefront in the range of zero to ten waves or more may be required depending upon the specific application. Alternatively, optical elements that modify the amplitude of the wavefront may be employed in place of phase modifying elements. Furthermore, adaptive systems may be used in task-based imaging systems such as those designed for biological imaging. For example in FIG. 13, microtubules were being imaged utilizing a microscope; in such applications it may be necessary to observe larger or smaller cell structure within the same imaging system (e.g., by changing magnification). Furthermore, wavefront coding may be used to correct for imaging aberrations in the task-based imaging system; for example, a modulation element for modifying the phase of the wavefront (i.e., wavefront coding) may be incorporated into the image data capturing arrangement as at least one of one or more of slidable elements 1430, additional elements 1440 and 1450 and element 1460 such that one or more of image aberrations in the task-based imaging system are reduced in comparison to the task-based imaging system without the modulation element.

Figure 15:
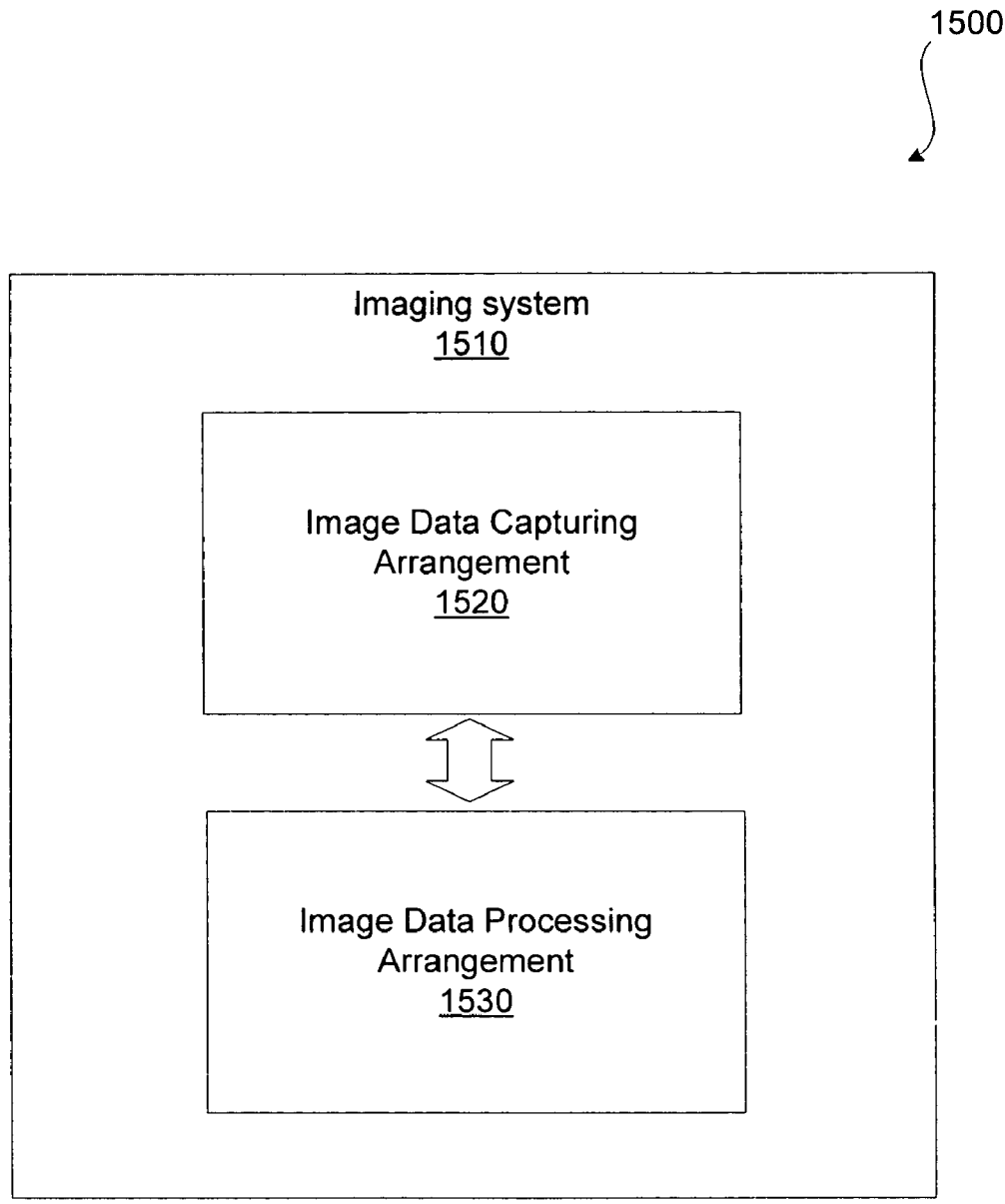
FIG. 15 is a block diagram showing a task-based imaging system in accordance with the present disclosure.

FIG. 15 is a block diagram 1500 showing a task-based imaging system 1510. Imaging system 1510 includes an image data capturing arrangement 1520 and an imaging data processing system 1530. Exemplary imaging systems are, for instance, imaging systems of 210 and 220 of FIG. 2 and imaging system assembly 245 working in cooperation with system controller 270.

Image data capturing arrangement 1520 may include, but is not limited to, apparatus, systems and processes for capturing image data from a scene. Components that may be included in system 1520 are, for example, illumination sources, optical elements such as reflective, refractive and holographic elements, phase modifying elements such as that described in association with FIG. 16, variable optical elements such as those described in association with FIG. 14, detectors (e.g., sensors and cameras) and other accessory hardware that may be required to support the image data capturing arrangement.

Image data processing arrangement 1530 may include, but is not limited to, apparatus, systems and processes for processing image data that was captured by image data capturing arrangement 1520 from a scene. Components that may be included in system 1530 are camera-based processors, system controllers such as 270 of FIG. 2, external computers, software codes, operating systems, image processing software, wavefront coding filter designs, task-based software programs and data storage units for recording the image data.

Exemplary details of enhancing or maintaining spatial frequencies of interest in a task-based imaging system (such as described above) by employing wavefront coding may be more clearly understood in the context of iris recognition at a large standoff distance, as now described. Certain difficulties arise in the implementation of biometric iris recognition when an iris to be imaged is at a large standoff distance (e.g., greater than two meters). When the iris to be imaged is located greater than about a meter away from the imaging system, the imaging system should have a large aperture in order to: 1) provide high spatial frequency information, so as to image the details of the iris; and 2) capture enough light to produce a high quality signal. Increasing the aperture of the imaging optics leads to a reduction in depth of field, making the use of wavefront coding even more beneficial when the subject is at a large standoff distance. Also, high modulation over a spatial frequency range of interest and a defocus range of interest is desired for large standoff distance applications; for such applications, wavefront coding can be utilized to increase modulation over that which would be available without wavefront coding.

Increased field of view and depth of field in certain iris recognition systems may be achieved, for example, by using multiple cameras that break up an overall imaging volume into smaller imaging volumes. In such cases, a field of view of interest may be steered into one or more cameras using mechanical devices such as mirrors or prisms. However, such mechanical devices may require additional power, may require more maintenance, may reduce speed of an image capture process, and may introduce noise into captured images. Increasing depth of field, increasing field of view and increasing resolution of an imaging system facilitate iris recognition at large standoff distances. While currently available iris recognition imaging systems may not provide both large field of view and high resolution, the inclusion of wavefront coding in the imaging optics may improve performance in both of these aspects.

Iris recognition systems may use illumination sources in the near infrared for improved iris image contrast. Illumination levels of these illumination sources should be maintained at a safe level over an entire imaging volume in order to prevent potential damage to eyes. Several classes of wavefront coding that may improve iris recognition systems include a cosine form, a caustic cubic form, a higher order separable form and a higher order non-separable form. High modulation over a spatial frequency range of interest and a defocus range of interest are desired for large standoff distance applications.

An exemplary task-based imaging system 1510 is the IHONS 1.1 system for obtaining data regarding a scene for use in the task of iris image recognition. In particular, in the IHONS 1.1 system, image data capturing arrangement 1520 includes optics for imaging a wavefront of electromagnetic energy from the scene to an intermediate image, modifying phase of the wavefront (i.e., wavefront coding), detecting the intermediate image, and generating image data over a range of spatial frequencies. For example, image data capturing arrangement 1520 may include one or more imaging optics and a wavefront coding element; alternatively, the imaging optics and the wavefront coding element may be integrated into a single optical element or the wavefront coding effect may be distributed over one or more of the imaging optics. Also, detecting of the intermediate image and generating of the image data may be performed by a single detector configured for converting electromagnetic energy incident thereon into electronic data. Furthermore, image data processing arrangement 1530 of the IHONS 1.1 system cooperates with image capturing system 1520 to account for the modification of the wavefront effected by the wavefront coding element and further performs the task of iris image recognition. Specifics of the IHONS 1.1 system are described in detail immediately hereinafter in association with FIGS. 16-39 and the task of iris recognition at a large standoff distance.

A WFC design that is useful for iris recognition at a large standoff distance is a class of higher-order non-separable polynomial functions designated iris high-order non-separable ("IHONS"). This class offers a compromise between risk minimization and performance. The IHONS design has similarities to the iris high-order separable ("IHOS") design used in a wavefront coding application for iris recognition at shorter standoff distances, such as that described in R. Narayanswamy et al., "Extending the imaging volume for biometric iris recognition," Appl. Op., vol. 44, no. 5, pp. 701-712. The IHOS design specifically refers to the use of a phase altering surface for wavefront coding, where the phase altering surface is mathematically expressible as:

$$\phi(x,y) = \exp\{-j[f(x)+f(y)]\}, \qquad \text{Eq. 1}$$

where f(x) and f(y) are high-order polynomials. While the IHOS design is suitable for iris recognition at small standoff distances, the IHONS design allows implementation of WFC modulation with a small number of filters over the operating standoff distance range.

A mathematical description of a class of pupil phase functions that characterize the IHONS design is:

$$\phi(x, y) = \sum_{i,j=0}^{N} x^i \alpha(i,j) y^j, \qquad \text{Eq. 2}$$

where: 1) $\phi$ is a phase function at each normalized spatial coordinate x and y (i.e., an entire spatial field is normalized by division by the radius (r) of the entrance pupil to the range between 0 and 1 in each dimension x and y); 2) $\phi$ is Hermitian, that is, each coefficient $\alpha_{ij} = \alpha_{ji}$; 3) at least some $|\alpha_{ij}| \geq 1$ when i=0 or j=0, providing a relatively high modulation transfer function (MTF) in x and y; and 4) values for $\alpha_{ij}$ when i≠0 and j≠0 may be defined by Eq. 3:

$$\sum_{i,j=1}^{N} |\alpha(i,j) r^{-i-j}|^2 < \sum_{l=0}^{N} |\alpha(l,0) r^{-l}|^2 + |\alpha(0,l) r^{-l}|^2. \qquad \text{Eq. 3}$$

An exemplary "IHONS 1.1" design used in examples of FIG. 17 through FIG. 41 utilizes specific $\alpha_{ij}$ coefficients in the IHONS design defined in Eq. 1. The $\alpha_{ij}$ terms are defined as follows. The first four terms correspond to separable terms:

α(0,3)=α(3,0)=23.394
α(0,5)=α(5,0)=60.108
α(0,7)=α(7,0)=−126.421
α(0,9)=α(9,0)=82.128

The remaining four terms correspond to non-separable terms:

α(3,3)=5.021
α(5,5)=−21.418
α(7,7)=−310.749
α(9,9)=−1100.336

Figure 16:
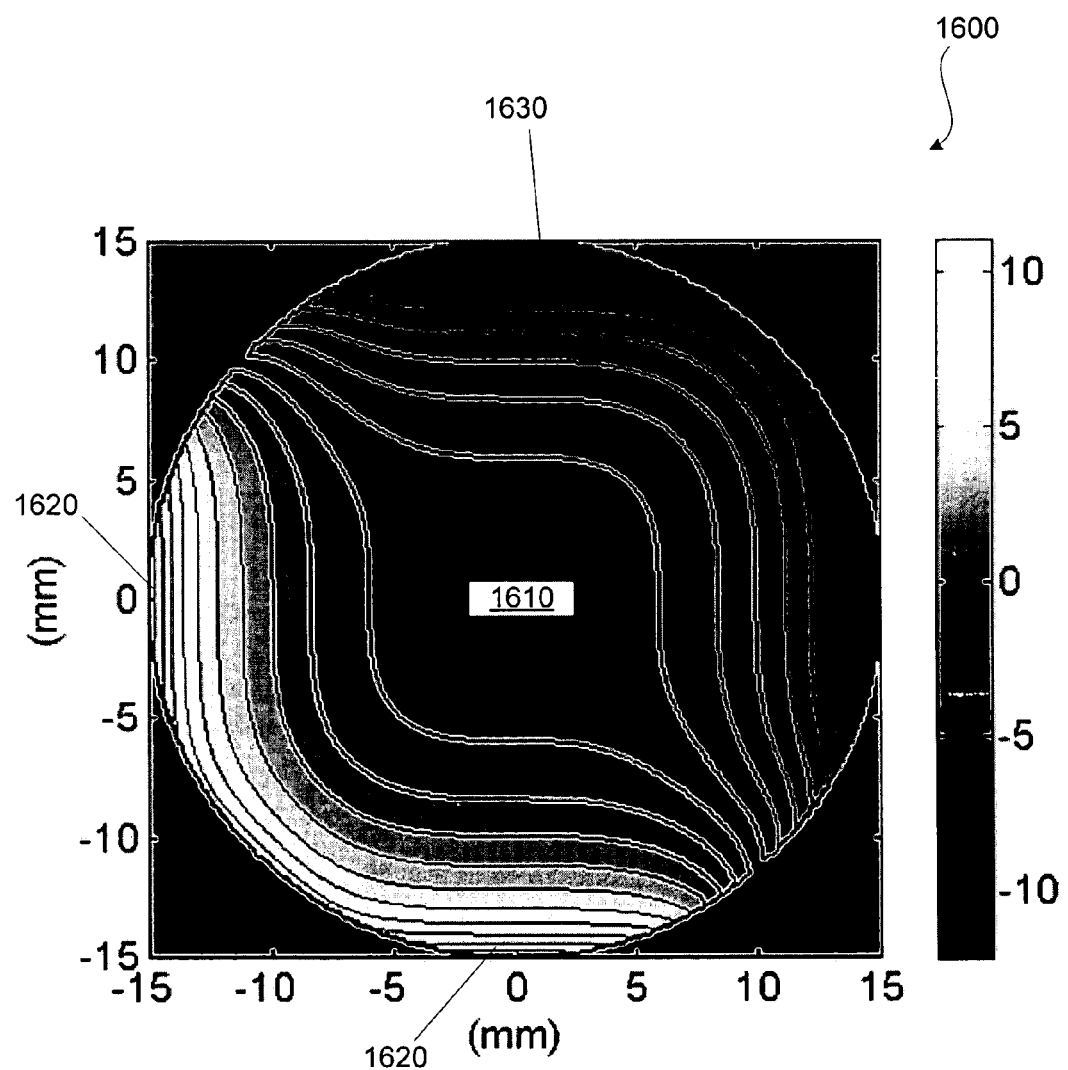
FIG. 16 is a contour plot of the surface sag of an exemplary wavefront coding element suitable for use in iris recognition at a large standoff distance in accordance with the present disclosure.

FIG. 16 shows a surface plot 1600 of an exemplary IHONS 1.1, calcium fluoride (CaF$_2$) WFC element, which is suitable for use in image data capturing arrangement 1520 within imaging system 1510 of FIG. 15. For example, IHONS 1.1 WFC element may be incorporated into the imaging system shown in FIG. 14 as slidable elements 1430, additional elements 1440 and 1450 and/or element 1460 for modulating the phase of the wavefront. Surface plot 1600 has dimensions in millimeters as the abscissa and the ordinate. The gray scale bar to the right side of the surface plot has units of microns. Each contour represents a sag difference of approximately 2 microns from a center region 1610 value of zero. Regions 1620 have a sag value of approximately 12 microns. Regions 1630 have a sag value of approximately −12 microns. The total peak-to-valley surface sag difference is 24.4 microns, for a total path length difference of 19.3 waves at λ=840 nm. The IHONS 1.1 WFC element may be manufactured, for example, using a fast-servo diamond cutting manufacturing process. Given the small clearance between lens elements, $CaF_2$ was selected as the substrate material. An alternative material, polymethyl methacrylate (PMMA), would be less costly but potentially more prone to deform, given a large form factor (e.g., 5 mm thickness for a 30 mm diameter element). At first glance, surface plot 1600 may not appear very different from that of a separable, IHOS design; however, the IHONS 1.1 design shown here includes the cross-term coefficients that provide considerable off-axis modulation, which enhances the polar SNR, as will be described in further detail immediately hereinafter.

Figure 17:
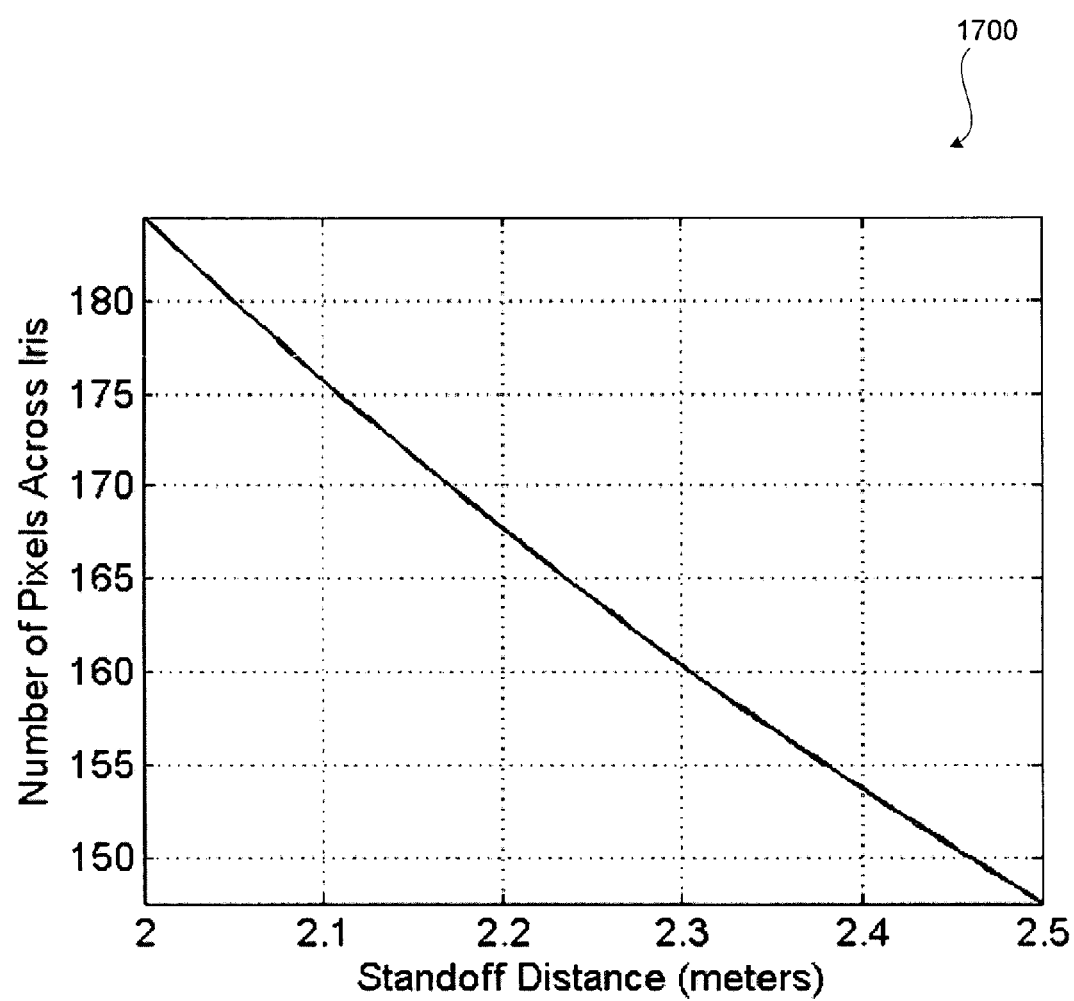
FIG. 17 is a graphical plot of the number of pixels that subtend an image of an iris as a function of standoff distance to the imaging system for iris recognition.

It is known that the average human iris has a diameter of approximately 12 mm. In order to facilitate iris recognition, the texture of the iris should be sampled at a high spatial frequency. Therefore, iris recognition algorithms generally have a recommended minimum number of pixels across the iris diameter. FIG. 17 is a graphical plot 1700 of the number of pixels of an image sensor array that subtend an image of an iris as a function of the standoff distance. Plot 1700 has standoff distance in meters as the abscissa and number of pixels across an iris on the ordinate. FIG. 17 shows that, as standoff distance decreases, the image of the iris gets larger such that the image subtends more pixels of the image sensor array. While an interpolation process does not add information to the iris image, the interpolation does better condition the iris image data for recognition, thereby yielding better discrimination in iris recognition.

Figure 18:
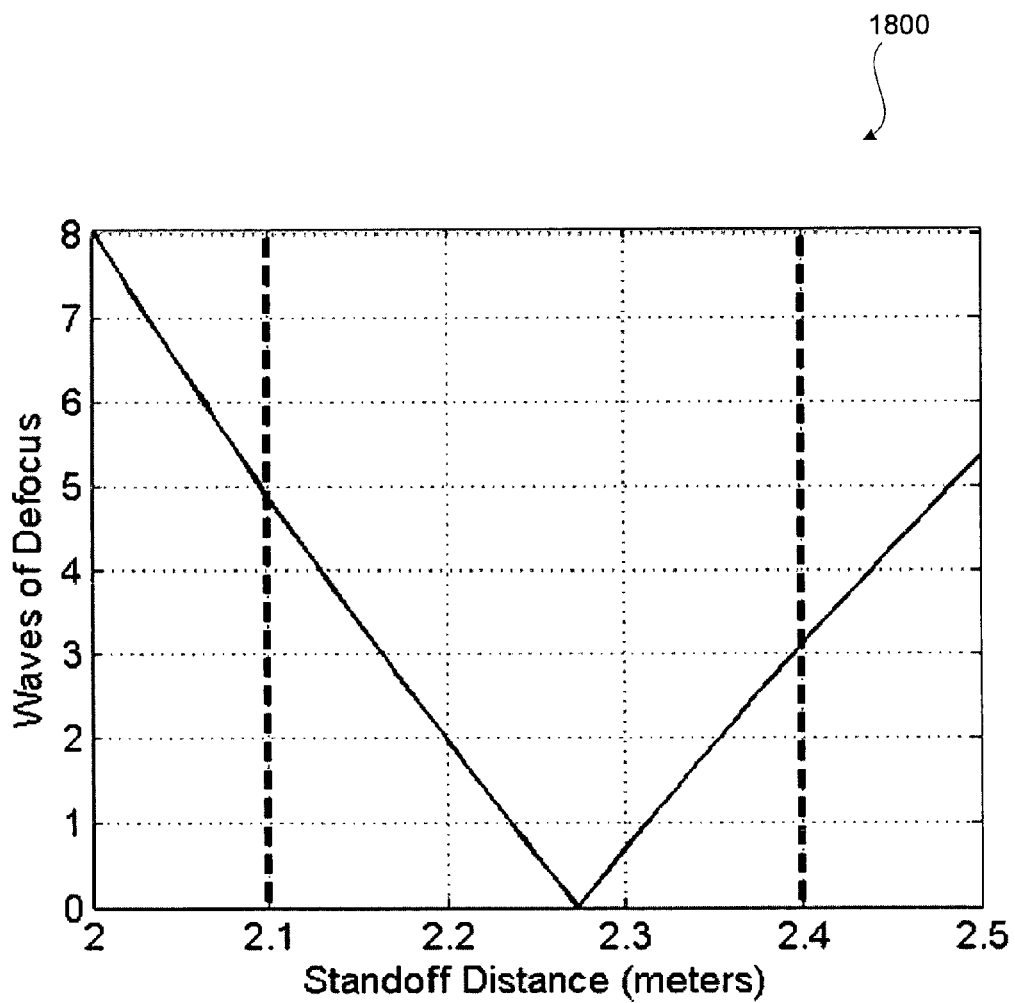
FIG. 18 is a graphical plot of the number of waves of defocus over the standoff distance range for an imaging system.

FIG. 18 is a graphical plot 1800 showing a number of waves of defocus as a function of standoff distance range. Plot 1800 has standoff distance in meters as the abscissa and number of waves of defocus on the ordinate. Vertical dashed lines at 2.1 and 2.4 meters standoff distance indicate a standoff distance range selected for use in one example of the iris recognition imaging system of the present disclosure. Rather than selecting a best-focus position that minimizes a maximum number of waves of defocus within a distance range, the range has been selected such that there is more defocus when the subject is closer. This selection equalizes an available SNR over the entire standoff distance range, since imaging at higher spatial frequencies is required when the iris is farther away from the imaging system, while the MTF decreases monotonically with spatial frequency for the imaging system including wavefront coding. As FIG. 18 shows, no more than five waves of defocus need be corrected for the standoff distance range of interest.

Figure 19:
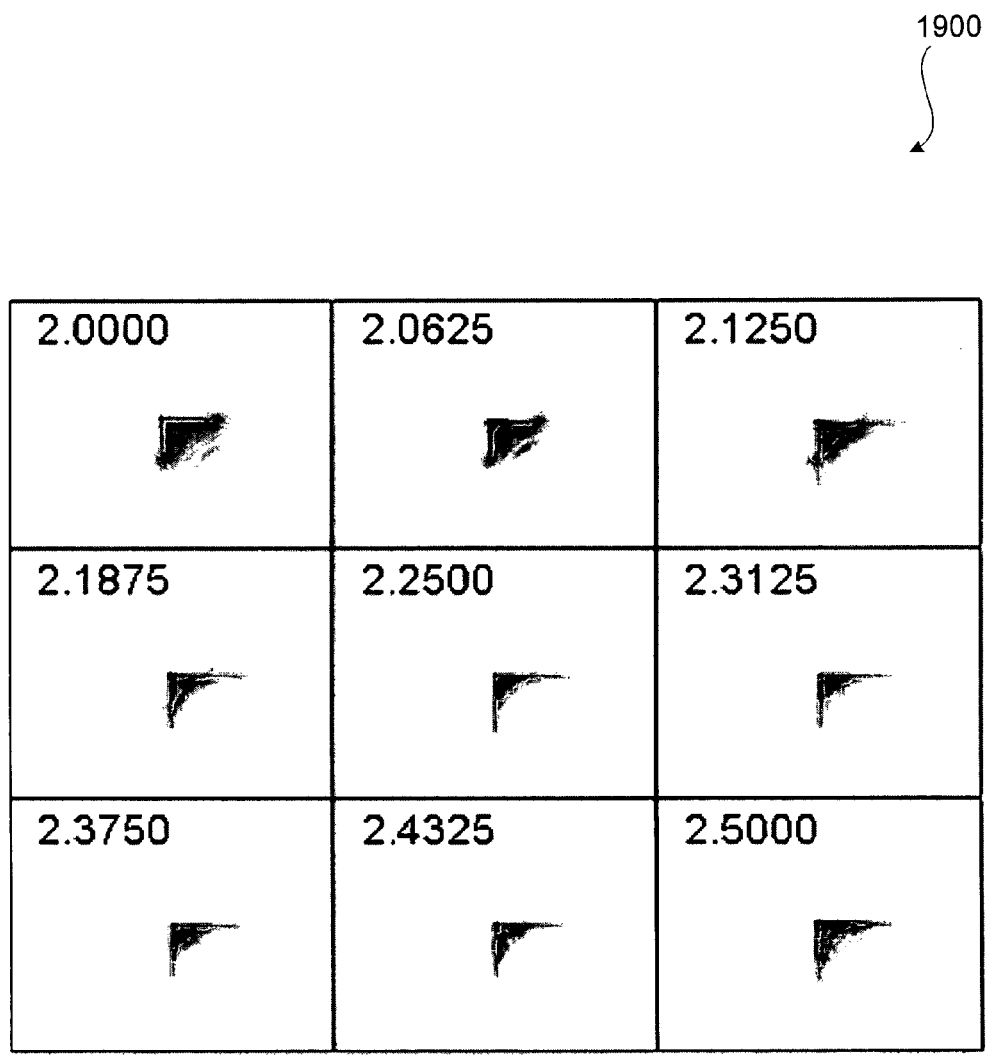
FIG. 19 is a series of graphical plots of simulated, through-focus normalized point spread functions (PSFs) for an imaging system including wavefront coding in accordance with the present disclosure.
Figure 20:
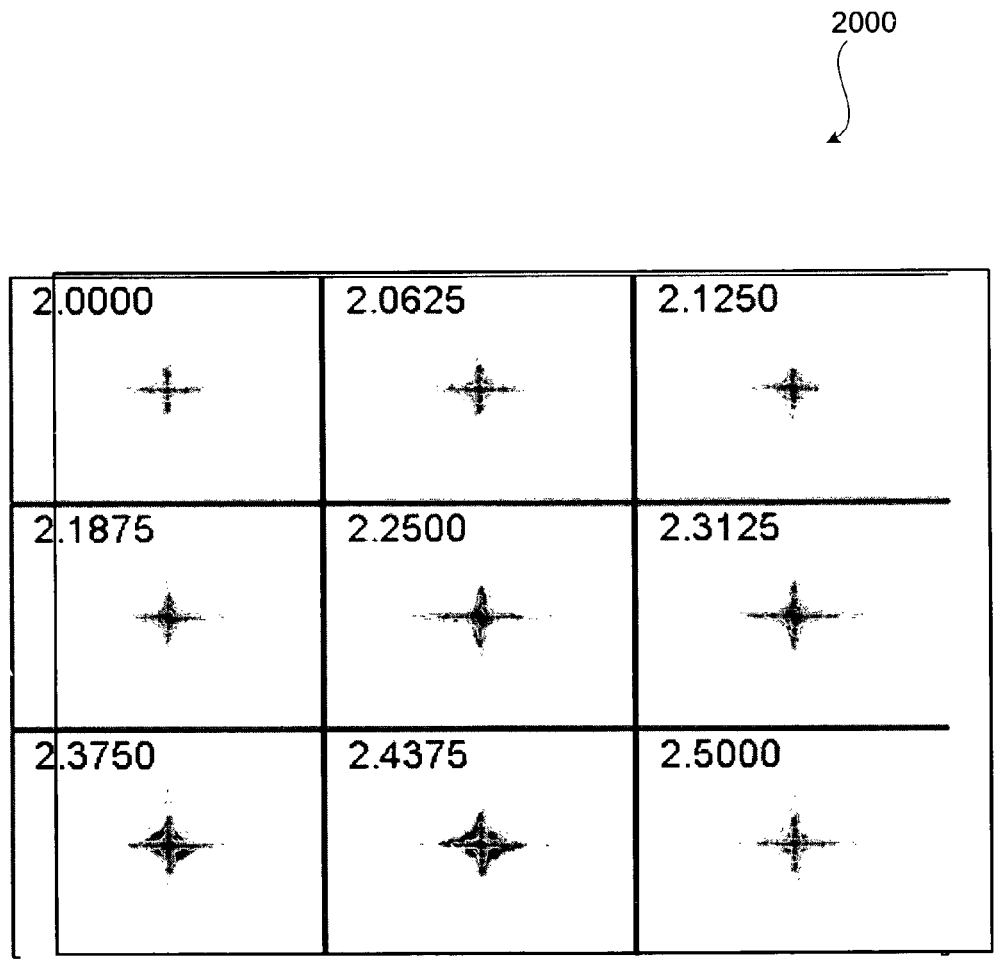
FIG. 20 is a series of graphical plots of simulated, through-focus MTFs for an imaging system including wavefront coding in accordance with the present disclosure.
Figure 21:
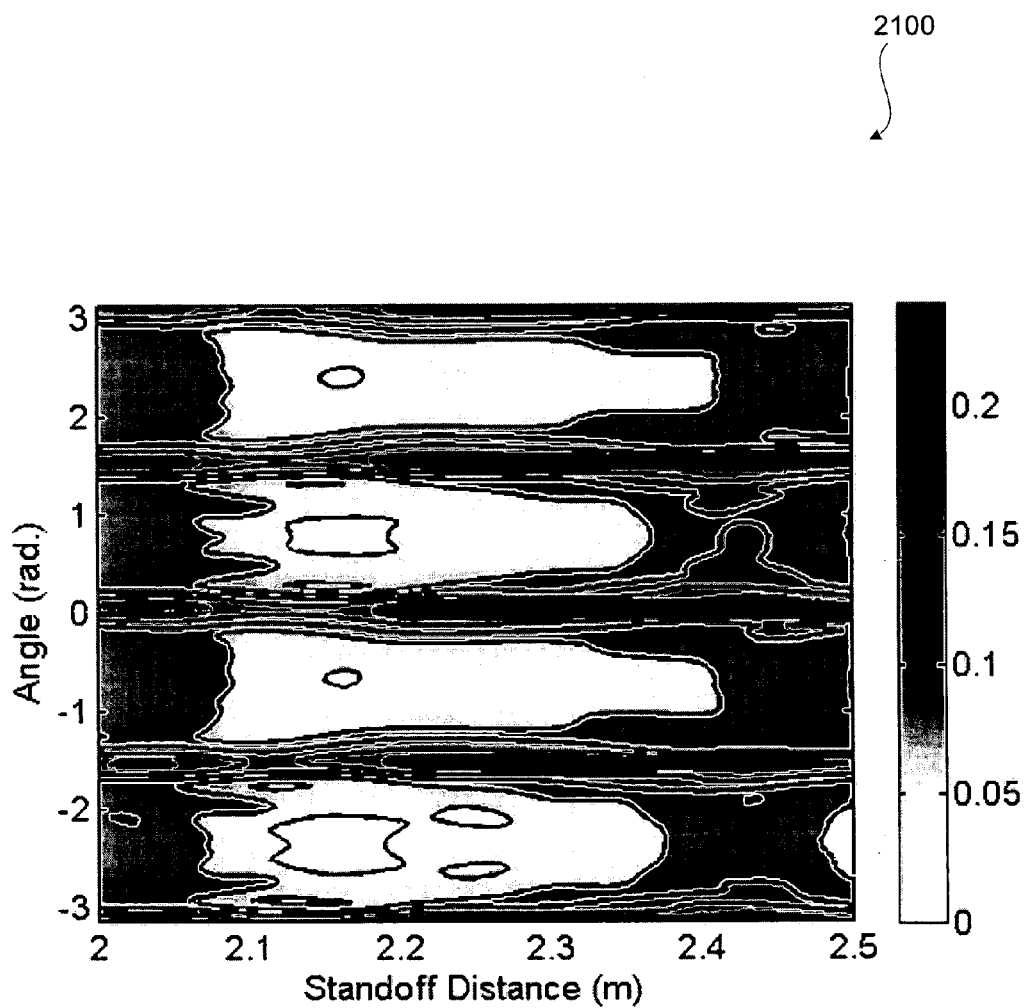
FIG. 21 is a contour plot of the polar-MTF of an exemplary imaging system including wavefront coding in accordance with the present disclosure.

Referring now to FIGS. 19-21, the PSFs and MTFs resulting from a simulated imaging system (e.g., imaging system 3300 of FIG. 33, discussed herein below) including the IHONS 1.1 wavefront coding element are computationally analyzed to determine the expected system performance. PSFs are examined for compactness and invariance over an imaging volume. MTFs are examined for modulation strength in spatial bands of interest across the desired standoff distance range discussed above. The modulation (contrast) and SNR at the frequencies of interest are examined as functions of standoff distance and across all angular orientations, as depicted by the polar-MTF plot of FIG. 21.

FIG. 19 shows a set 1900 of simulated, through-focus, normalized PSFs at different standoff distances (in meters and noted in the upper left-hand corner of each subimage) for the IHONS 1.1 imaging system. The PSFs are logarithmically gray-scaled and thresholded for clear presentation. As indicated in FIG. 18, the best-focus is at 2.27 m. Coma, as measured in one of the lenses used in the imaging system, was also included, but this characteristic is not inherent in the IHONS 1.1 imaging system. Notably, the PSFs shown in FIG. 19 with IHONS 1.1 are similar to those expected from a rectangularly-separable design with IHOS. That is, desirably, the PSFs resulting from the IHONS 1.1 imaging system do not change significantly as a function of standoff distance, allowing the implementation of iris recognition at the large standoff distance using only a small number of filters over the required range of standoff distances.

FIG. 20 shows a set 2000 of simulated, through-focus MTFs at different standoff distances (in meters and noted in the upper left-hand corner of each subimage) for the IHONS 1.1 imaging system. The MTFs are logarithmically gray-scaled and thresholded for clear presentation. Again, a sample of measured coma is included in the simulation for completeness, although the coma is not an inherent characteristic of the IHONS 1.1 imaging system. It may be noted in FIG. 20 that high modulation exists in the vertical and horizontal directions but, contrary to a purely separable design (e.g., IHOS), diagonal and off-diagonal modulations are slightly larger, especially as the object moves away from best-focus, where more modulation is desired. This feature of the MTFs of the IHONS 1.1 imaging system, combined with the slow PSF variation as shown in FIG. 19, demonstrate the advantages of the weakly non-separable design, as provided by IHONS 1.1, over the IHOS system in this particular application to an iris recognition system at a large standoff distance.

FIG. 21 shows a polar-MTF contour plot of the IHONS 1.1 system. Plot 2100 has standoff distance in meters as the abscissa and polar angle in radians on the ordinate. The grayscale contours of this plot represent the modulation of the spatial frequencies of interest (i.e., frequencies associated with a critically sampled object feature of 0.1 mm) as a function of direction (vertical axis) and as a function of standoff distance (horizontal axis), taking into account spatial frequency variation as a function of standoff distance.

Figure 22:
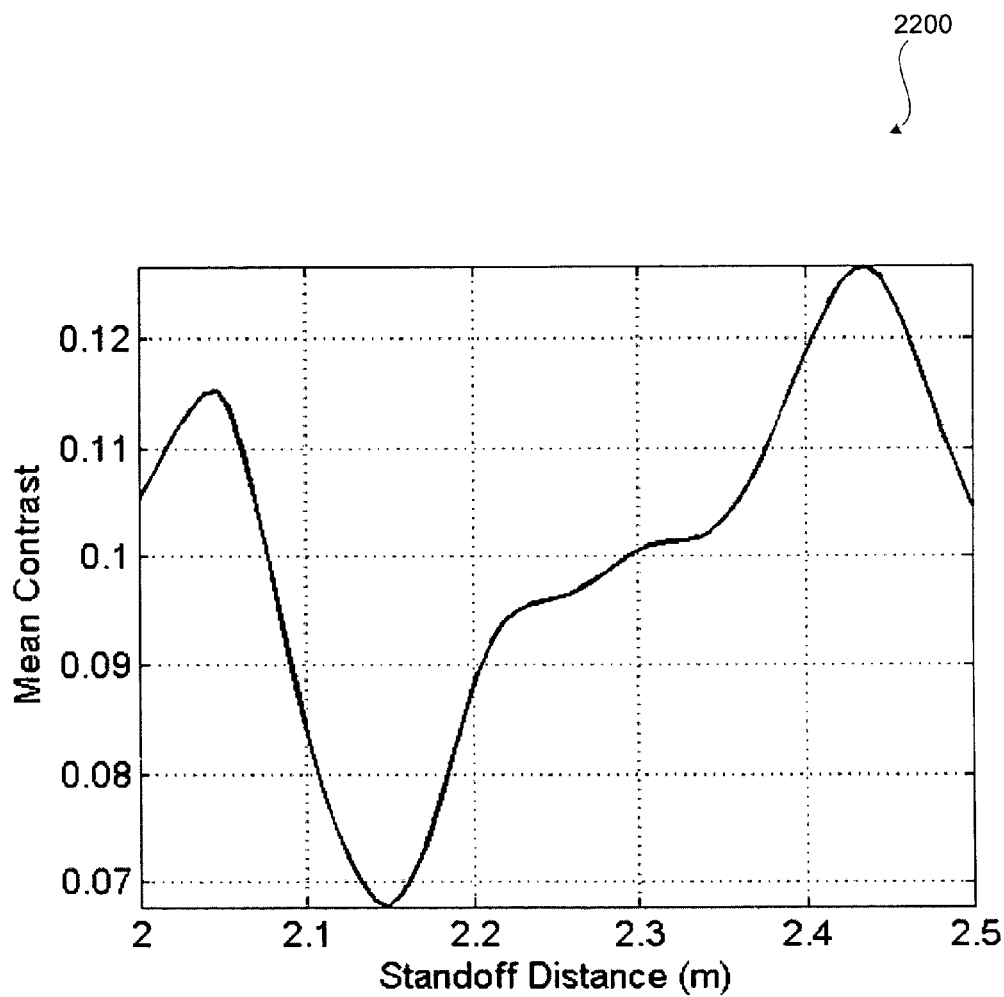
FIG. 22 is a graphical plot of the mean contrast at the spatial frequencies of interest for an imaging system, as a function of standoff distance, averaged over all directions ($-\pi$ to $+\pi$), for an imaging system including wavefront coding in accordance with the present disclosure.
Figure 23:
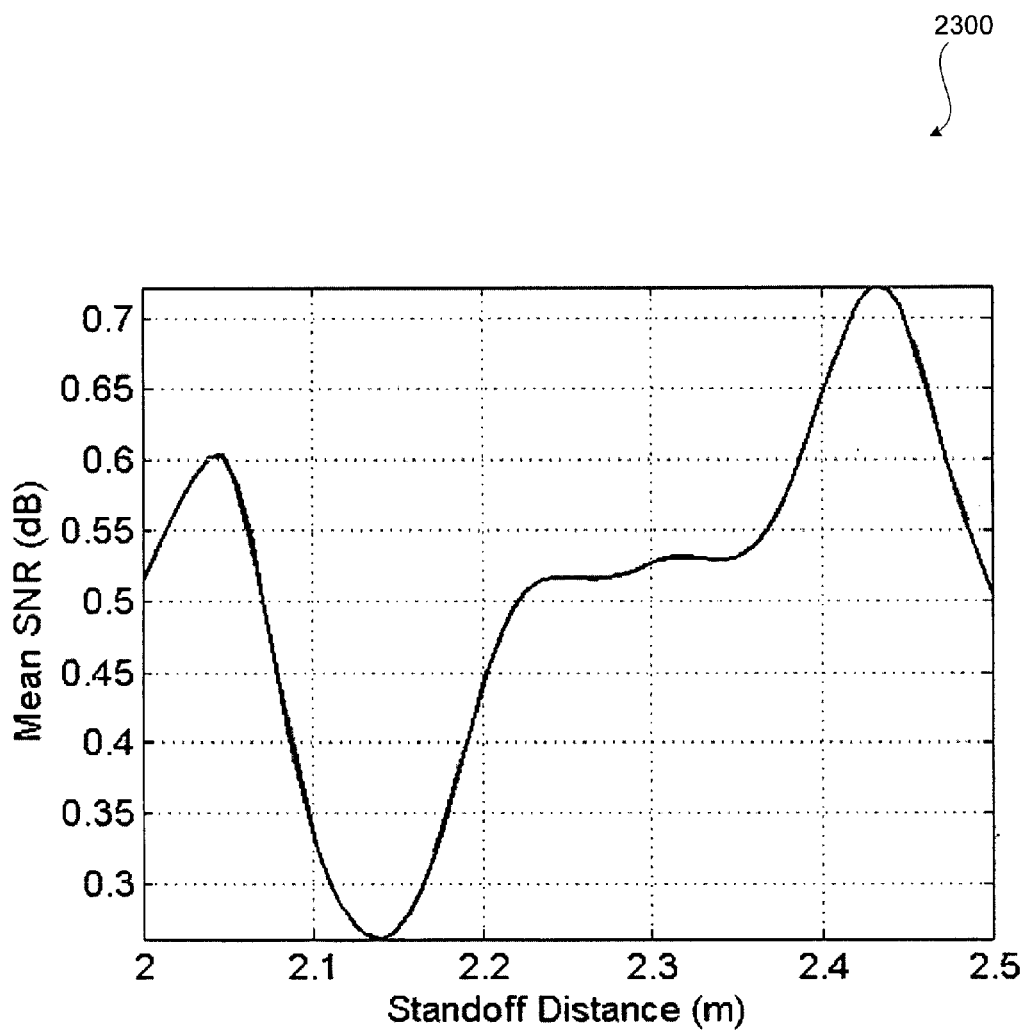
FIG. 23 is a graphical plot of the mean SNR at the spatial frequencies of interest for an imaging system, as a function of standoff distance, averaged over all directions ($-\pi$ to $+\pi$), for an imaging system including wavefront coding in accordance with the present disclosure.

For implementation of iris recognition at a large standoff distance, all directions are, arguably, equally important. FIG. 22 is a plot 2200 of mean contrast averaged over all directions that provides an accurate measure of performance. Plot 2200 has standoff distance in meters as the abscissa and contrast on the ordinate. FIG. 22 shows the mean contrast at spatial frequencies of interest as a function of standoff distance, averaged over all directions ($-\pi$ to $+\pi$), for the IHONS 1.1 system of the present disclosure. As shown in FIG. 22, the contrast at the highest spatial frequencies of interest (corresponding to object detail of 0.1 mm) is high. FIG. 23 shows a related plot 2300 of the mean SNR versus standoff distance. The mean SNR, more so than the mean contrast, may be calculated and used as a quantitative measure of the system performance.

Figure 24:
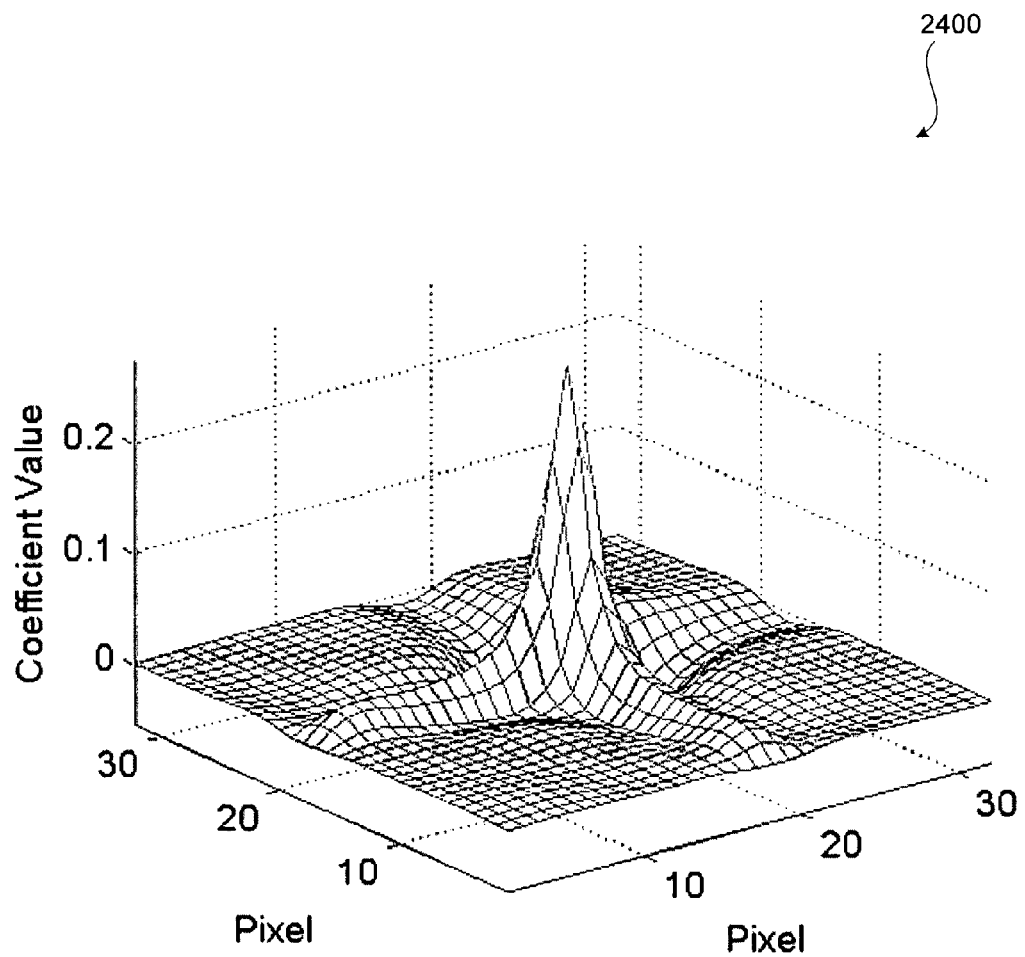
FIG. 24 is a graphical representation of a filter used to process images captured by an imaging system, for an imaging system including wavefront coding in accordance with the present disclosure.

FIG. 24 shows a graphic representation 2400 of a filter used for processing captured WFC images using the IHONS 1.1 imaging system in accordance with the present disclosure. The filter has been built using a Wiener parametric method using an average of three PSFs captured close to the best-focus position. Wiener filter parameters include a noise parameter of 250 and an object detail of 1.2. A resulting noise gain is 0.54, which indicates that the filter is smooth.

Figure 25:
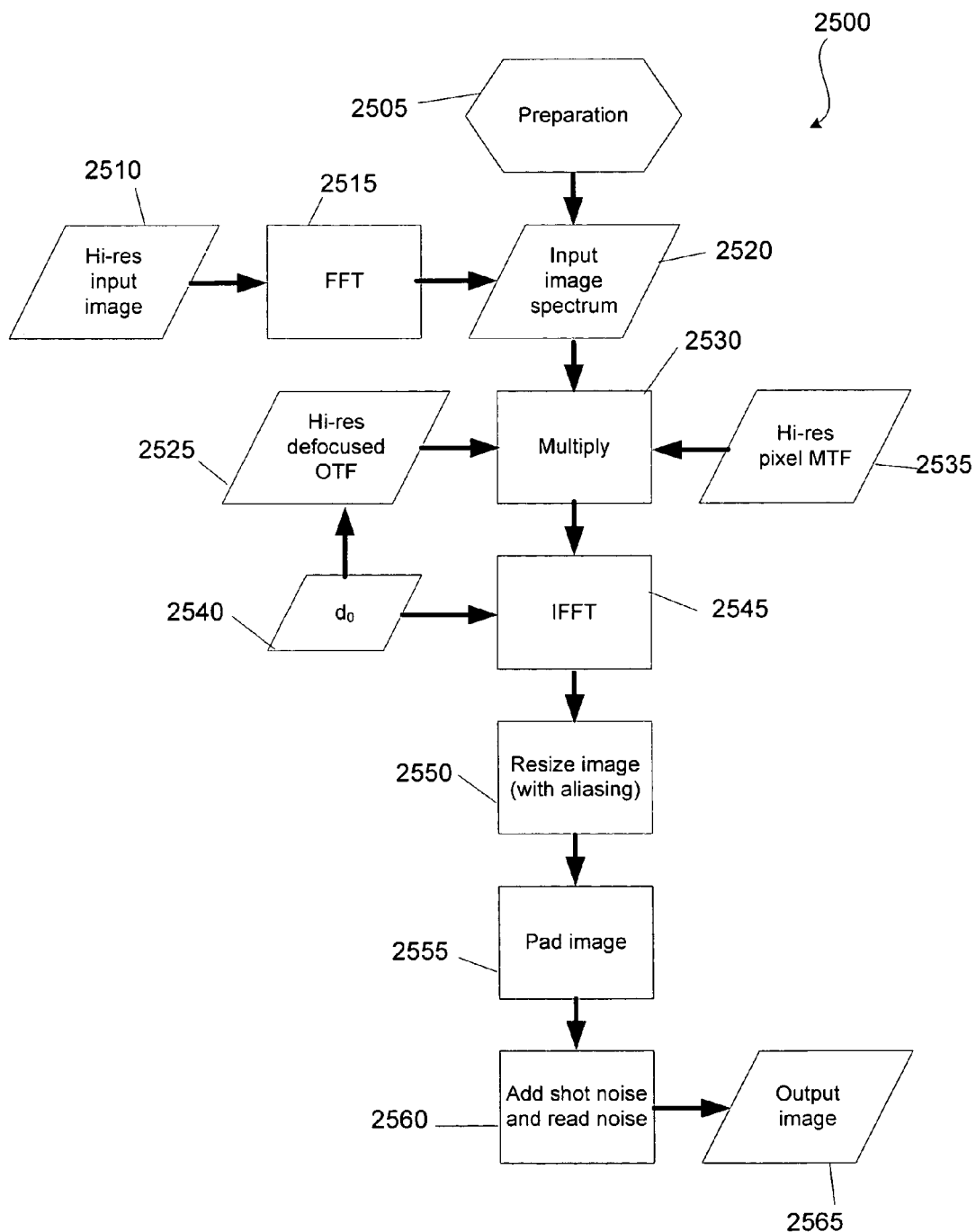
FIG. 25 is a flow diagram showing a process for the generation of simulated images comparable to those captured by an imaging system that includes wavefront coding, in accord with an embodiment.

Image simulation is an important step in the design process of a task-based imaging system, such as iris recognition. FIG. 25 shows a flow diagram illustrating a process 2500 for generating simulated images. Process 2500 may be performed, for example, within image data processing arrangement 1530 of FIG. 15; for instance, image data processing arrangement 1530 may include software or firmware for performing process 2500. Process 2500 for simulating images begins with a preparation step 2505 during which system initialization and other tasks are performed. A high resolution input image data 2510, including a range of spatial frequencies, is Fourier transformed (e.g., by a fast-Fourier Transform (FFT) method) in a step 2515 to yield a Fourier space, input image spectrum 2520. High resolution defocused OTF data 2525 and high resolution, pixel MTF data 2535 of the imaging system are determined, then multiplied with input image spectrum 2520 in a step 2530 to generate a modified image spectrum of the high resolution image. Pixel sampling and low-pass filtering may be taken into account by the multiplication by the pixel MTF. OTF data may include measured wavefront error of a sample lens.

Since defocus varies according to the standoff distance ($d_0$), the OTF may be interpolated to have the same matrix size as the spectrum of the high resolution image. Knowledge of this matrix size may also be important for performing the real space conversion of the image data in an inverse Fourier transform step 2545. The OTF may be modified by altering, for example, a wavefront coding element within the imaging system such that the SNR in the output image is further increased over other systems without the SNR. In step 2545, the modified image spectrum from step 2530 is converted into a modified image by inverse-FFT. This modified image may then be used to generate an output image. In a step 2550, the image is resized by down-sampling to the final resolution, thereby taking the variable magnification (due to, for instance, variation in object distance) into account. Aliasing may also be taken into account by down-sampling without low-pass filtering the image. Down-sampling may include, alternatively, processing the modified image for a given down-sampling origin and a commonly used sampling product, and then generating multiple aliased versions of the resized image by varying the down-sampling origin within the down-sampling period. The processes of down-sampling and origin variation are discussed at an appropriate point hereinafter in discussions related to FIGS. 28 and 29. An iris recognition algorithm may require an image that is a specific size (e.g., 640×480 pixels). Since the original image may be at high magnification, the area including the iris may be smaller than this size. During a step 2555, the image may be zero padded, but this process may result in unrealistic edges around the image. In order to yield more realistic images, the simulated images may be padded with a copy of their external boundary lines instead. The boundary lines are the topmost row, bottommost row, leftmost column and rightmost column of the image. These boundary lines may be replicated until the image is filled to 640×480, therefore resulting in streaks around the borders. FIG. 30 shows an example of these edge effects.

Finally in a step 2560, Poisson-distributed shot noise and Gaussian-distributed read noise may be added to the image, using the same noise parameters (e.g., full well count and read noise count) present in the actual detector. The result is an output image 2565 that is a faithful reproduction of images actually captured by an IHONS 1.1 system, with the exception of not representing detector saturation. The output images may then be filtered with the selected filter kernel, producing images such as those shown in FIG. 30. The simulation process does not take into account detection saturation that may take place at specular reflection spots inside the pupil and other areas in the image. The simulation algorithm of FIG. 25 includes effects of wavefront coding on defocused images, such that algorithmic recognition may be performed on the simulated images, consequently allowing prediction of overall system performance.

Figure 26:
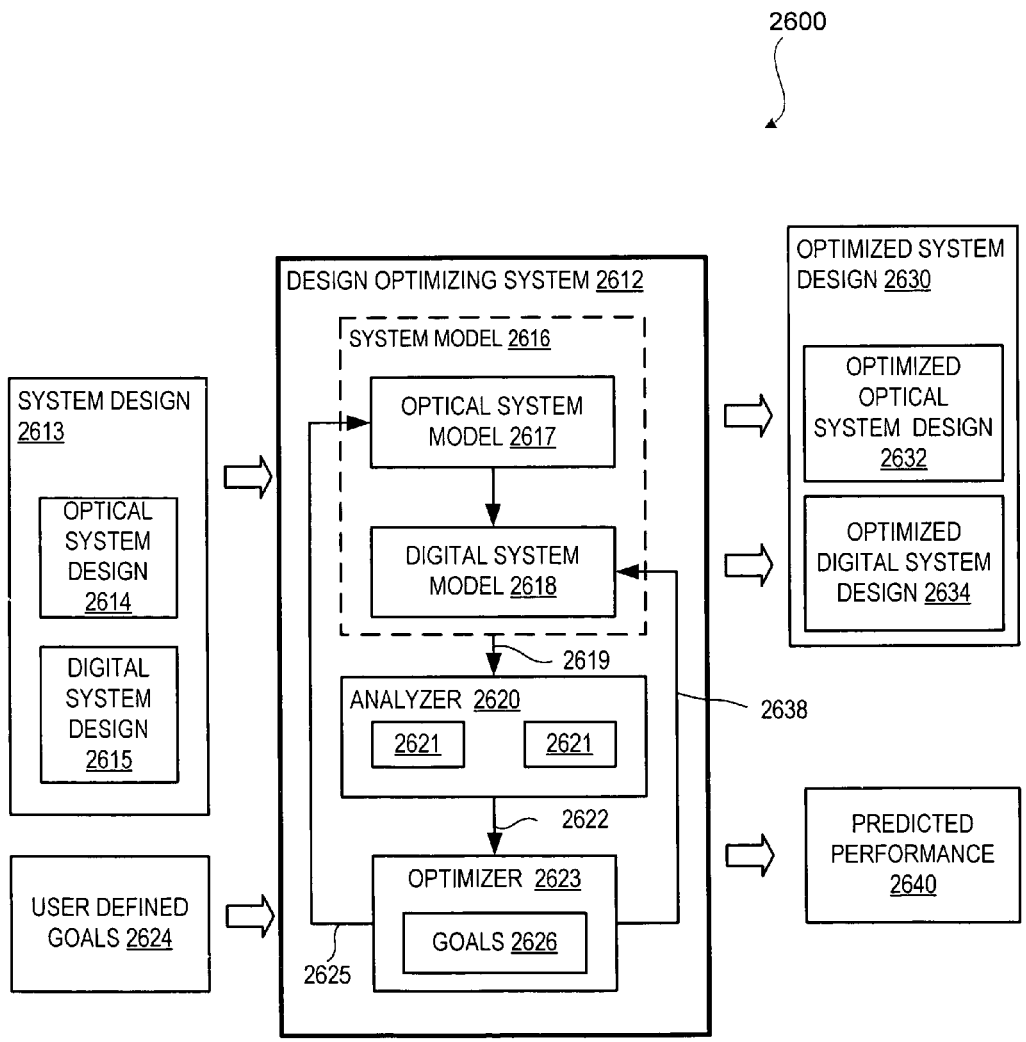
FIG. 26 is a block diagram showing a system for the optimization of a task-based imaging system including wavefront coding.

FIG. 26 presents a block diagram 2600 for an optimization method that may use a given parameter, such as polar-SNR, in order to optimize a task-based imaging system. FIG. 26 is identical to FIG. 2 of the above referenced U.S. patent application Ser. No. 11/000,819, and is reproduced here to illustrate a general approach to optical and digital system design optimization. Design optimizing system 2612 may be used to optimize a system design 2613, which includes both an optical system design 2614 and a digital system design 2615. By way of example, optical system design 2614 may be an initial optical prescription for a wavefront coding element, such as that shown in FIG. 16, and digital system design 2615 may be an initial design of a filter, such as that shown in FIG. 24, used for signal processing images from the optical system. Design optimizing system 2612 may function to generate an optimized system design 2630. Optimized system design 2630 may include optimized optical system design 2632 and optimized digital system design 2634. An exemplary optimized design is the herein described IHONS 1.1 design.

System design 2613 is input to design optimizing system 2612 to create a system model 2616. System model 2616 illustratively includes an optical system model 2617 and a digital system model 2618 that represent, respectively, optical system design 2614 and digital system design 2615. Design optimizing system 2612 may simulate functionality of system model 2616 to generate an output 2619. Output 2619 may for example include a pupil map generated by simulation of optical system model 2617 and bit stream information associated with processing by digital system model 2618.

Design optimizing system 2612 includes an analyzer 2620 that processes output 2619 to generate a score 2622. As above, analyzer 2620 may utilize one or more metrics 2621 to determine score 2622. Metrics 2621 pertain to both optical system model 2617 and digital system model 2618. Results from each metric 2621 may be weighted and processed by analyzer 2620 to form score 2622. Weights for each metric 2621 may, for example, be specified by a user and/or algorithmically determined.

An optimizer 2623 processes score 2622 and determines the performance of system model 2616 relative to goals 2626, which may, again, be specified by the user (e.g., user defined goals 2624, such as a target polar SNR value) for input to optimizer 2623. If system model 2616 is not optimized, design optimizing system 2612 responds to output 2625 from optimizer 2623 to modify optical system model 2617 and/or output 2638 from optimizer 2623 to modify digital system model 2618. If either of system models 2617 or 2618 is modified, system model 2616 is again simulated by design optimizing system 2612 and output 2619 is scored by analyzer 2620 to generate a new score 2622. Optimizer 2623 thus continues to modify system models 2617 and 2618 iteratively until design goals 2626 are achieved. For iris recognition, an example of a goal is to optimize the value of a polar-MTF within a set of spatial frequencies of interest.

Once design goals 2626 are achieved, design optimizing system 2612 may output an optimized system design 2630 that is based on system model 2616 as modified by optimizer 2623. Optimized system design 2630 includes an optimized optical system design 2632 and an optimized digital system design 2634, as shown. Optimized system design 2630 may therefore include parameters that specify design objects of an electro-optical system that meets goals 2626. Design optimizing system 2612 may output a predicted performance 2640 that, for example, summarizes capabilities of optimized system design 2630.

Figure 27:
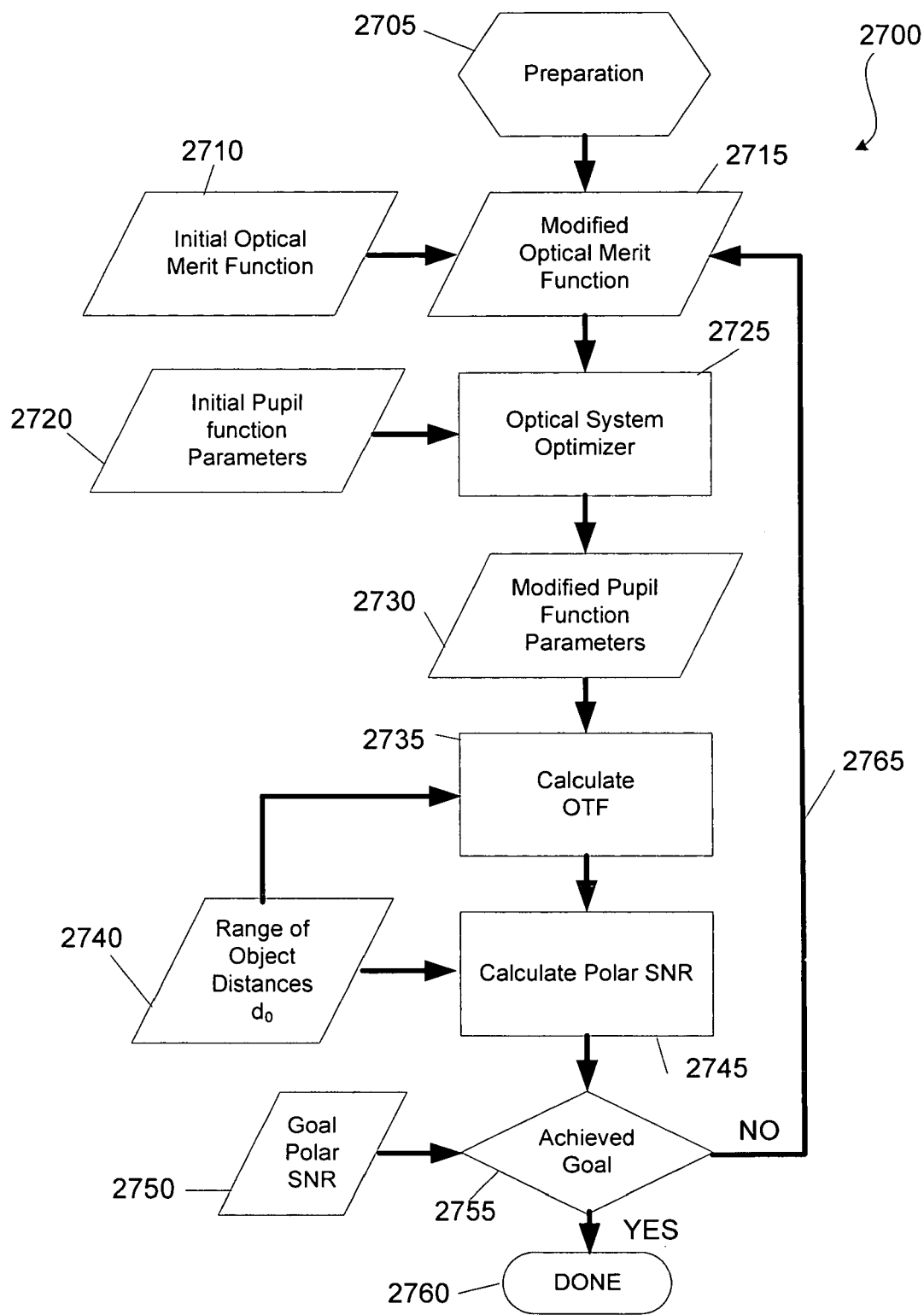
FIG. 27 is a flow diagram showing a process for the optimization of a task-based imaging system including wavefront coding, in accord with an embodiment.

A flowchart shown in FIG. 27 describes an exemplary optimization method 2700 that uses the polar-SNR in order to optimize a task-based imaging system. Optimization method 2700 may be performed, for example, as a part of image data processing arrangement 1530 of FIG. 15; that is, image data processing arrangement 1530 may include software or firmware for performing optimization method 2700 in cooperation with image data capture system 1520. Optimization method 2700 starts with a preparation step 2705 during which system initialization and other tasks are performed. An initial value of the optical merit function 2710 is determined by a user and becomes the initial value of a modified optical merit function 2715. During a step 2725, initial values of pupil function parameters 2720 along with the value of a modified optical merit function 2715 are input into an optical design software package such as ZEMAX®, CODE V® or OSLO® (or other programs known in the art) for optimization. The pupil function parameters may then be modified by the optical design software, providing modified pupil function parameters 2730.

During steps 2735 and 2745, the OTF and the polar-SNR of the imaging system may be calculated taking into account a desired range of object distances ($d_o$) 2740 over the scene. Next, during a step 2755, the calculated polar-SNR is compared to a goal polar-SNR 2750, which, for many applications, may be quite a simple function. For example, the goal polar-SNR may be a straight line representing a minimum value of SNRs required within the range of operation of the imaging system. Next, if the calculated SNR is close enough to desired goal polar-SNR 2750 (wherein the designer determines what is considered to be close enough), or if the calculated SNR is larger than the desired SNR, then the optimization is complete and the process proceeds to a step 2760 and is finished. Otherwise, the process proceeds via a loop pathway 2765 so that the designer may create a new modified optical merit function 2725 to account for deficiencies in the calculated polar-SNR (e.g., increase the target modulation of the MTF of the imaging system at a given direction). The optimization may be repeated until the design goal is reached.

Figure 28:
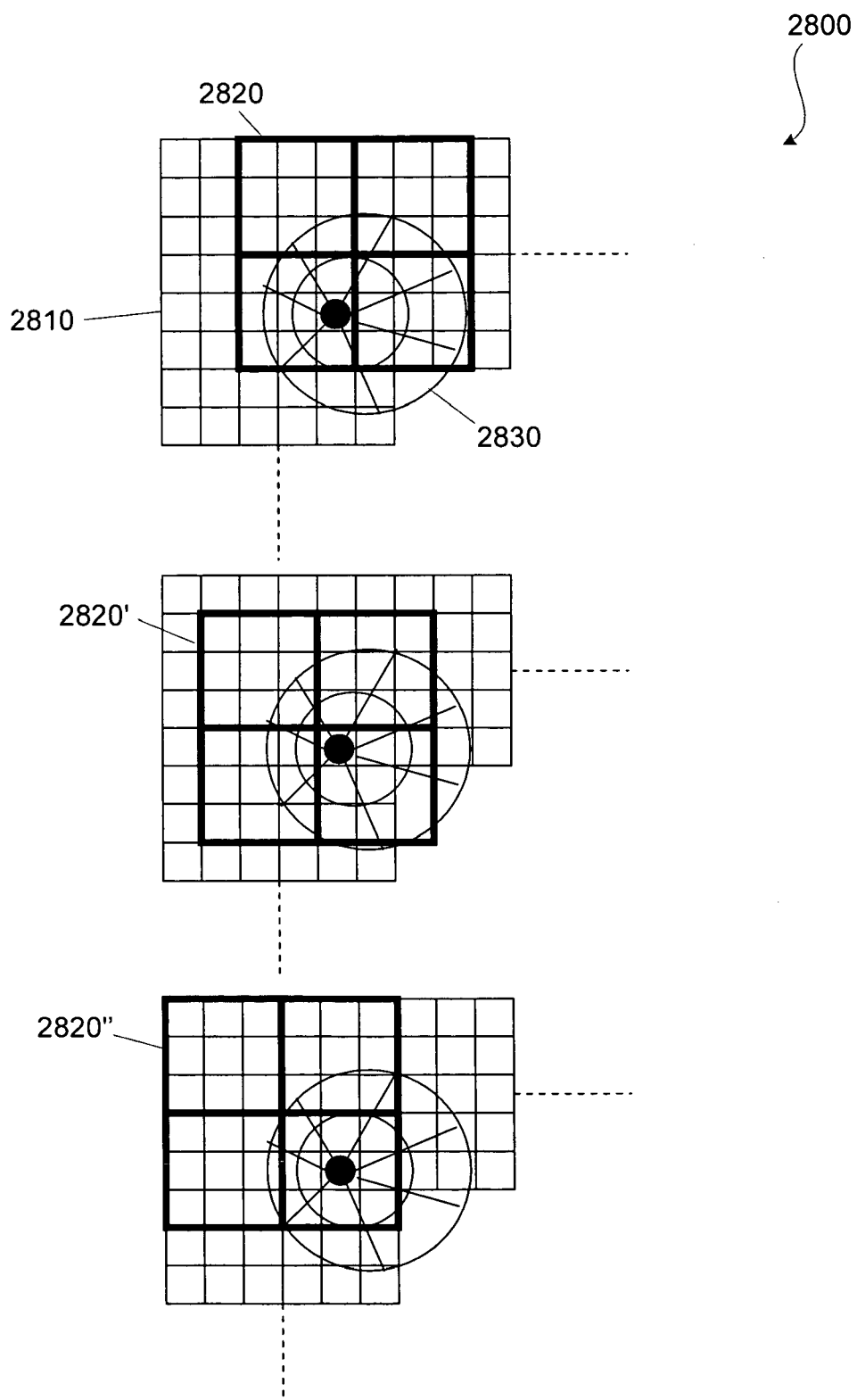
FIG. 28 is a series of schematic diagrams showing the relative positions of an original image, a PSF and a down-sampled image as seen by a given imaging system.

FIG. 28 is a series of schematic diagrams 2800 showing the relative positions of an original image, a PSF and a down-sampled image as seen by an imaging system. An original high resolution image 2810 is shown as a 2D array of small squares. If critically-sampled, image 2810 may be considered an ideal representation of the source scene. Down-sampled low-resolution images (2820, 2820' or 2820") may represent the less than critically-sampled digitized version of the source scene. Down-sampled low-resolution images (2820, 2820' or 2820") are shown as a 2D array of squares that enclose nine smaller squares of the high resolution image. A PSF 2830 is shown as a black central dot with radial spokes and concentric rings. PSF 2830 may be associated with a specific pixel within image 2810. In this example when down-sampled, the relative origins of the two images may be shifted to any of nine possible positions (3×3 to 1×1 down-sampling). This shifting may alter the mapping of the PSF 2830 into the new image (2820, 2820' or 2820"). The shifting may also cause differing amounts of aliasing between the new images and relative to the old image. All aliased positions may be calculated and used within analyzer 2620 of FIG. 26 as part of an optimization method or within step 2550 of the simulation process of FIG. 25.

Figure 29:
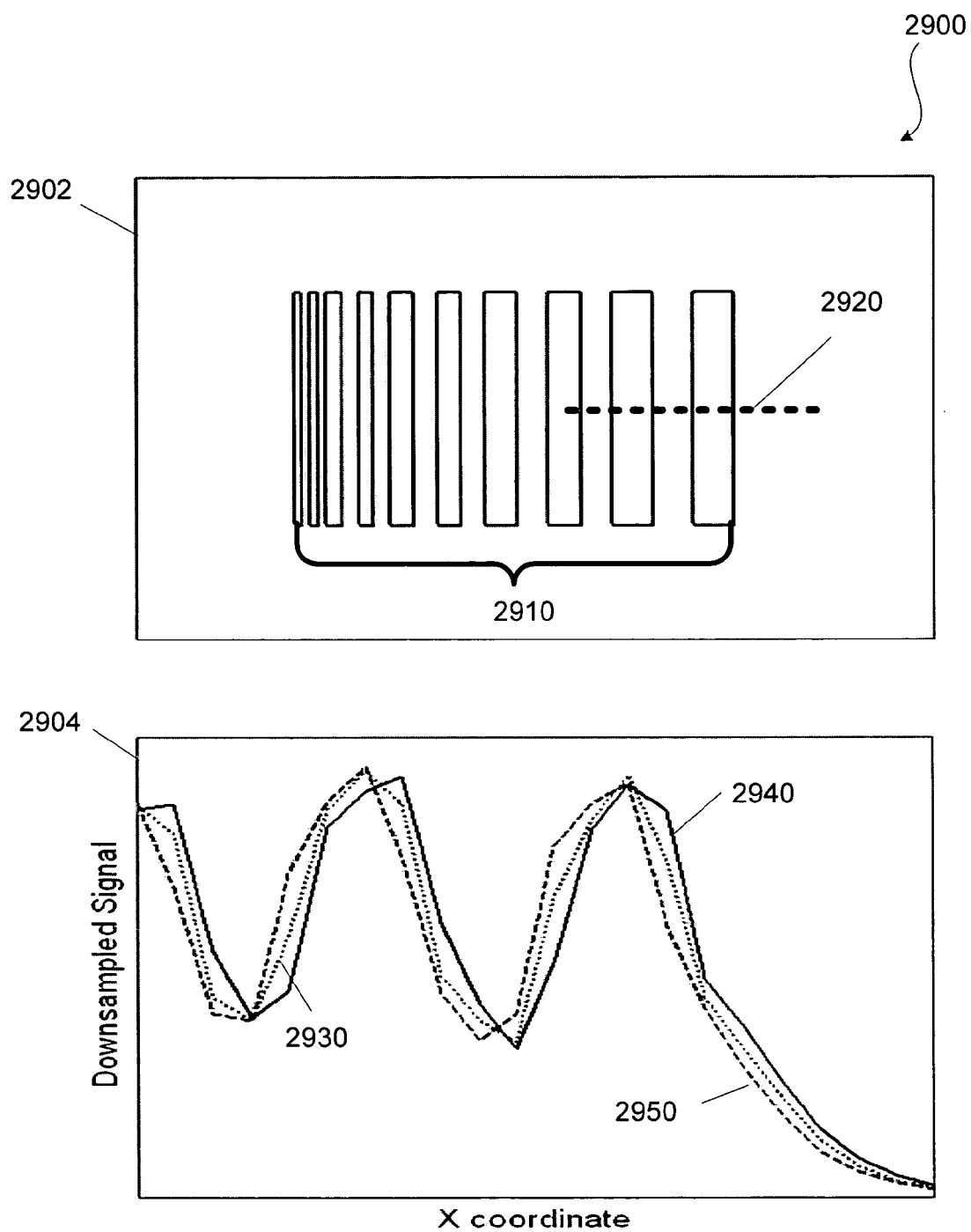
FIG. 29 is a pair of plots detailing effects of aliasing with regard to the varied origin of the down-sampling.
Figure 30:
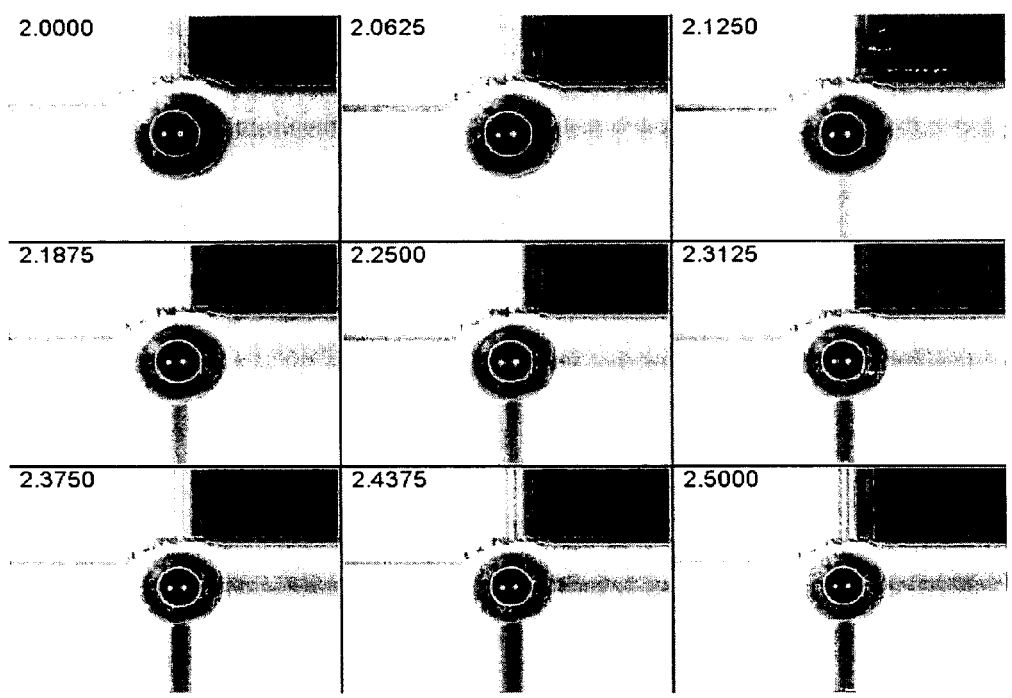
FIG. 30 shows a series of simulated iris images that incorporate the effects of a wavefront coding element and related processing in accordance with the present disclosure.

FIG. 29 is set of plots 2900 detailing the effects of aliasing with regard to the varied origin of the down-sampling. Plot 2902 is a 2D simulation of a barcode-like pattern 2910. Pattern 2910 has a value of one within the boundaries of the rectangles that form pattern 2910. All other values are zero. A dashed line 2920 is a scan line that is sampled to create the data for plot 2904. Plot 2904 shows the curves associated for three variably shifted scan lines. A dotted line (curve 2930) represents a shift of zero pixels. A solid line (curve 2940) represents a shift of one pixel. A dashed line (curve 2950) represents a shift of two pixels. To generate each curve (2930, 2940 and 2950) the data of pattern 2910 is convoluted with the appropriate shift with an example PDF and then the convolved image is sampled along scan line 2920. By comparing curves 2930, 2940 and 2950 it may be seen that the shapes within pattern 2910 are modified.

FIG. 30 shows a set of simulated final images 3000 that incorporate the effects of a wavefront coding element and related processing. The final images were processed with an optimized set of filter parameters that were determined from the intermediate version of these same images, such as derived using optimization 2700. Standoff distances in the subimages in FIG. 30 vary from 2 to 2.5 meters, as indicated in the images of PSFs and MTFs shown in FIGS. 19 and 20 respectively. The standoff distance for each subimage is noted in the upper left-hand corner of that subimage. Captured WFC images are then processed by iris recognition software, providing a metric of filter quality. Initially, multiple filters were used over the range of standoff distances. However, it has been determined that it is possible to meet all imaging specifications using the filter represented in FIG. 24. This reduction in the number of filters provides a significant advantage over the existing art.

Figure 31:
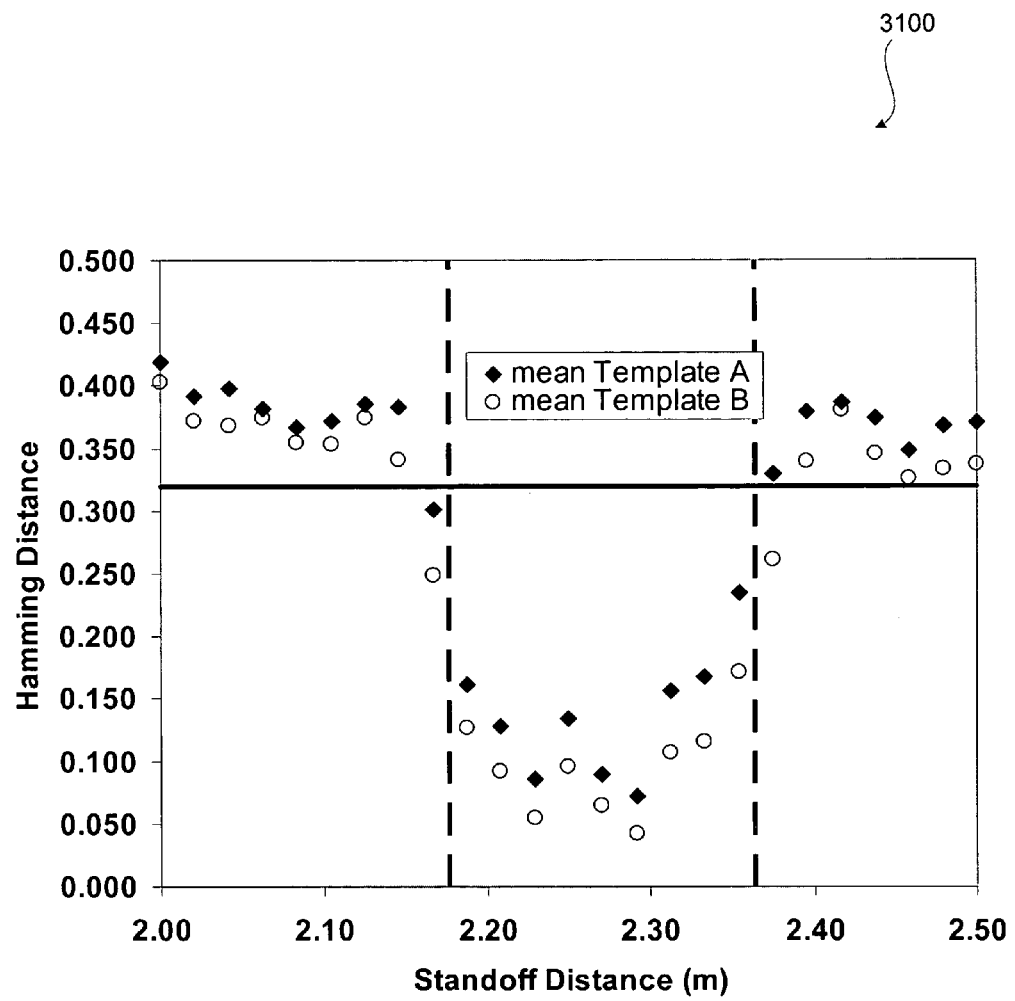
FIG. 31 shows a graphical plot of Hamming distances as a function of standoff distances (2 m to 2.5 m) for simulated images captured by an imaging system without wavefront coding.

Filtered images obtained by simulation are then identified by an iris recognition algorithm, and an iris score (e.g., modified Hamming distance (HD)) is generated for each iris image. FIG. 31 shows a plot 3100 of resulting iris scores as a function of standoff distance for a simulated imaging system without wavefront coding. Plot 3100 has standoff distance in meters as the abscissa and Hamming Distance on the ordinate. The solid horizontal line at an HD value near 0.31 shows the minimum required HD for positive recognition. Values of the standoff distance from about 2.17 to 2.36 meters define a region over which a subject may be correctly recognized by the iris recognition system. For evaluation of the IHONS 1.1 system, different templates were created. A template is an averaged idealization of a subject's iris.

FIG. 31 shows the HD scores for two templates for identifying the same subject. The data related to template A are shown as filled diamond-shaped points in the plot. The data related to template B are shown as circular points. The data for both sets is averaged over multiple measurements. Template B appears to provide slightly better results, since the iris recognition is then based on a slightly better image (i.e., larger visible iris region). The recognition range of the simulated system without wavefront coding is about 18 cm.

Figure 32:
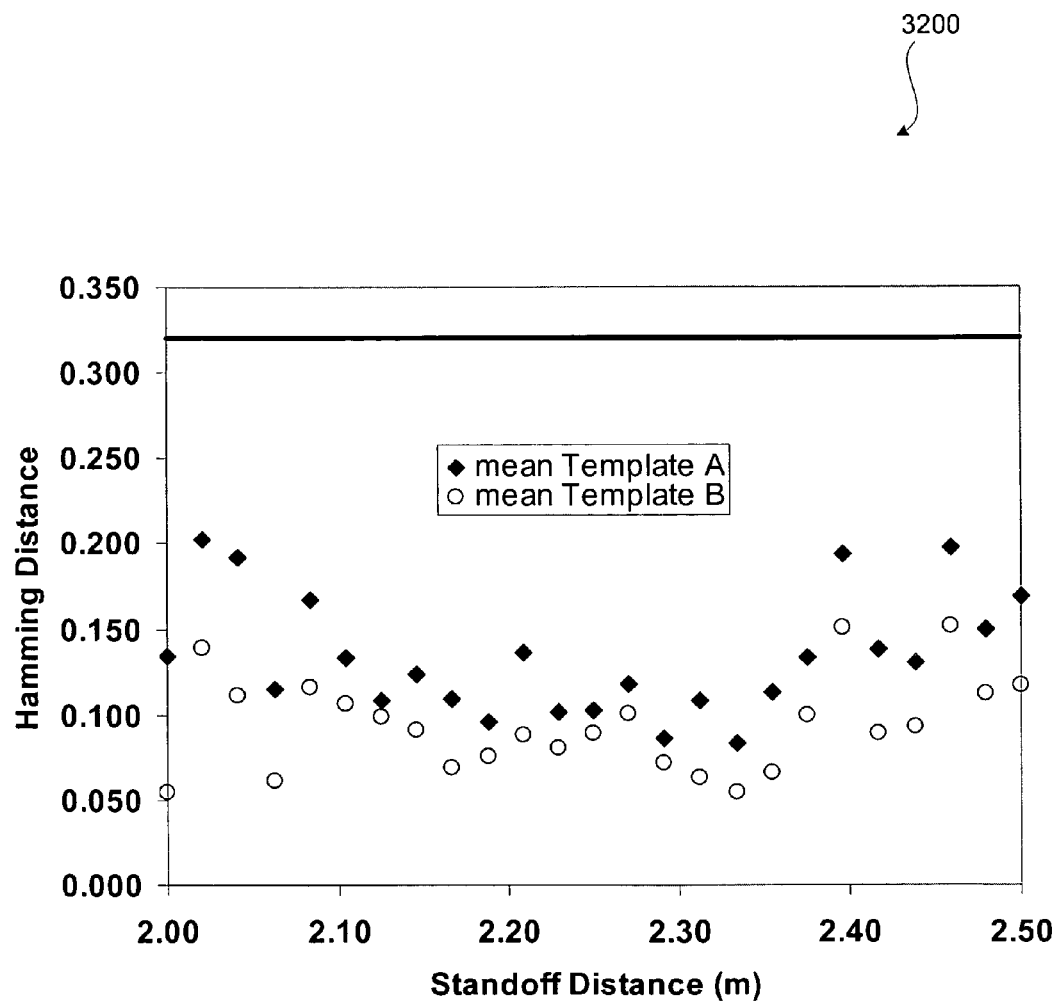
FIG. 32 shows a graphical plot of Hamming distances as a function of standoff distances (2 m to 2.5 m) for simulated iris images that incorporate the effects of a wavefront coding element and related processing in accordance with the present disclosure, shown here to illustrate that the inclusion of wavefront coding provides a broader recognition range in comparison to the system without wavefront coding.

FIG. 32 shows a plot 3200 of the resulting iris scores of the simulated IHONS 1.1 system. Plot 3200 has standoff distance in meters as the abscissa and HD on the ordinate. The data related to template A are shown as filled diamond-shaped points in the plot. The data related to template B are shown as circular points. The data for both sets is averaged over multiple measurements. FIG. 32 indicates that iris recognition may be performed over an entire range of interest using a single filter when IHONS 1.1 is used. Such simulated results are used at the end of a design process to verify that the selected design, including but limited to the filter and WFC element, work as expected.

Figure 33:
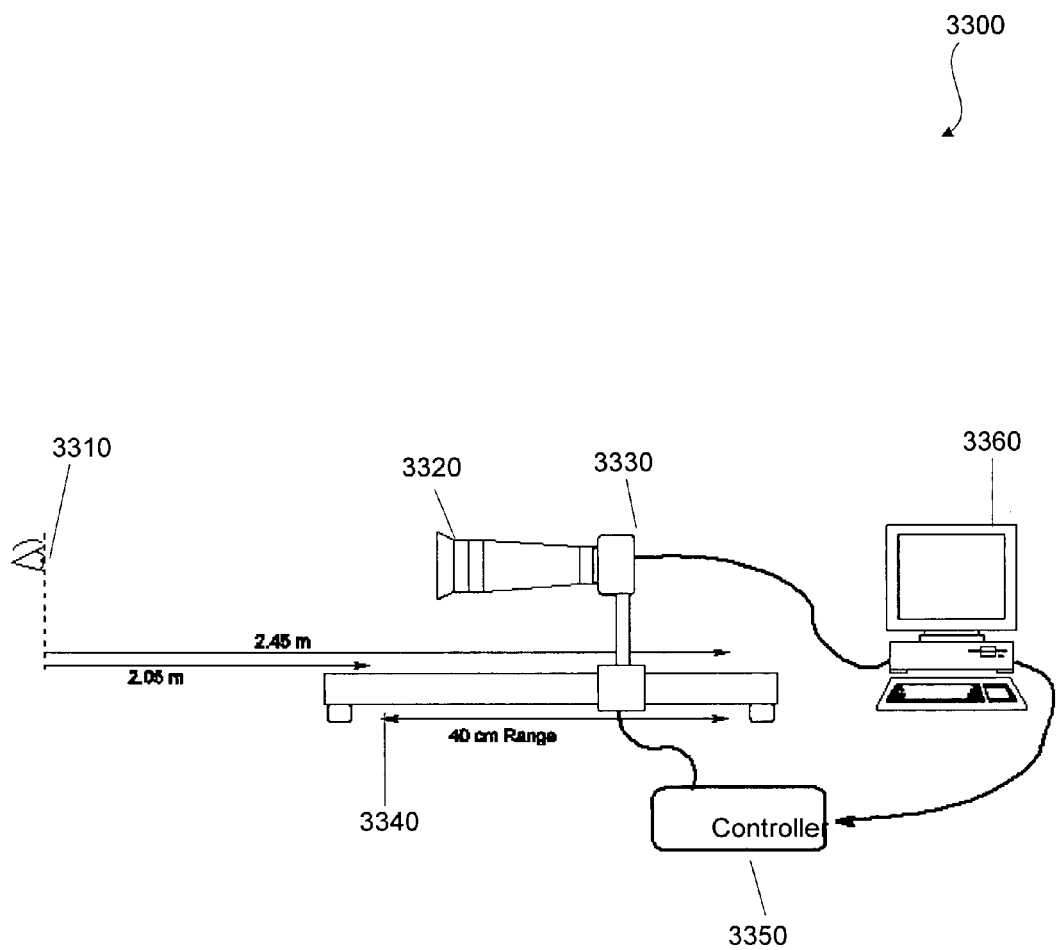
FIG. 33 is a schematic diagram of an experimental setup used for acquiring iris images.

FIG. 33 shows an experimental setup 3300 used for verification of the IHONS 1.1 system. In the prototype task-based imaging system for iris recognition verification, the image data capturing arrangement includes a lens system 3320, which in turn includes an IHONS wavefront coding element (e.g., that shown in FIG. 16), a wide-angle lens with a 30 mm entrance pupil diameter and an effective focal length of 210 mm, and a camera 3330 (e.g., a CCD array). Lens system 3320 and camera 3330 are mounted onto an automated rail system 3340. A subject 3310 rests his or her head on a tripod 2.05 meters away from rail system 3340. Camera 3330 is a 10-bit CCD array with a resolution of 2048×2048. Lens system 3320 further includes an illuminator including two illumination assemblies, each including four LEDs with a center wavelength of 840 nm, collimated using a Fresnel lens to yield a total irradiance of approximately 2 mW/cm$^2$. Lens system 3320 images a wavefront of electromagnetic energy from subject 3310 to an intermediate image at CCD array 3330 while also modifying phase of the wavefront (i.e., wavefront coding). This phase modification is designed such that the SNR of the resulting system including wavefront coding is greater than the SNR of the imaging system without wavefront coding. The eyes are individually aligned with respect to the field of view of the imaging system using optical posts mounted on top of a mini rail. Rail system 3340 includes a computer-controlled coaxial screw rail used to vary the standoff distance. Rail system 3340 is controlled by a controller 3350 that is responsive to a computer 3360 running a MATLAB® script that captures ten images in short sequence at 26 equally spaced positions from 2.05 to 2.45 meters.

Continuing to refer to FIG. 33, the image data processing arrangement is also controlled by computer 3360. Another MATLAB® script performs the decoding of the image using the kernel described in association with FIG. 24. A commercially available software package performs the task of iris recognition using a variation of an algorithm by Daugman (see J. G. Daugman, "The importance of being random: statistical principles of iris recognition," Patt. Rec., 36, 279-291 (2003)). The images are saved to a database, and then analyzed by another MATLAB® script that processes the images and assigns a score to each image based on pre-recorded high resolution templates. Experimental setup 3300 is converted from one with wavefront coding to one without wavefront coding by changing a lens (to one without wavefront coding effect) and refocusing. A similar setup captures PSFs, one difference being that the object is replaced by a 10 μm pinhole. The pinhole is illuminated by a white light source, which is filtered to block its visible spectrum while passing near-infrared light.

Figure 34:
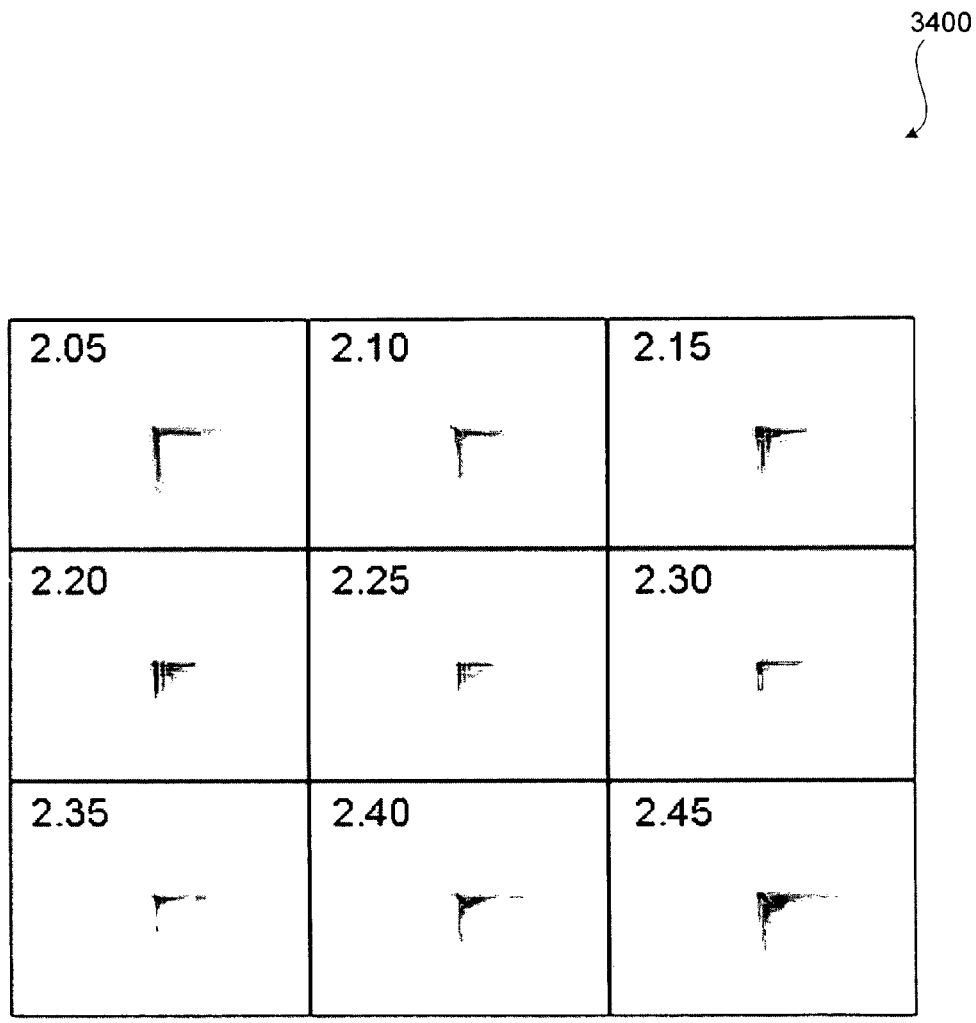
FIG. 34 is a series of graphical plots of experimentally obtained, normalized PSFs, for an imaging system including wavefront coding, in accordance with the present disclosure.

FIG. 34 shows a series 3400 of experimentally measured PSFs using the IHONS 1.1 imaging system, in accordance with the present disclosure, for a range of standoff distances (indicated in meters in the upper left-hand corner of each subimage). Intensity of a light source and exposure time of a camera were adjusted in order to keep PSFs close to saturation, so as to use the maximum dynamic range of the system. Noise was reduced by averaging 15 PSFs collected at each position. The camera uses a 10-bit sensor and non-linear noise removal was employed by reducing to zero all pixel values below the value of 18. PSFs were collected at 26 equally spaced positions within the total range of the rail (2.05 m to 2.45 m). The 26 PSF positions are summarized into the nine equally spaced PSFs shown in FIG. 34. The resemblance between these experimental PSFs (of FIG. 34) and the simulated PSFs (of FIG. 19) indicates good reproduction of the design, especially taking into account that the noise-removing averaging often has the undesirable effect of smoothing out the PSF.

Figure 35:
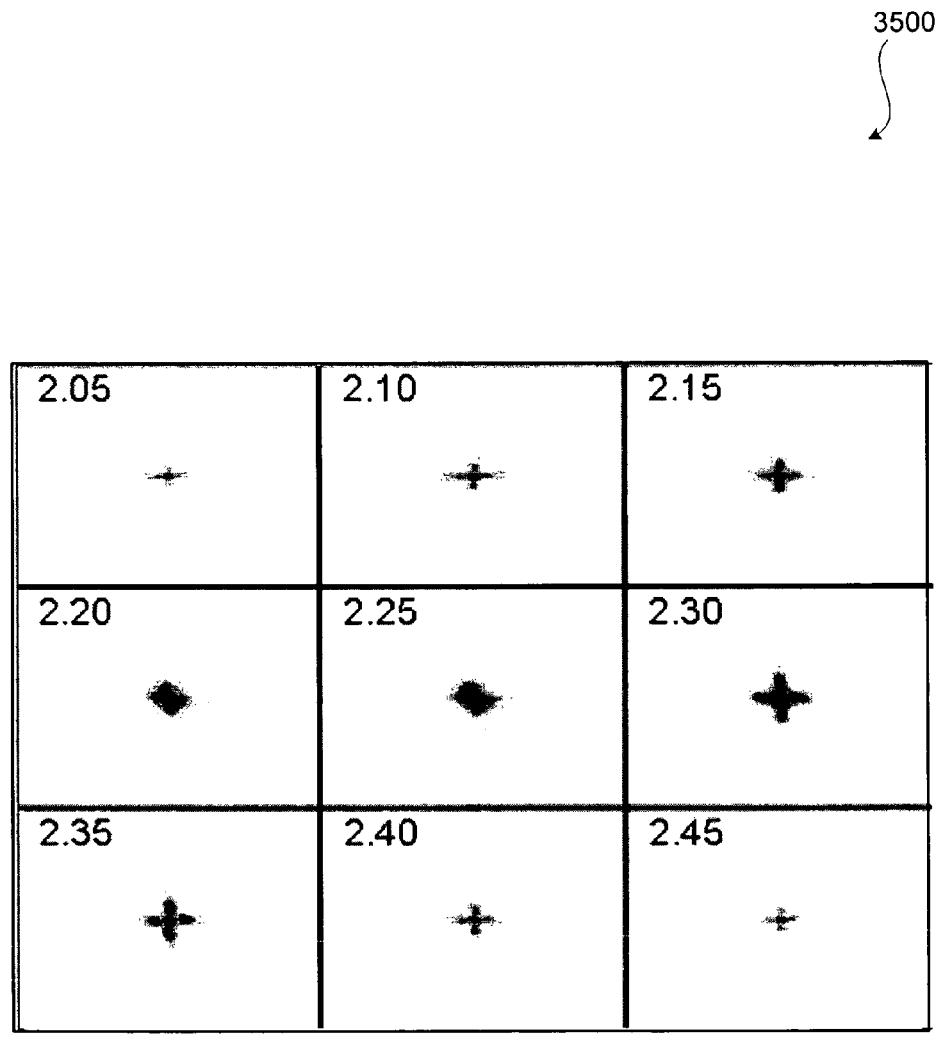
FIG. 35 is a series of graphical plots of experimentally obtained, normalized MTFs corresponding to the normalized PSFs shown in FIG. 34.

System performance is further illustrated in FIG. 35 showing a series 3500 of normalized, experimental MTFs, calculated by Fourier transforming the experimental PSFs. It may be noted that the experimental MTFs of FIG. 35 resemble the simulated MTFs of FIG. 20 and that high on-axis modulation is maintained throughout a range of standoff distances, with only a slight drop at a far end of the range (2.45 m).

Figure 36:
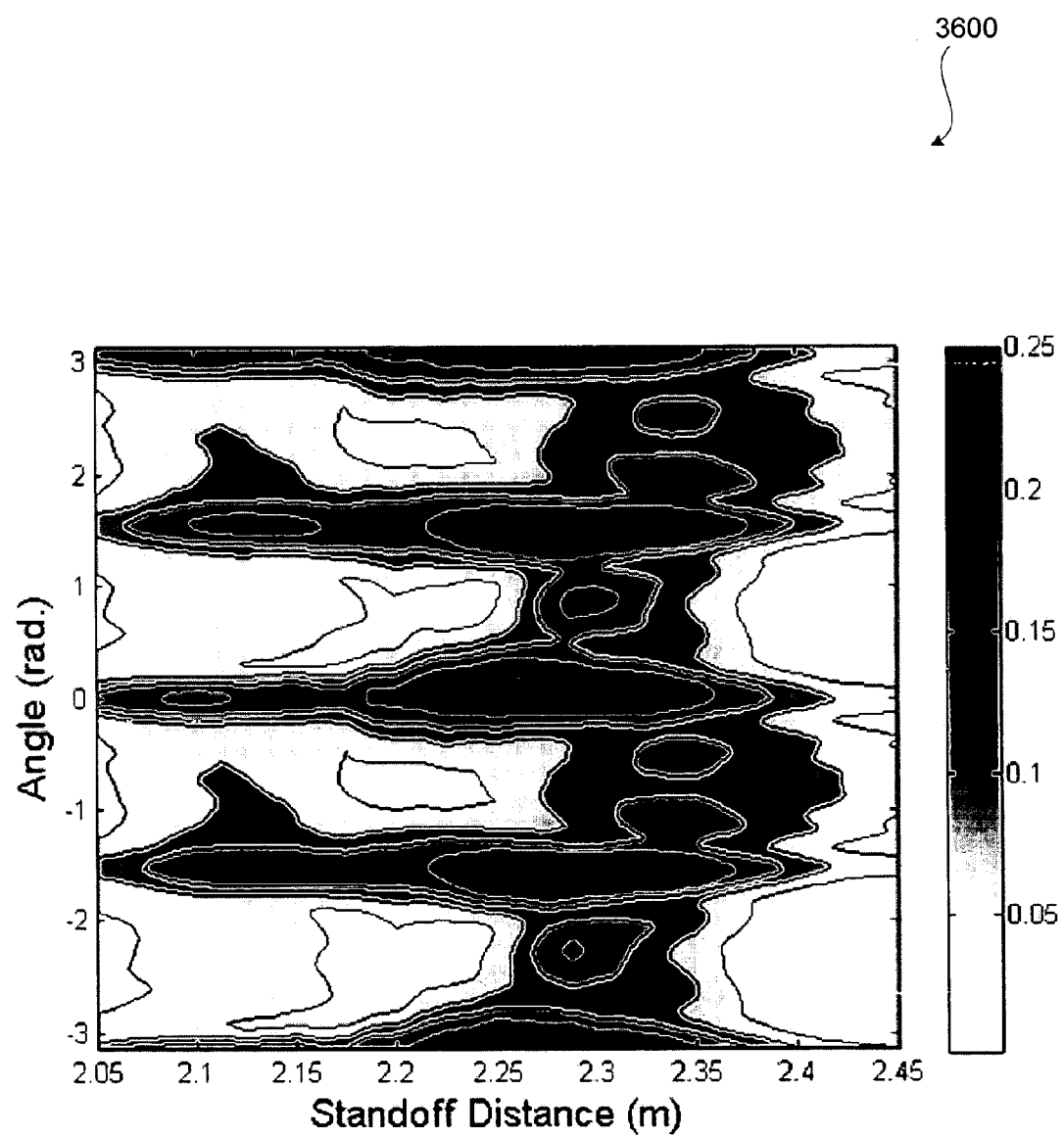
FIG. 36 is a contour plot of the experimentally obtained, polar-MTF of an exemplary imaging system including wavefront coding.

This drop in on-axis modulation is better visualized in a polar-MTF plot 3600 of FIG. 36. Polar-MTF plot 3600 shows the modulation in all directions as a function of distance only at the highest spatial-frequencies of interest, taking into account the variation in object magnification with range. Again, there is a notable resemblance between the graphical plot shown in FIG. 36 and the simulated polar-MTF plot shown in FIG. 21. Although the fine details of plots 2100 and 3600 vary, strong on-axis response (0, ±π/2, and ±π directions) as well as the required magnitude of the off-axis directions are present in both FIGS. 21 and 36.

Figure 37:
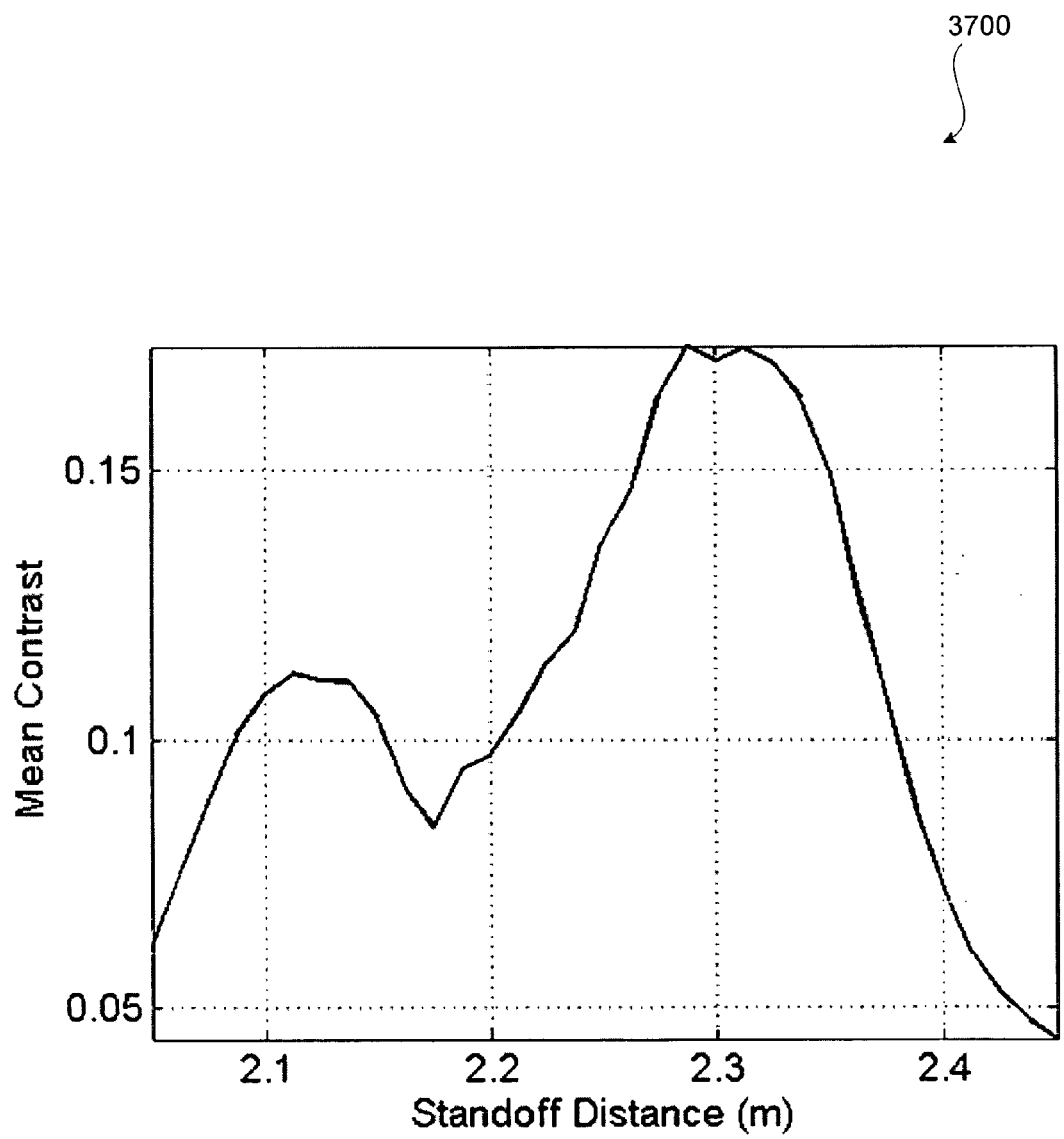
FIG. 37 is a graphical plot of an experimentally-obtained mean contrast at the spatial frequencies of interest for an imaging system including wavefront coding, as a function of standoff distance, averaged over all directions ($-\pi$ to $+\pi$).

Finally, FIG. 37 shows a graphical plot 3700 of the mean contrast over all directions at the highest spatial frequency of interest. This plot is of special interest to the iris recognition case given the equal importance of resolving the iris object over all directions. This plot of FIG. 37 clearly shows the undesired drop in contrast at the far region. Fortunately, this drop takes place at a range already beyond the target range, and it can be partially offset by moving the best focus farther away (although to the detriment of the near range). The plot of FIG. 37 also indicates that future designs may be improved by configuring the WFC element so as to move the two peaks further apart, thereby increasing the total range (although at the cost of reducing the local minimum at 2.17 m). A comparison of FIG. 37 with the simulated plot of FIG. 22 also shows a remarkable resemblance, except for a narrowing of the distance between the contrast peaks (there is a small change in scale between the simulated and experimental plots).

The effect of the use of wavefront coding in iris recognition may be summarized as enabling the trade-off of HD for a wider range of recognition. This trade-off may be explained by the wider distribution of modulation (contrast) as a function of defocus provided by WFC. In order to accurately evaluate this trade-off, it is important to keep constant all other parameters that affect the HD. These parameters include, but are not limited to: 1) illumination; 2) position of the eyelids; 3) presence of glasses, contact lenses or other objects in the optical path; and 4) motion of the subject.

Such an evaluation may be performed for optimal imaging conditions, in which the subject is at rest, looking directly towards the camera with the eyes wide open during the duration of image capture. The active near-infrared illumination was used at high intensity, limited by eye safety levels. Any variation in these parameters would either translate into a drop in the SNR of the measurement or, more likely, into a failure of the iris recognition software to correctly segment the iris portion out of the resulting image. The sensitivity of the segmentation to experimental parameters is especially high in the low SNR cases (e.g., near the edges of the standoff distance range).

It should be noted that most iris recognition algorithms prefer to operate with about 200 pixels across the iris image. Given the imaging parameters in actual imaging conditions, the number of pixels across the iris drops to less than 150 at the farthest ranges, as shown in FIG. 17. In order to compensate for this effect, all the images are linearly interpolated in experiment by an interpolation factor of 1.18. All images have been equally interpolated since, in practice, the iris recognition system is not likely to be provided with the exact distance to the subject's iris, meaning that the signal processing should be range independent. The interpolation factor was determined empirically, and it may be the subject of further optimization. Nevertheless, it was noted that the system consistently showed better performance with interpolation than without interpolation.

Figure 38:
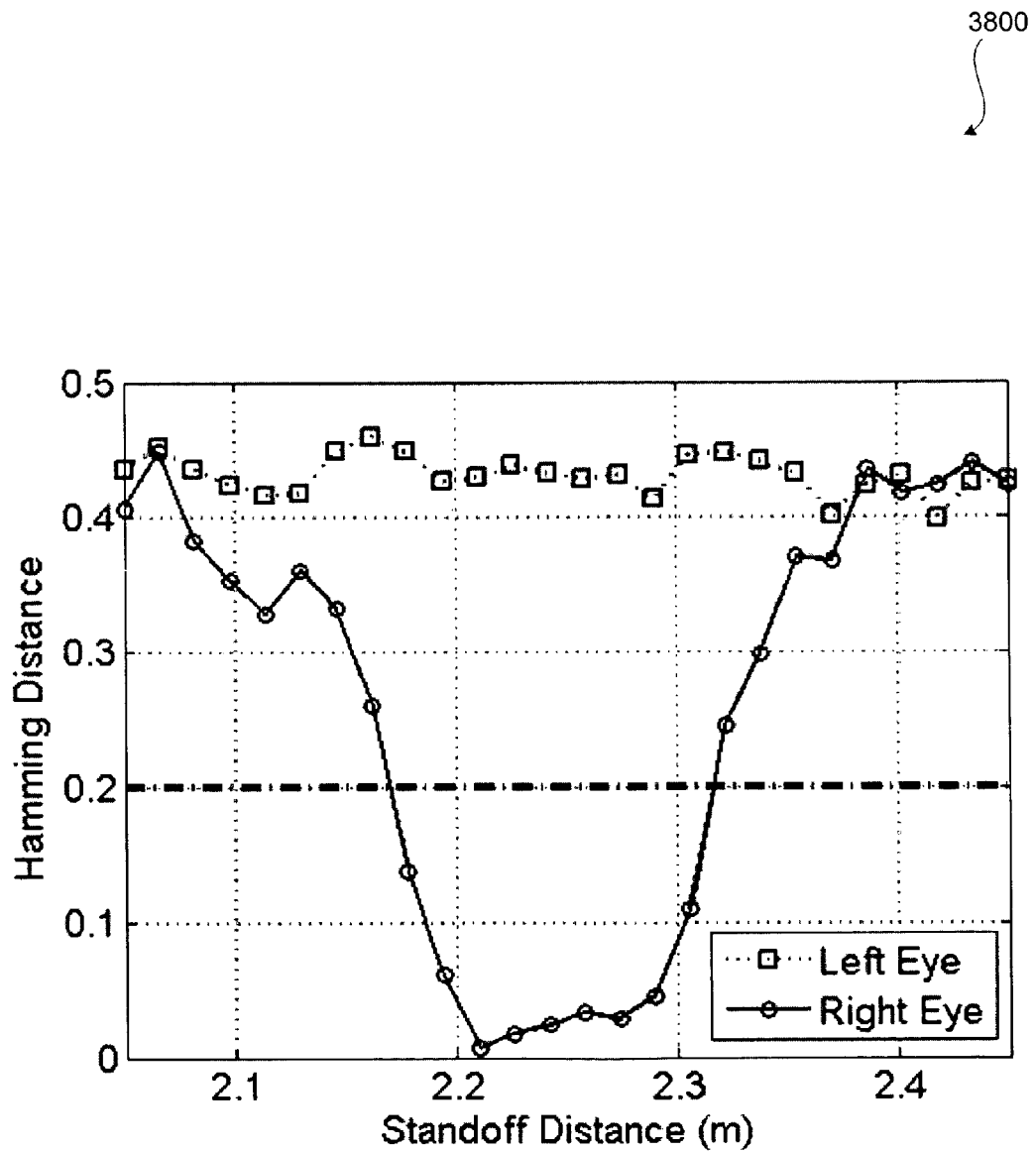
FIG. 38 is a graphical plot of Hamming distances as a function of standoff distance to an iris for iris recognition using an imaging system without wavefront coding.

FIG. 38 shows a plot of the Hamming distances as a function of distance to the iris (measured from the iris to the first glass surface of the imaging system) for the imaging system without wavefront coding. The presence of a narrow valley with a sharp transition region is notable in FIG. 38, where the narrow valley corresponds to the region where defocus incurs a drop in modulation (contrast) at the spatial frequencies used by the recognition algorithm. The flat region (2.2 to 2.3 m) close to best-focus corresponds to the region where defocus results in a drop of spatial frequencies that are higher than all the spatial frequencies used by the algorithm. At each object position, ten images of each eye are captured, processed and compared to the iris code corresponding to that eye providing us with an averaged HD for each eye that is shown in plot 3800. Open circles connected by a solid line designate the right eye, and open squares connected by a dotted line designate the left eye. From the plot in FIG. 38, it may be deduced that an imaging system without wavefront coding yields a recognition range of 14.9 cm at a maximum HD of 0.2 (dot-dash line at HD=0.2). The plot in FIG. 38 also allows verification of the accuracy of the simulated images by comparison to the simulated Hamming distance plot shown in FIG. 31.

Figure 39:
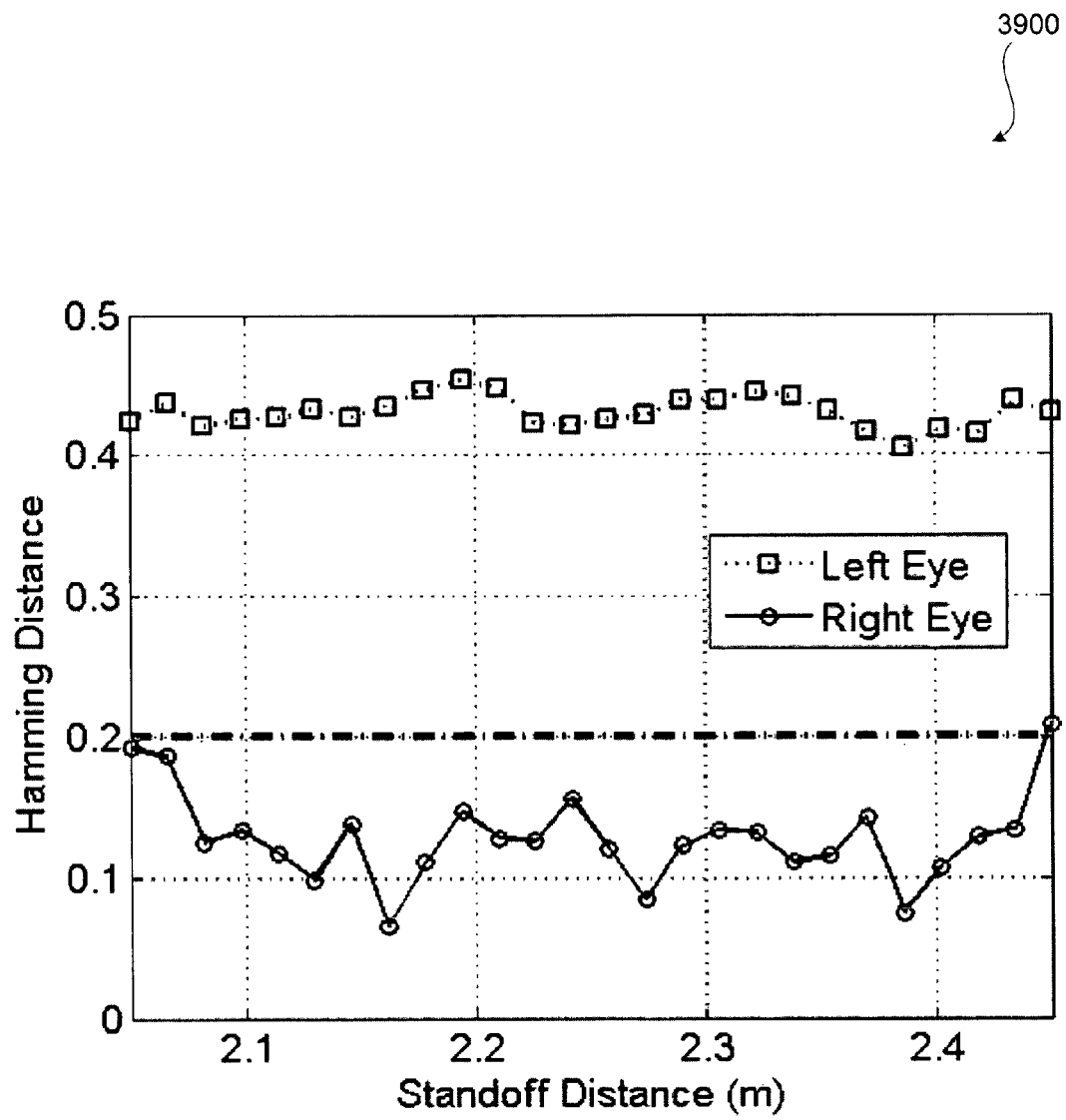
FIG. 39 is a graphical plot of Hamming distances as a function of standoff distance to an iris for iris recognition using an imaging system including wavefront coding, in accord with an embodiment.

FIG. 39 shows a graphical plot 3900 of the HD as a function of the iris distance for the imaging system including wavefront coding. FIG. 39 includes a plot of Hamming distances as a function of standoff distance range for an experimentally evaluated iris recognition system using the IHONS 1.1 imaging system, showing a doubling of the recognition range to approximately 40 cm. Open circles connected by a solid line designate the right eye, and open squares connected by a dotted line designate the left eye. In this case, a shallow and broad valley is shown (from 2.05 to 2.45 meters standoff distance), therefore effectively demonstrating the trade-off of the lowest HD for an extended depth of field. This trade-off may be better understood if described in terms of SNR. If the excess SNR is high enough, it is possible to drop it in order to extend the depth of field without having any noticeable effect on the HD. On the other hand, if the SNR is just above the optimum value for correct iris recognition, as is often the case in systems that are designed without WFC, then any extension in the depth of field translates into a drop in the minimum HD. It may be noted that the imaging system including WFC provides a recognition range of almost 40 cm at a maximum HD of 0.2 (dot-dash line at HD=0.2). Also, the variance of the Hamming distances at a given position has increased considerably in the imaging system including wavefront coding over that of the imaging system without wavefront coding. Finally, the plot in FIG. 39 allows verification of the accuracy of the simulated images by comparison to the plot shown in FIG. 32, thereby providing the confidence to use simulated images to analyze the performance of future WFC designs.

As described above, WFC may be useful to effectively trade off HD (or SNR) for an extended range for the task at hand. This trade-off becomes especially attractive when the system is provided with excess SNR, thus allowing an increase in, for instance, the iris recognition range without a noticeable increase in the HD. Under the appropriate circumstances, the recognition range in the imaging system including WFC may be more than double that of an imaging system without wavefront coding, with the main limitation being the sporadic failure of the iris recognition algorithm to correctly segment the iris image for the image captured using WFC. These failures may be caused by, for example, algorithmic assumptions concerning the shape of the specular reflection present in the pupil. These reflections assume a different shape when captured using an imaging system including WFC, which should be taken into account for optimal performance. In addition, the weakly non-separable form of the phase element yields slightly larger modulation off-axis (which is a characteristic of a non-separable design) while maintaining nearly non-varying PSFs over defocus (which is a characteristic of a separable design). This compromise yields a solution that is advantageous over those achieved using purely separable designs, and allows meeting of all the design goals using a single filter over the entire design range.

Although each of the aforedescribed embodiments have been illustrated with various components having particular respective orientations, it should be understood that the system as described in the present disclosure may take on a variety of specific configurations with the various components being located in a variety of positions and mutual orientations and still remain within the spirit and scope of the present disclosure. The changes described above, and others, may be made in the task-based imaging systems described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between. Furthermore, suitable equivalents may be used in place of or in addition to the various components, the function and use of such substitute or additional components being held to be familiar to those skilled in the art and are therefore regarded as falling within the scope of the present disclosure. For example, although each of the aforedescribed embodiments have been discussed mainly for the case of weakly separable phase functions, other WFC elements providing other phase functions may be used in the task-based imaging system and still provide an improvement over currently available task-based imaging systems without WFC.

Therefore, the present examples are to be considered as illustrative and not restrictive, and the present disclosure is not to be limited to the details given herein but may be modified within the scope of the appended claims.

What is claimed is:

1. A task-based imaging system for obtaining data regarding a scene for use in a task, comprising:
    at least one optical element for (a) imaging a wavefront of electromagnetic energy from the scene to an intermediate image and (b) modifying phase of the wavefront; and
    a first detector for detecting the intermediate image over a range of spatial frequencies,
    the at least one optical element being configured for cooperating with the first detector so that signal-to-noise ratio (SNR) of the task-based imaging system is greater than SNR of the task-based imaging system without phase modification of the wavefront over the range of spatial frequencies,
    wherein modifying phase is characterized by a pupil function of a form:

$$\phi(x, y) = \sum_{i,j=0}^{N} x^i \alpha(i, j) y^j,$$

where x and y are normalized spatial coordinates, r is a radius of an entrance pupil and $\alpha(i,j)$ are pupil function coefficients for indices i and j with $$\sum_{i,j=1}^{N} |\alpha(i, j) r^{-i-j}|^2 < \sum_{l=0}^{N} |\alpha(l, 0) r^{-l}|^2 + |\alpha(0, l) r^{-l}|^2,$$

and
wherein at least one of coefficients α(i,j) has a value of at least one when at least one of indices i and j equals zero.

2. The task-based imaging system of claim 1, wherein the task is selected as at least one of biometric iris recognition, biometric face recognition, biometric recognition for access control, biometric recognition for threat identification, barcode reading, imaging for quality control in an assembly line, optical character recognition, biological imaging and automotive imaging for object detection.

3. The task-based imaging system of claim 1, further comprising an image processing arrangement for performing the task.

4. The task-based imaging system of claim 3, further comprising a modulation element for modifying the phase of the wavefront, wherein the modulation element and the image processing arrangement cooperate so as to reduce at least one imaging aberration in the task-based imaging system in comparison to the task-based imaging system without the modulation element and the image processing arrangement.

5. The task-based imaging system of claim 4, wherein the imaging aberration is one or more of temperature-dependent aberration and impact-induced aberration.

6. The task-based imaging system of claim 3, wherein the image processing arrangement creates a record of the task, and records the record in a data storage unit.

7. The task-based imaging system of claim 1, further comprising a second detector in electronic communication with the first detector such that image data formed by the first detector in response to the intermediate image is transferable between the first detector and the second detector.

8. The task-based imaging system of claim 1, wherein the pupil function coefficients are given by α(0,3)=α(3,0)=23.394, α(0,5)=α(5,0)=60.108, α(0,7)=α(7,0)=−126.421, α(0,9)=α(9,0)=82.128, α(3,3)=5.021, α(5,5)=−21.418, α(7,7)=−310.749, and α(9,9)=−1100.336.

9. The task-based imaging system of claim 1, wherein the at least one optical element is a variable optical element.

10. The task-based imaging system of claim 9, wherein the variable optical element provides variable modification of the phase of the wavefront.

11. The task-based imaging system of claim 10, wherein the variable optical element includes at least one of adaptive optics and a spatial light modulator.

12. The task-based imaging system of claim 9, wherein the variable optical element provides variable scaling of the intermediate image.

13. The task-based imaging system of claim 9, wherein the variable optical element includes at least a selected one of a liquid lens, a liquid crystal variator, a slidable optical element configuration, a sliding variator arrangement and a sliding aperture variator.

14. A method for use with a task-based imaging system, comprising:
imaging electromagnetic energy from a scene to an intermediate image of the task-based imaging system over a range of spatial frequencies;
modifying phase of a wavefront of the electromagnetic energy;
detecting the intermediate image; and
generating image data over the range of spatial frequencies, based on the intermediate image such that signal-to-noise ratio (SNR) of the task-based imaging system is greater than SNR of the task-based imaging system without modifying phase over the range of spatial frequencies,
wherein modifying the phase of the wavefront comprises altering the phase with a pupil function of a form:

$$\phi(x, y) = \sum_{i,j=1}^{N} x^i \alpha(i, j) y^j,$$

where x and y are normalized spatial coordinates, r is a radius of an entrance pupil and α(i,j) are pupil function coefficients for indices i and j with $$\sum_{i,j=1}^{N} |\alpha(i, j)|^2 < \sum_{l=0}^{N} |\alpha(l, 0)|^2 + |\alpha(0, l)|^2,$$

wherein at least one of coefficients α(i,j) has a value of at least one when at least one of indices i and j equals zero.

15. The method of claim 14,
wherein imaging the electromagnetic energy
and modifying the phase do not modify amplitude of the wavefront.

16. The method of claim 14, wherein a task performed by the task-based imaging system comprises one of analyzing an iris pattern for biometric iris recognition, analyzing a facial pattern for biometric face recognition, identifying a threat by biometric recognition, controlling access to a restricted area, imaging for quality control in an assembly line, optically recognizing alphanumeric characters, identifying features during biological imaging, imaging objects in automotive applications, and generating a viewable, final image.

17. The method of claim 14, wherein the pupil function coefficients are given by α(0,3)=α(3,0)=23.394, α(0,5)=α(5,0)=60.108, α(0,7)=α(7,0)=−126.421, α(0,9)=α(9,0)=82.128, α(3,3)=5.021, α(5,5)=−21.418, α(7,7)=−310.749, and α(9,9)=−1100.336.

* * * * *